Figure 4:
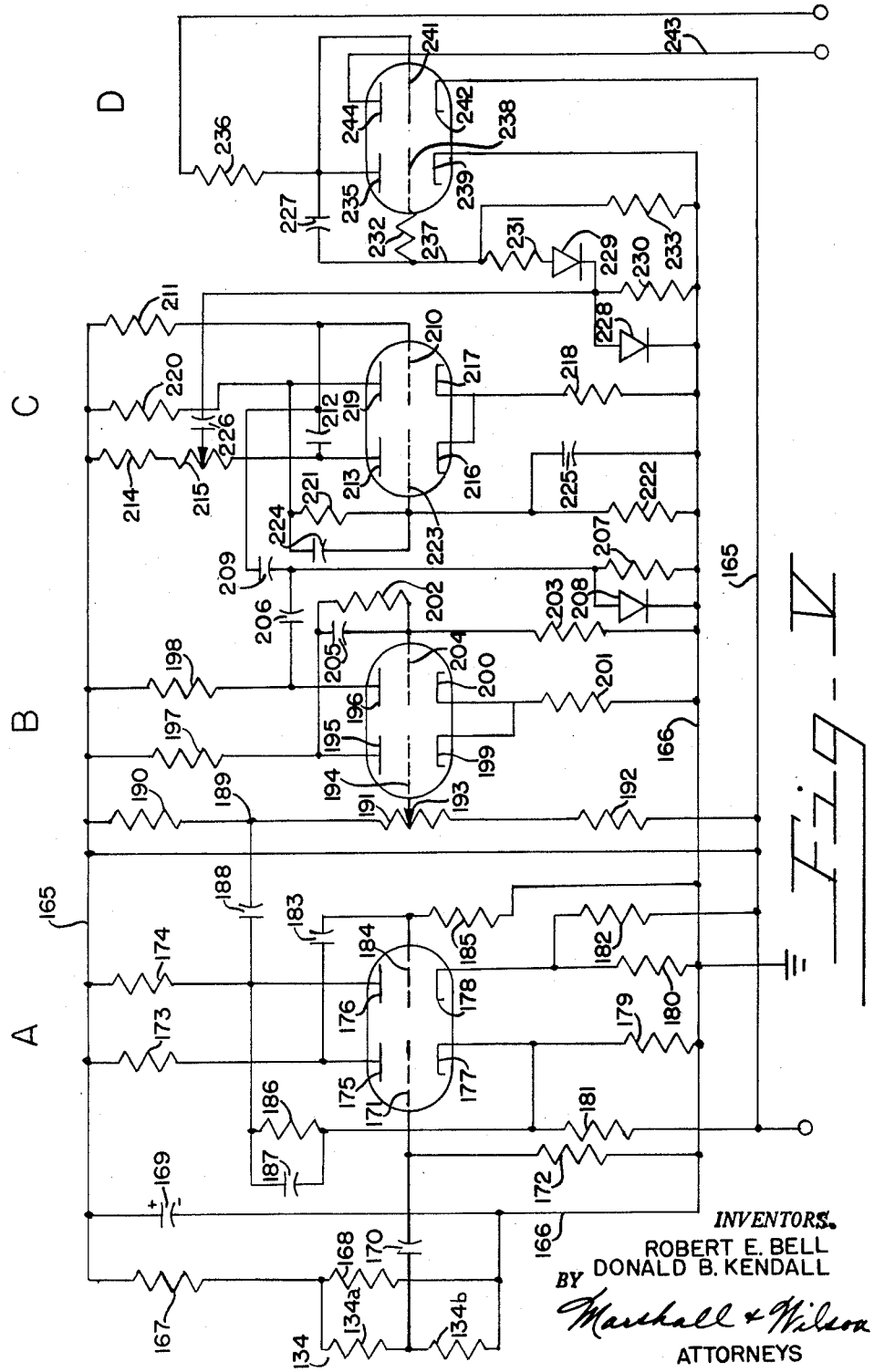

Dec. 29, 1964  R. E. BELL ETAL  3,163,247
CONDITION RESPONSIVE APPARATUS
Filed Feb. 28, 1961  17 Sheets-Sheet 1
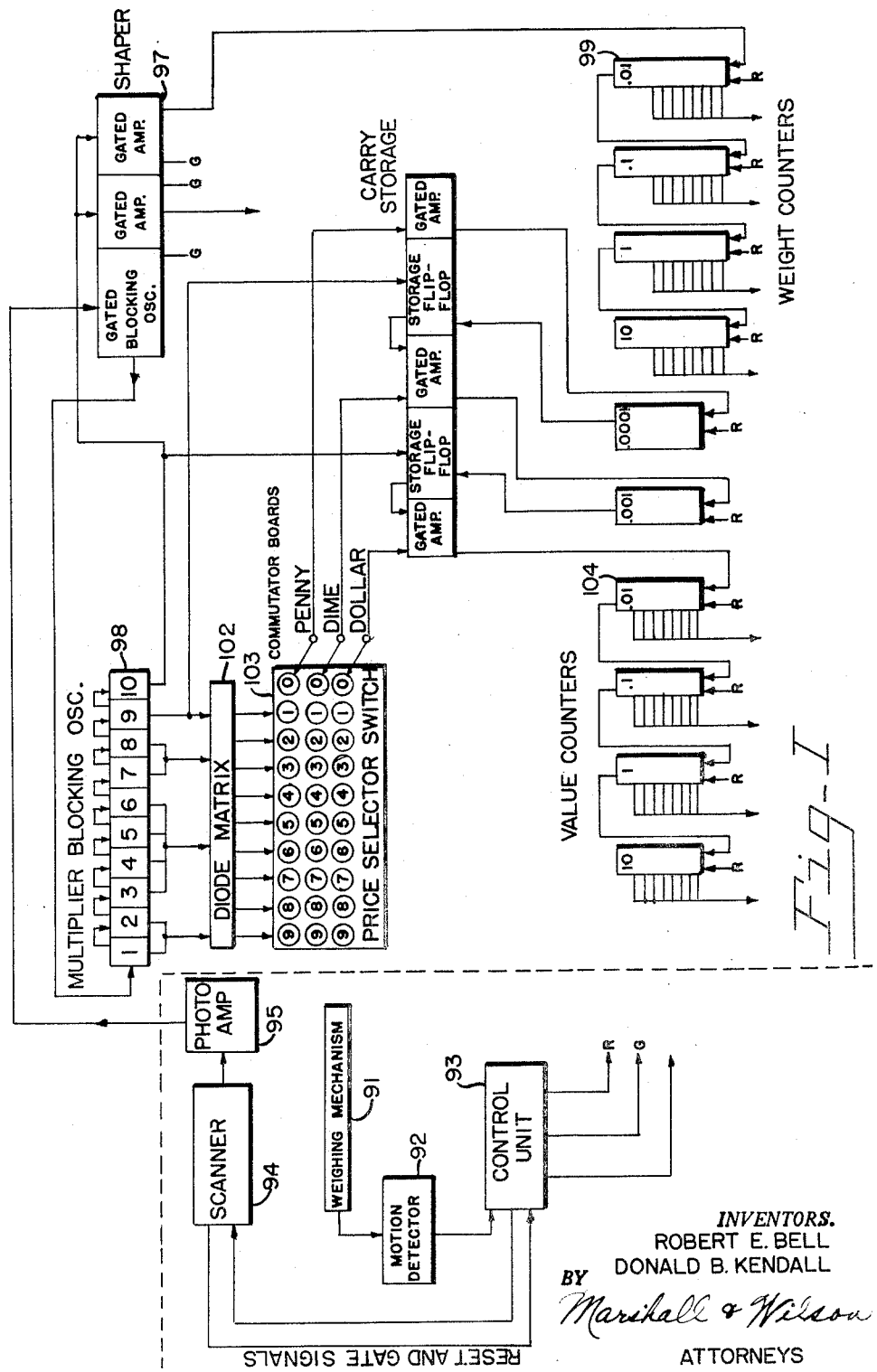
INVENTORS.
ROBERT E. BELL
DONALD B. KENDALL
BY Marshall & Wilson
ATTORNEYS

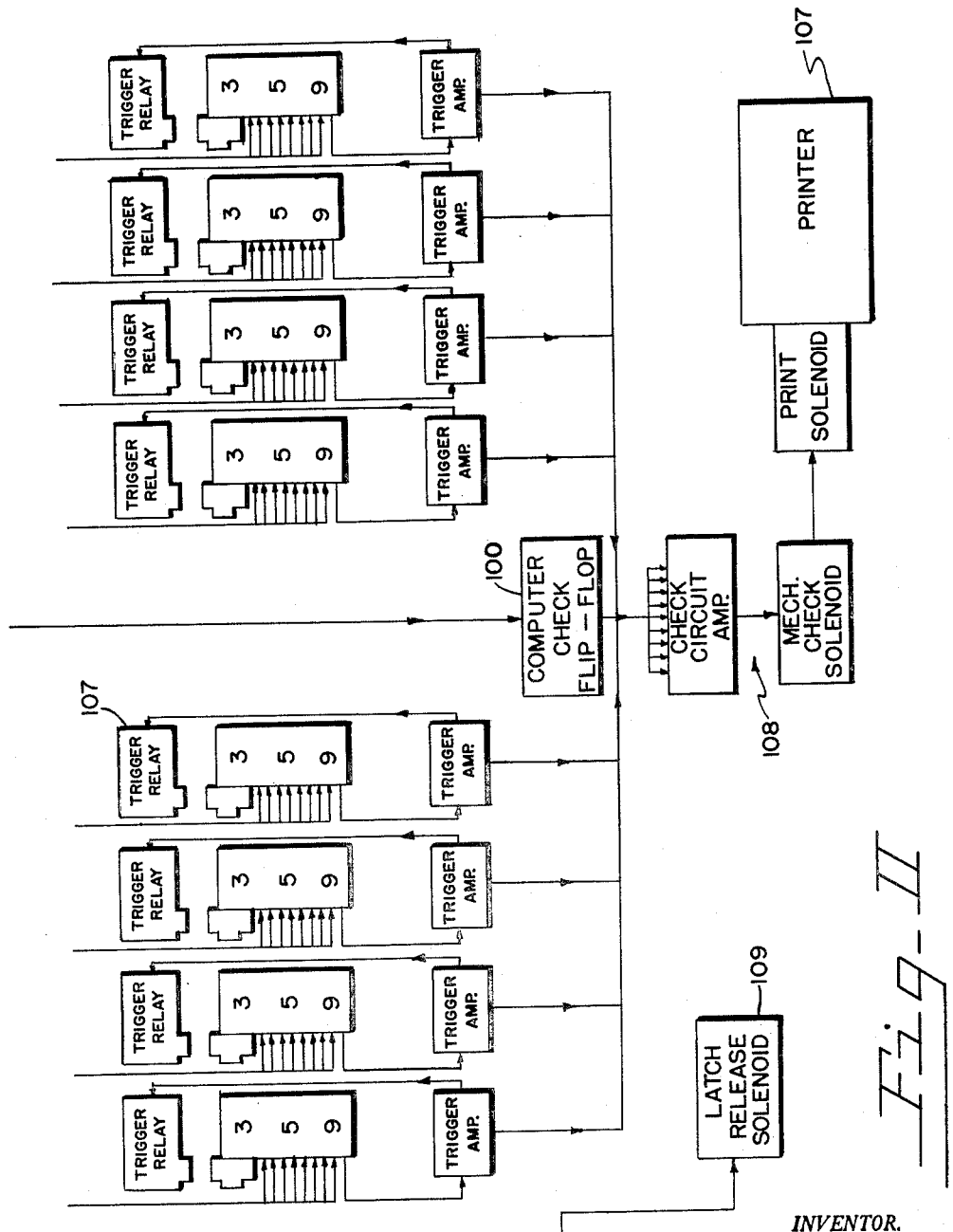

Dec. 29, 1964    R. E. BELL ETAL    3,163,247
CONDITION RESPONSIVE APPARATUS
Filed Feb. 28, 1961    17 Sheets-Sheet 3
Fig. III
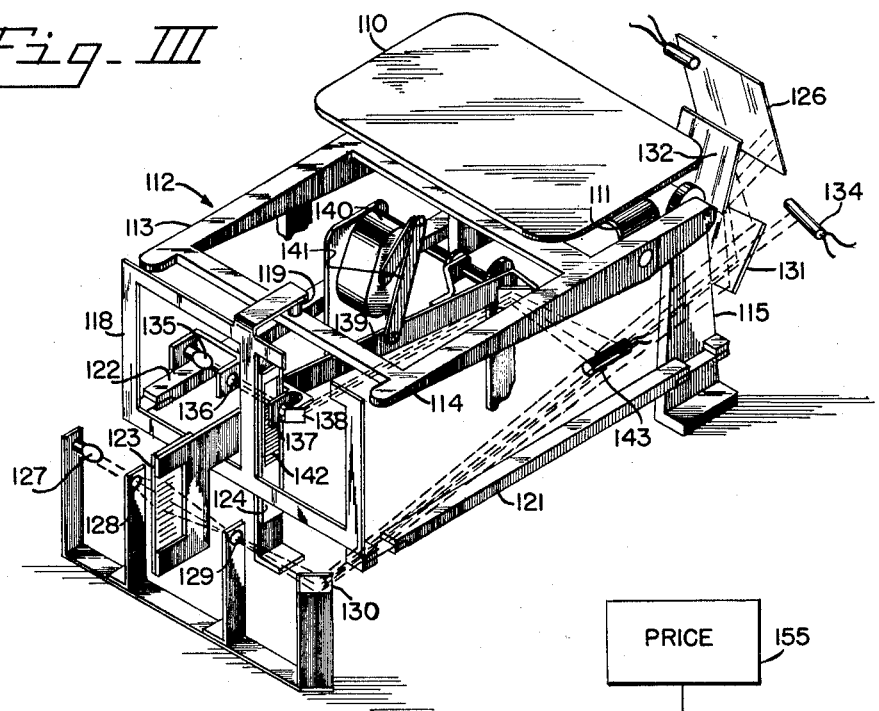
Fig. IV
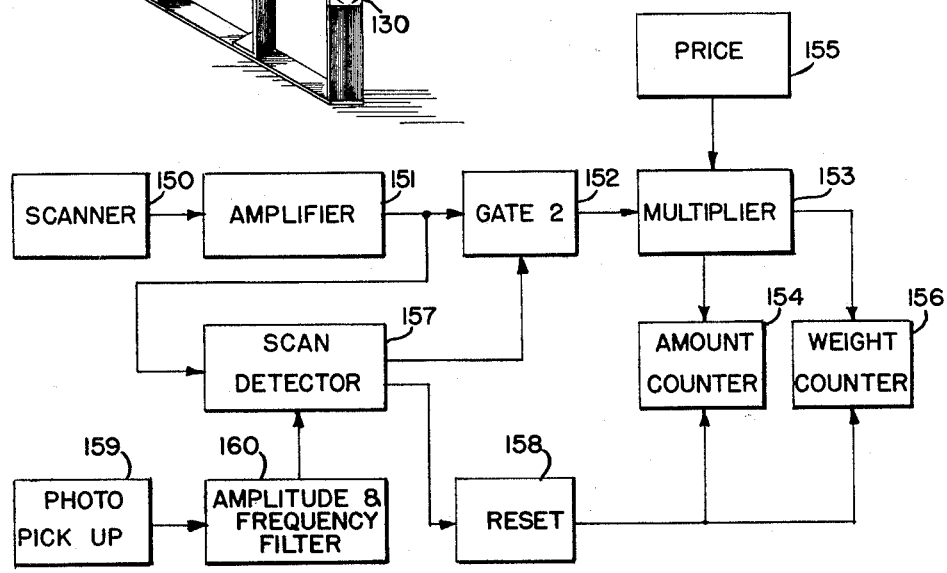
INVENTORS.
ROBERT E. BELL
BY DONALD B. KENDALL
Marshall & Wilson
ATTORNEYS Dec. 29, 1964  R. E. BELL ETAL  3,163,247
CONDITION RESPONSIVE APPARATUS
Filed Feb. 28, 1961  17 Sheets-Sheet 4

INVENTORS.
ROBERT E. BELL
DONALD B. KENDALL
BY *Marshall & Wilson*
ATTORNEYS

Dec. 29, 1964 R. E. BELL ETAL 3,163,247
CONDITION RESPONSIVE APPARATUS
Filed Feb. 28, 1961 17 Sheets-Sheet 5
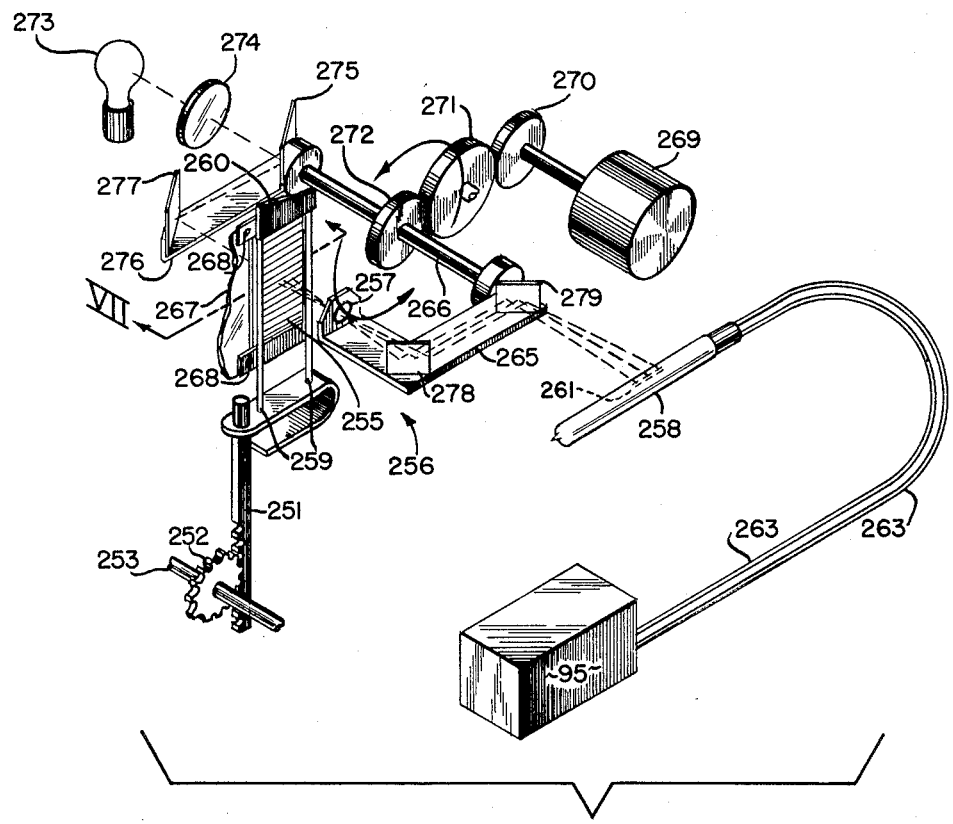
*Fig. VI*
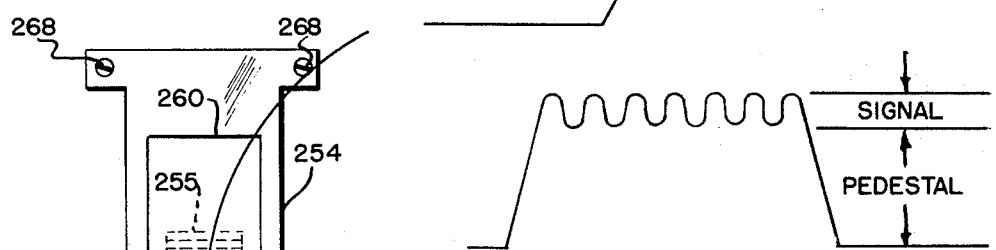
*Fig. IX*
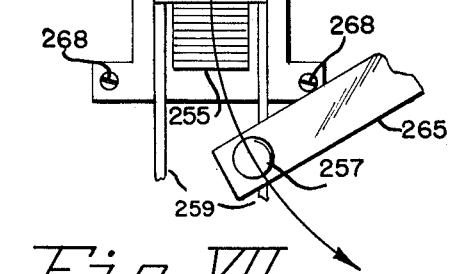
*Fig. VII*
INVENTORS.
ROBERT E. BELL
DONALD B. KENDALL
BY
Marshall & Wilson
ATTORNEYS

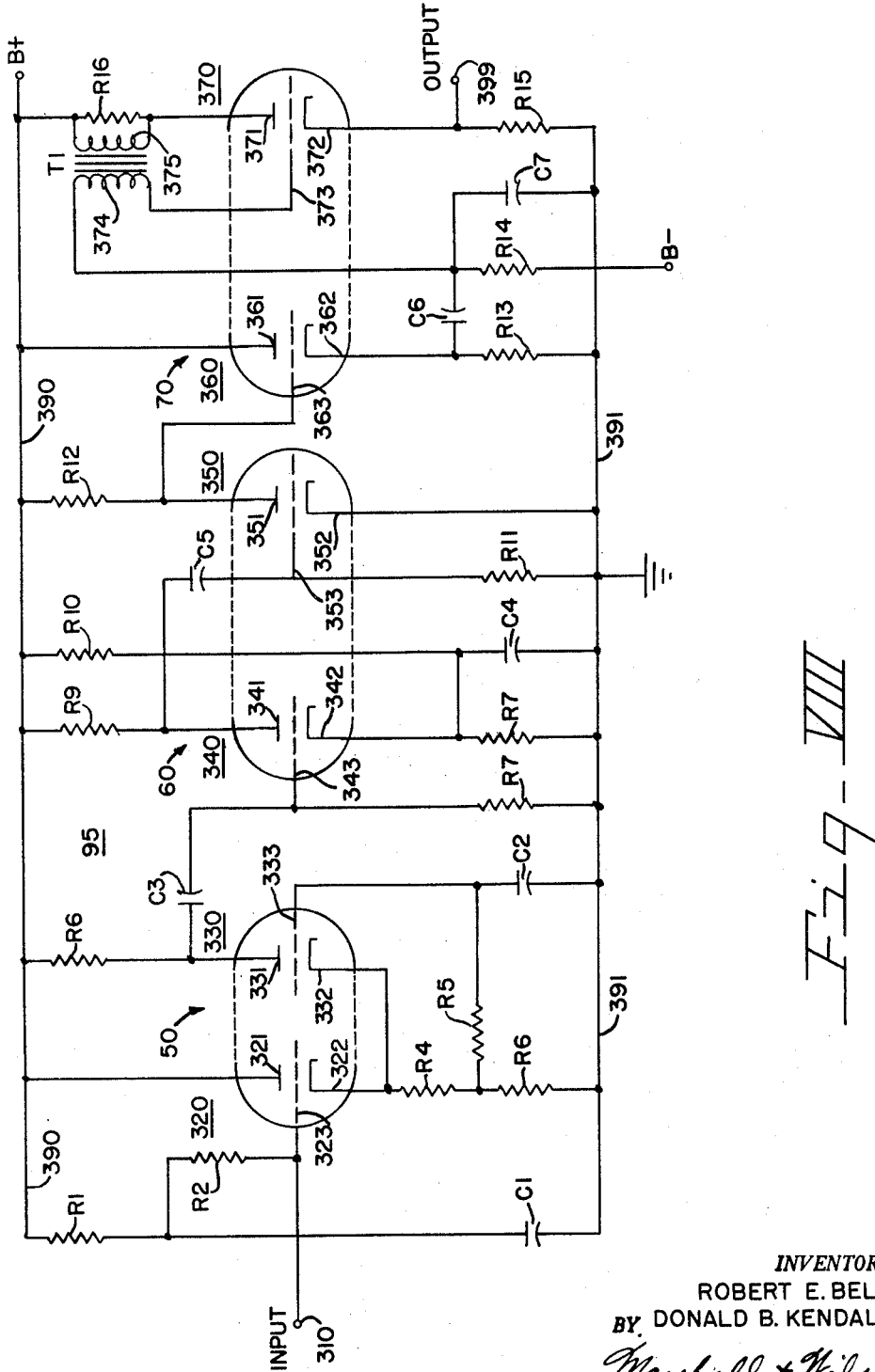

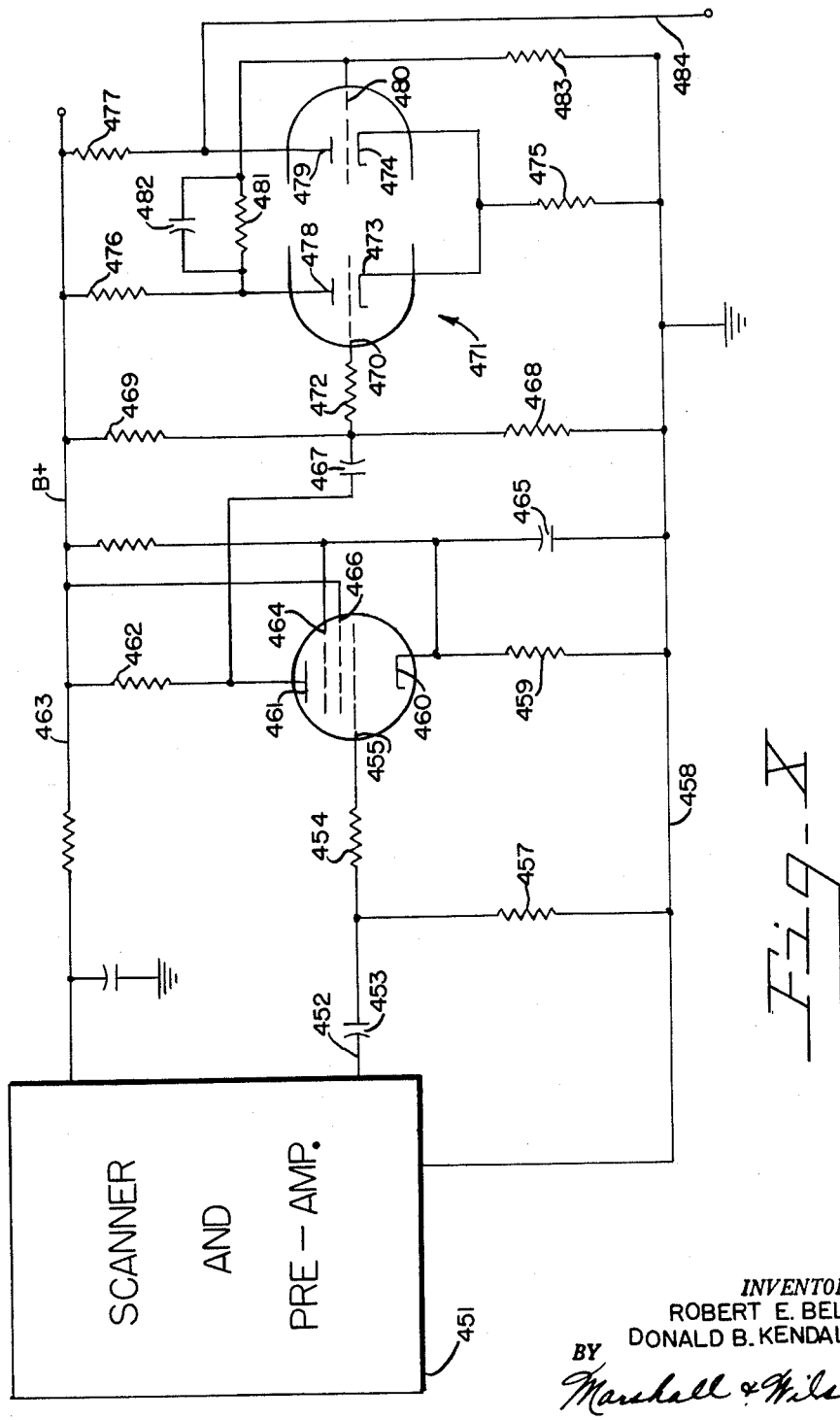

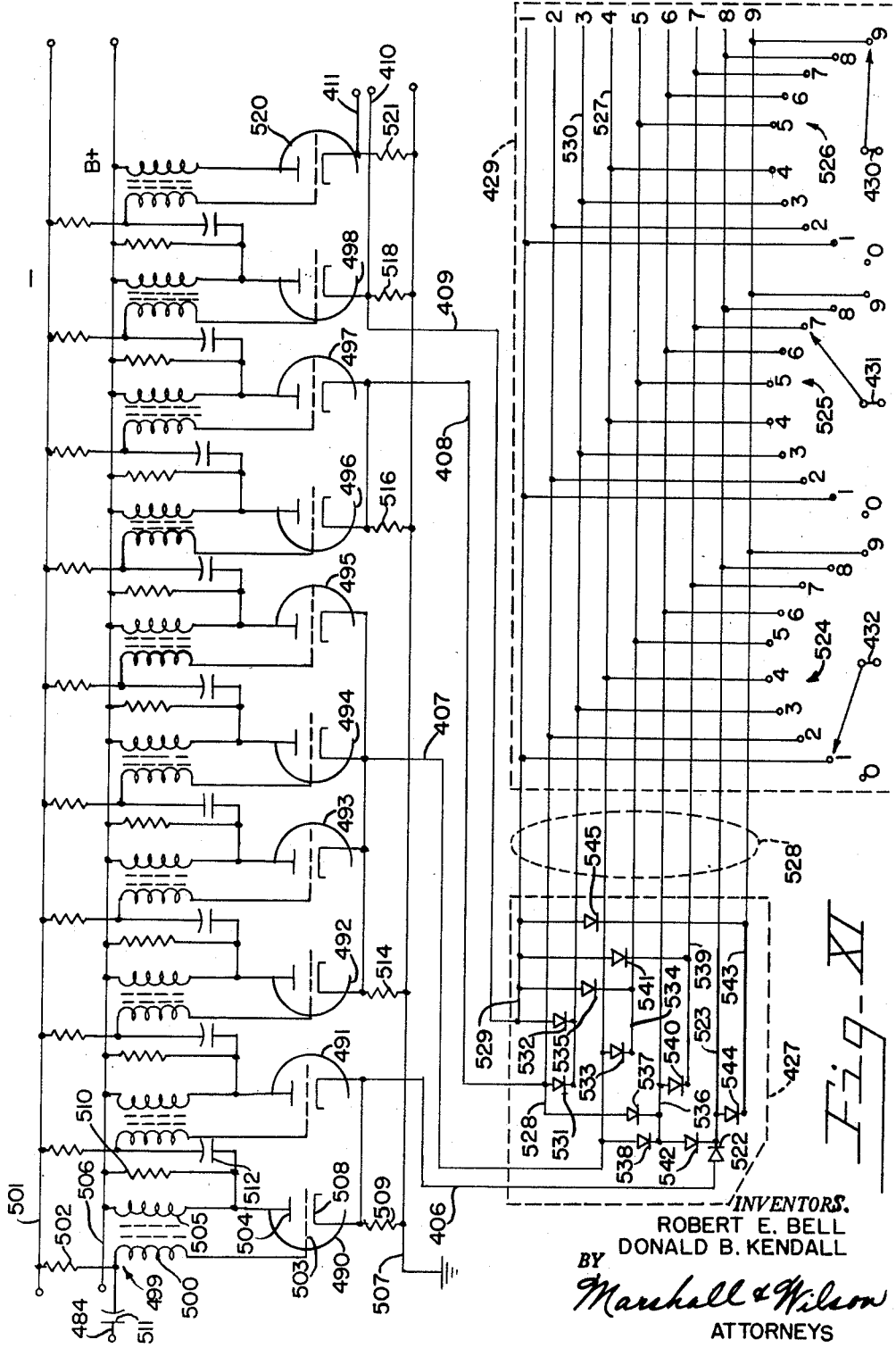

Dec. 29, 1964   R. E. BELL ETAL   3,163,247
CONDITION RESPONSIVE APPARATUS
Filed Feb. 28, 1961   17 Sheets-Sheet 9
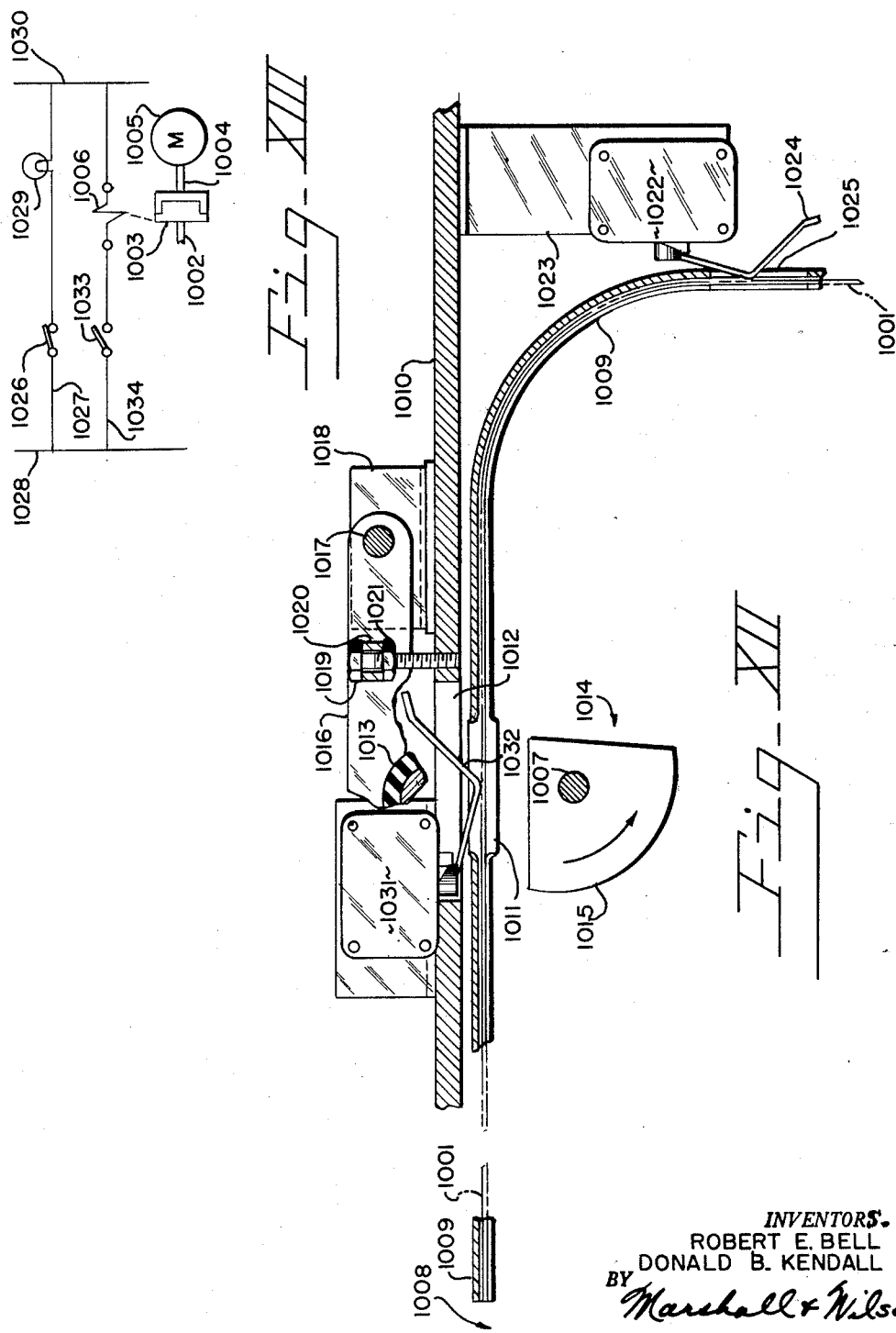
INVENTORS.
ROBERT E. BELL
DONALD B. KENDALL
BY Marshall & Wilson
ATTORNEYS

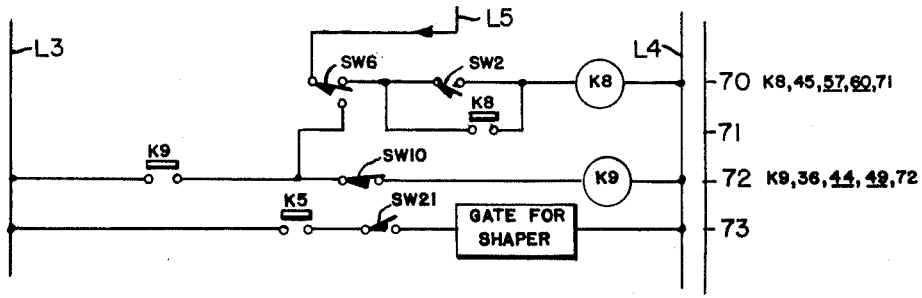
Fig. XXIV
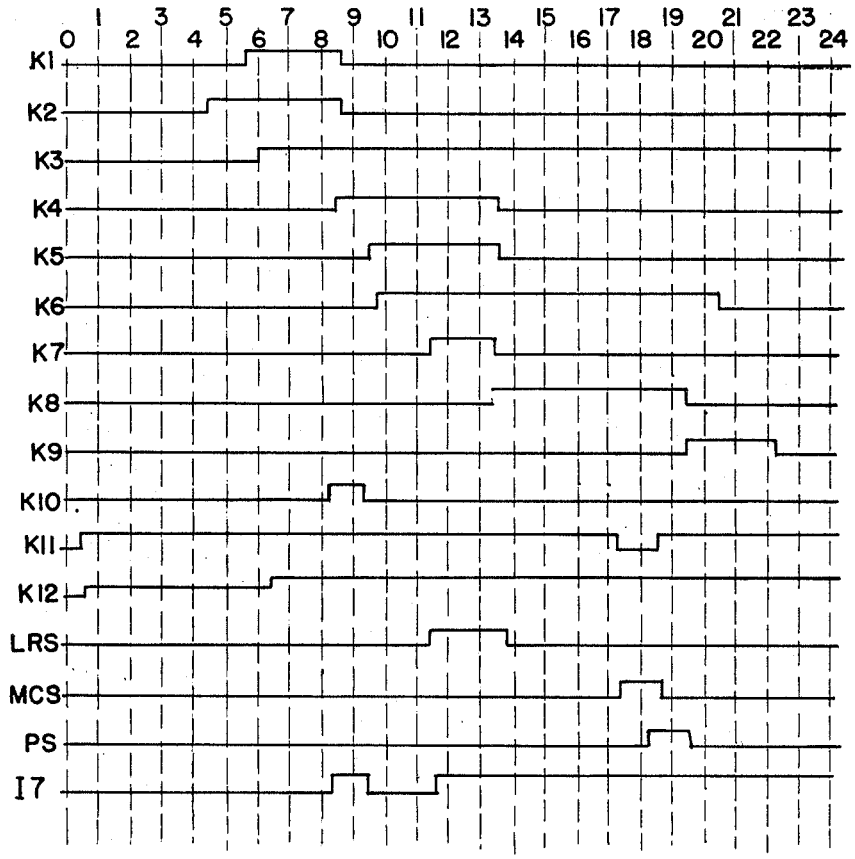
Fig. XIV

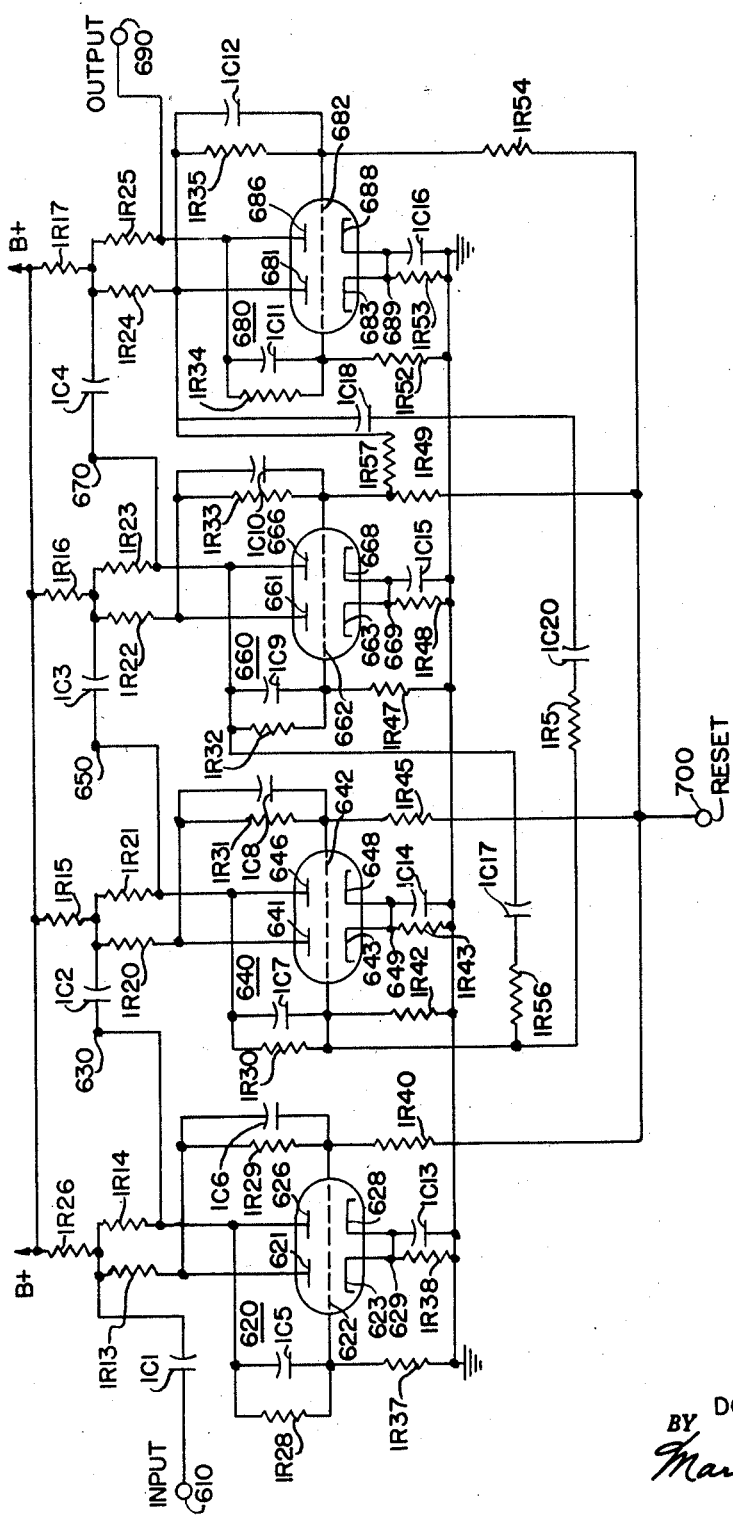

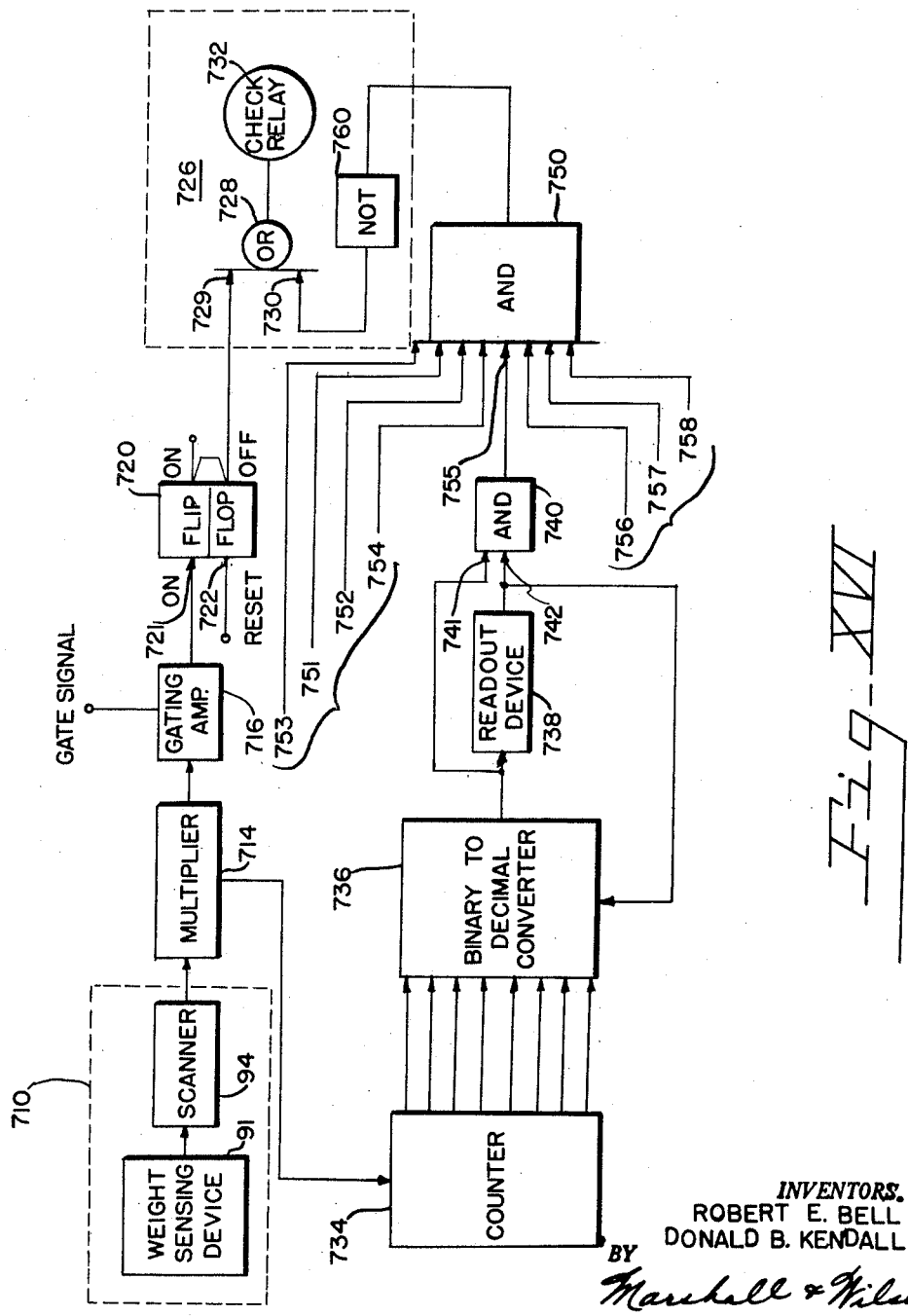
Dec. 29, 1964 R. E. BELL ETAL 3,163,247
CONDITION RESPONSIVE APPARATUS
Filed Feb. 28, 1961 17 Sheets-Sheet 12
Fig. XVI
INVENTORS.
ROBERT E. BELL
DONALD B. KENDALL
BY
Marshall & Wilson
ATTORNEYS Dec. 29, 1964   R. E. BELL ETAL   3,163,247
CONDITION RESPONSIVE APPARATUS
Filed Feb. 28, 1961   17 Sheets-Sheet 13
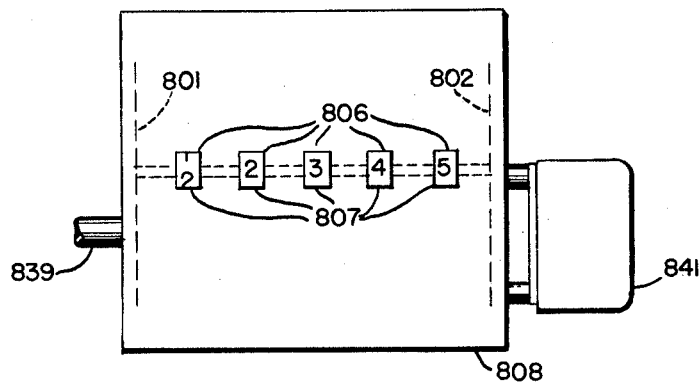
_Fig. XVII_
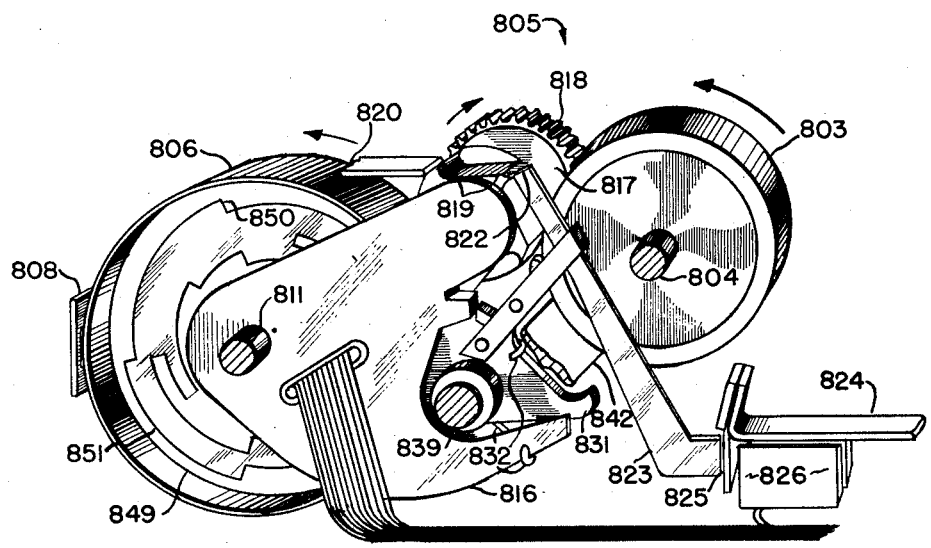
_Fig. XVIII_
INVENTORS.
ROBERT E. BELL
BY DONALD B. KENDALL
*Marshall & Wilson*
ATTORNEYS Dec. 29, 1964   R. E. BELL ETAL   3,163,247
CONDITION RESPONSIVE APPARATUS
Filed Feb. 28, 1961   17 Sheets-Sheet 14
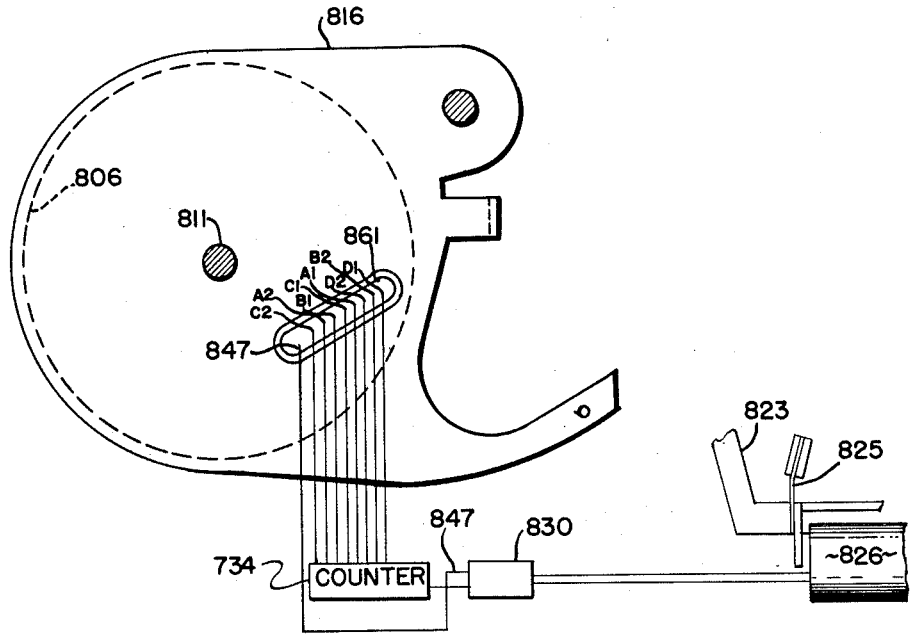
Fig. XIX
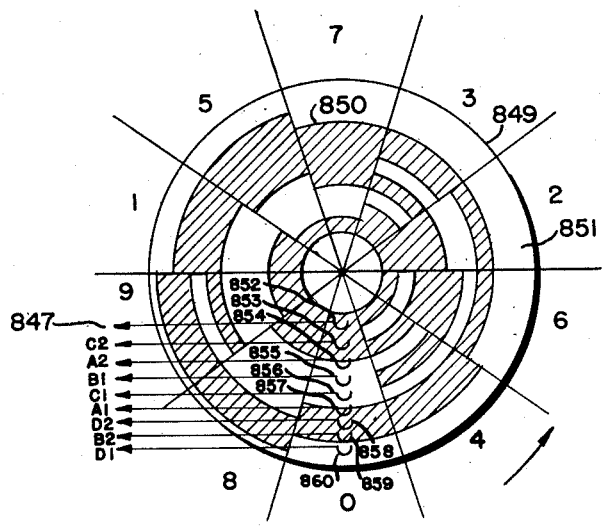
Fig. XX
INVENTOR.
ROBERT E. BELL
DONALD B. KENDALL
BY
Marshall & Wilson
ATTORNEYS

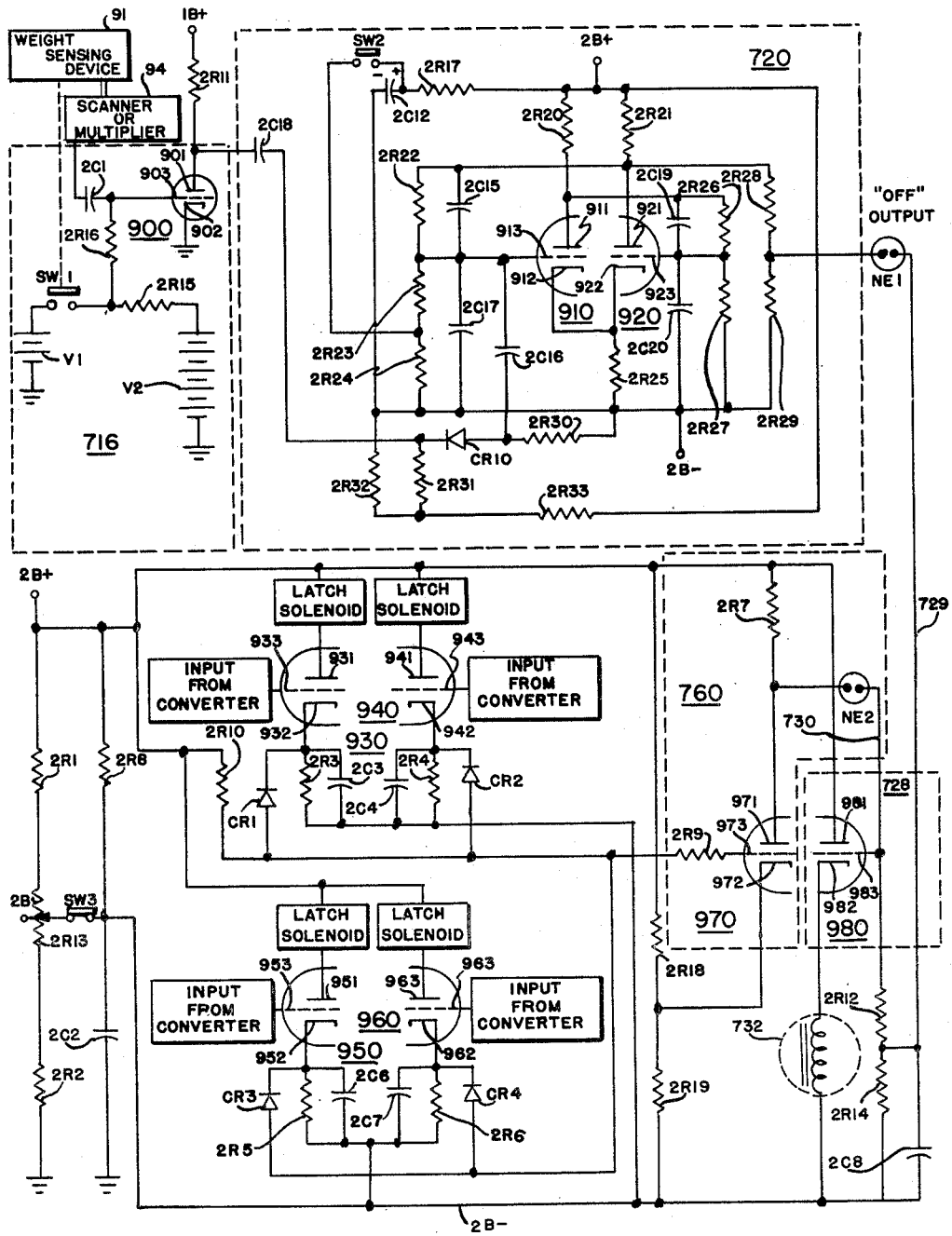
Fig. XXI

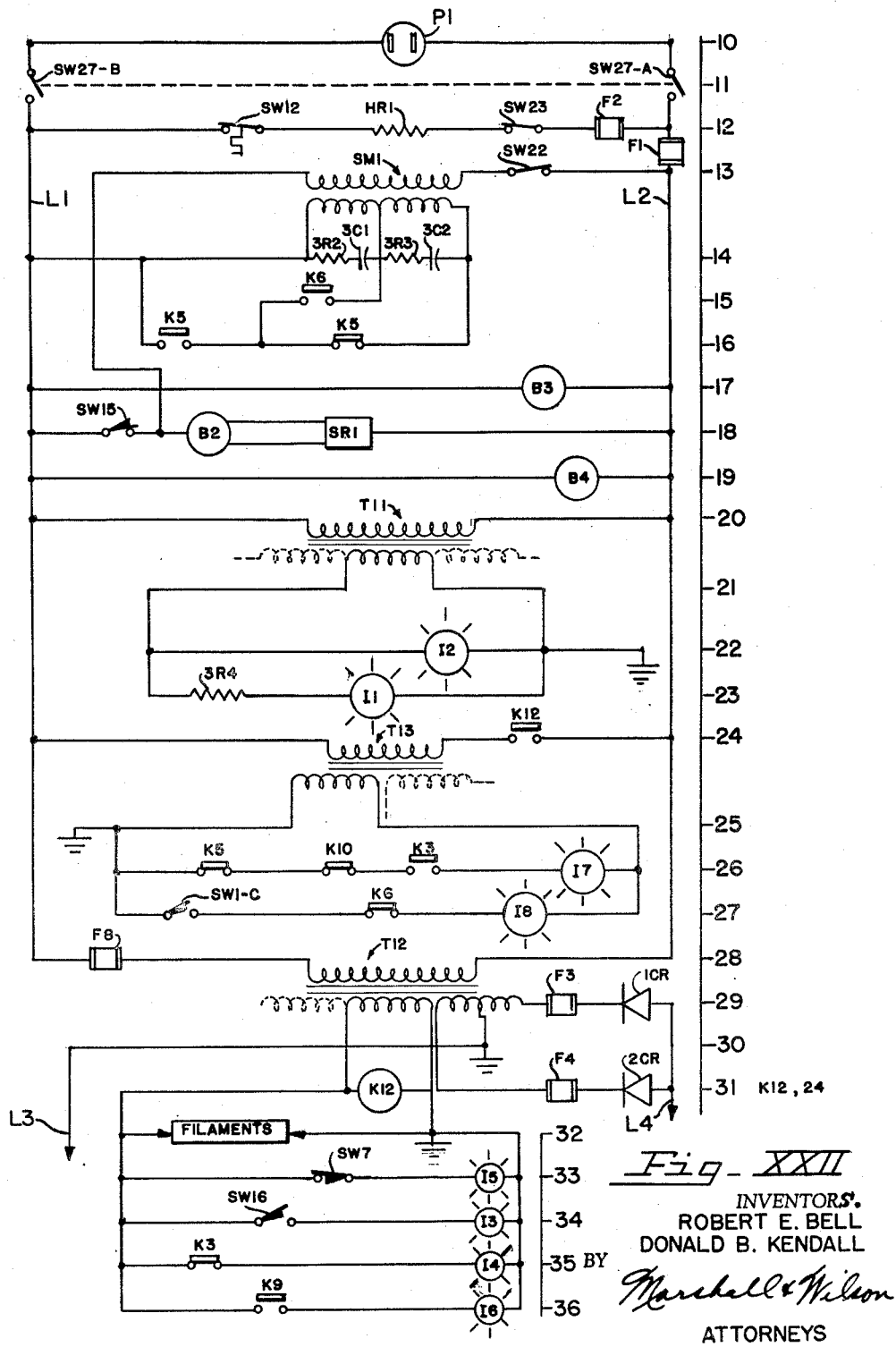

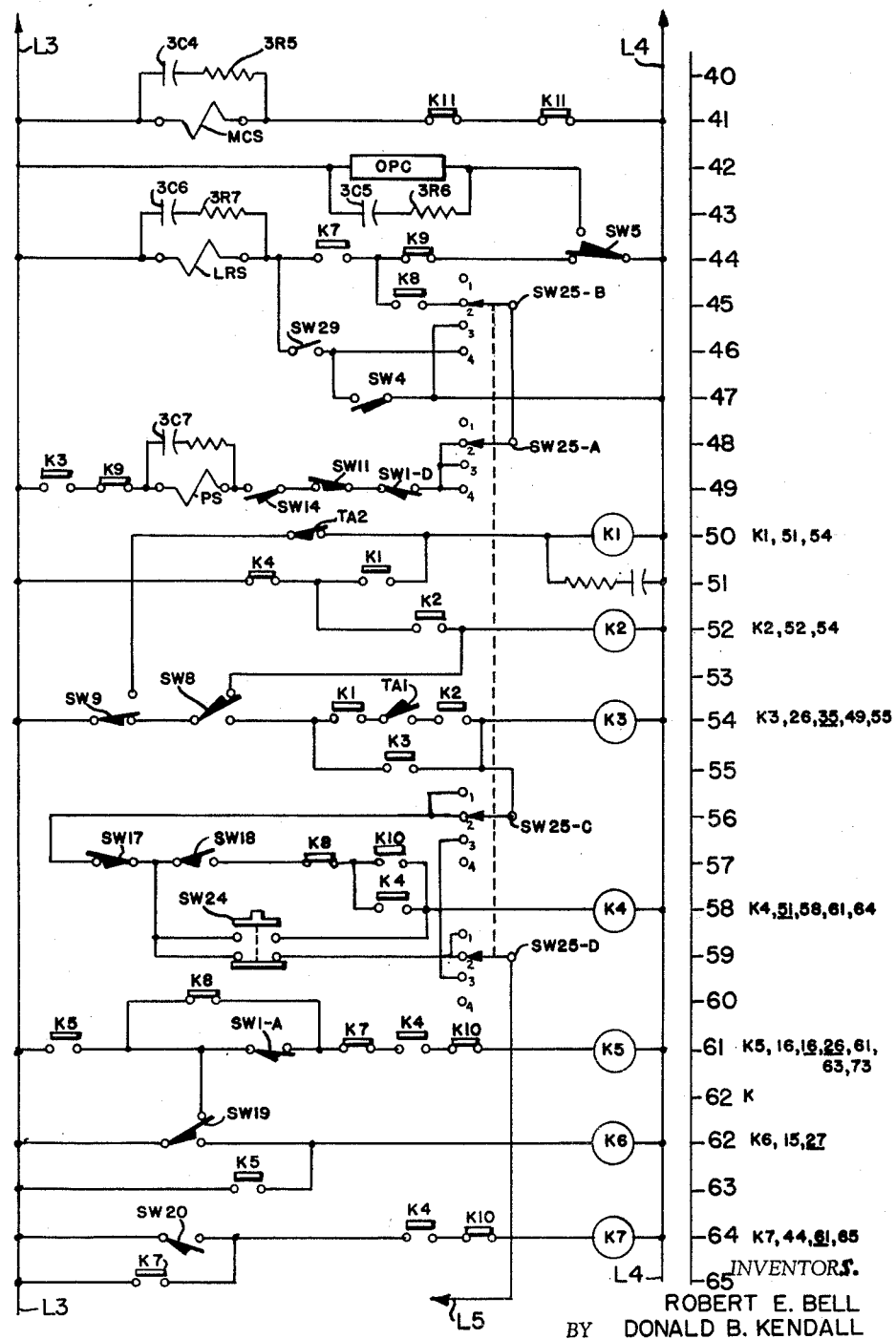

3,163,247
CONDITION RESPONSIVE APPARATUS
Robert E. Bell and Donald B. Kendall, Toledo, Ohio, assignors to Toledo Scale Corporation, Toledo, Ohio, a corporation of Ohio
Filed Feb. 28, 1961, Ser. No. 92,233
5 Claims. (Cl. 177—3)

This invention relates to improvements in condition measuring and indication apparatus and will be particularly set forth and explained as applied to a weighting scale.

Because of the time and possibility of error involved when human operators read the indication given by a condition responsive apparatus, such as a weighing scale, and manually record such indication it is desirable that such reading and recording be done by completely automatic means. It is furthermore desirable in many installations that the recording means be located remote from the apparatus. It is furthermore desirable in many cases that the indication of the condition responsive and indicating apparatus be multiplied by an arbitrarily selected factor. For example, if it is known that a particular material has a moisture content of two percent it may be desired to multiply the reading of a weighing scale by ninety-eight percent so that the net or dry weight of the material is the figure actually shown and recorded. Another use involving multiplication by an arbitrarily selected factor may be found in retail stores where it is desired to compute the money value of a package of goods according to the weight of that particular package and the price per unit of weight of the material. Still another such use is in the counting of small similar pieces by weight wherein the number of pieces per unit of weight is predetermined for each class of piece and that number is the arbitrarily selected factor, the resulting computed amount being the number of pieces in the lot on the weighing scale.

The principal object of the invention is to provide a condition measuring and indicating apparatus which is automatically capable of giving the complete indication of the weight or condition, and if desired the product of such weight or condition multiplied by an arbitrarily selected factor, either digitally or in printed form as may be desired.

A further object of the invention is to give this digital or printed indication at a place remote from the place of use of the apparatus if desired.

It is a further object of this invention to provide an electronic computing scale which automatically issues a label, when a package is placed on the scale, the label having printed thereon the price per pound, the net weight of the package, and the total value of the package. The label may also have printed thereon a commodity name and grade classification, code dates, and store identification numbers.

A still further object is to provide an electronic computing scale having a sequential operation in which a new weighing cycle may be initiated before a printing operation concluding a previous cycle is completed. That is, weight and value information can be stored in the computer in the embodiment shown, as well as in the printer. This permits weighing and computation for a new package while the ticket is being printed for the previous package, reducing the processing time for each package.

Another object of this invention is to provide an electronic computing scale having an interlock preventing a scanning operation from starting during a readout cycle.

Still another object of this invention is to provide a digital electronic computing scale having multiple storage elements to provide a gain in processing time, having a uniform operating cycle virtually independent of the weight of the package obtained through the use of photoelectric means in collecting data and thus having no physical attachment to the weighing means, having a check circuit to check the correct operation of the system, having a motion detector with a logic circuit to initiate cycles and speed operation of the system, and having various system interlock features to be described in detail hereinafter.

The invention consists in condition measuring and indicating apparatus having a movable condition responsive member along the path of which there extends a stationary chart having graduations which are variably exposed according to the position of such condition responsive member, said chart being read by photoelectric means to produce, in correspondence with the exposed chart graduations, a series of photoelectric impulses which are supplied to and counted by an electronic counting means, and the system by which all functions may be obtained automatically.

A preferred form of the invention is illustrated in the accompanying drawings, in which:

FIGS. I and II are schematic block diagrams illustrating the general organization of the equipment for reading a condition responsive member of a condition measuring and indication apparatus and indicating such reading in digital form suitable for recording and also multiplying such reading by an arbitrarily selected factor and indicating the product also in a form suitable for visual indication or recording;

FIG. III is a perspective, schematic view of the indicating mechanism of a weighing scale utilized in this invention;

FIG. IV is a block diagram showing the cooperation of the various electrical circuits utilized in motion detection interlocking;

FIG. V is a schematic wiring diagram of a control circuit used for detecting relative motion of the parts of the weighing scale;

FIG. VI is an enlarged view of scanning apparatus;

FIG. VII is a fragmentary schematic view showing the fixed part and movable mask illustrated in FIG. VI;

FIG. VIII is a schematic diagram of an amplifying circuit to be utilized with FIG. VII;

FIG. IX is a diagram of a waveform at a selected point in the apparatus of FIG. VIII.

FIG. X is a schematic diagram of an amplifier and pulse shaper for applying pulses to a pulse generator or multiplier;

FIG. XI is a schematic diagram of a preferred form of pulse generator and switching means arranged to energize a plurality of ten point selector switches, one for each output line;

FIG. XII is a fragmentary vertical sectional view of label or ticket strip feeding means;

FIG. XIII is an electrical wiring diagram showing the electrical operation of the apparatus of FIG. XII;

FIG. XIV is a timing diagram illustrating the sequence of events occurring during the operation of this invention;

FIG. XV is a schematic diagram of a decade counter suitable for use in this invention;

FIG. XVI is a block diagram of an embodiment of check circuitry for use in this invention;

FIG. XVII is a front elevational view showing an assembled numerical display or printing readout device comprising five indicia bearing drum members, four of which are stopped in indicating position;

FIG. XVIII is an oblique view of one of the duplicate assemblies comprising the readout means shown in FIG. XVII;

FIG. XIX is a fragmentary side elevational view with parts broken away showing one of the indicia bearing drum members and a rockable support member together with a circuit controlling the indication of a count to the readout device from the counter;

FIG. XX is a diagram of brushes and a commutator, mounted in the drum member, that are used in the circuit controlling the indication of a count;

FIG. XXI is a schematic diagram of certain of the components shown in block form in FIG. XVI; and FIGS. XXII, XXIII, and XXIV are schematic diagrams of the master control and sequencing circuit of the invention.

Referring to FIGS. I and II there is illustrated in block schematic form an electronic computer scale embodying the teachings of this invention. The system consists of three primary units. First, there is the scale and scanner unit which includes a weighing mechanism 91, a motion detector 92 and a scanner 94. Secondly, a computer is illustrated including a pulse shaper-blocking oscillator section 97, a multiplier 98, weight counters section 99, and value counters section 104. The last of the three primary units comprises a readout printer which includes the readout circuits, a check circuit 100, and the printer 107.

A general description of the operation of each of the components is deemed advisable as a preliminary so that the description of the detailed portions hereinafter may be more readily assimilated in the operation of the entire system.

The weighing mechanism 91 includes a scale chart having two sections, a weight portion in fractions of a pound decimal graduations and a separate column of a plurality of lines used in conjunction with the motion detector. The weight portion of the scale chart is projected for visual indication. A scanner shutter or mask is mounted on a scale chart lever. When a load is applied to the commodity receptacle the shutter moves with the chart lever, exposing one line on the scanner chart for each unit of weight of load applied. The scanner 94 will not begin to scan when a load is applied to the commodity receptacle until the weighing mechanism 91 comes to rest. This prevents erroneous weight readouts and is accomplished by the function of the motion detector 92. The motion detector consists of a light source, a chart, a photocell, a motion detector sub-chassis and a relay. The cooperation of these primary components will be described hereinafter with the detailed description.

When the scale mechanism is in motion, the constant light on the detector photocell is interrupted by the lines of the motion detector chart. These interruptions or variations in light on the photocell cause the photocell to produce an electrical pulse for each interruption or variation in light. This output is coupled to the input of the motion detector sub-chassis which, in turn, provides the proper voltage to energize the motion detector relay which is mounted in the control unit 93. As long as the scale mechanism is in motion and the detector photocell is providing an output the detector relay will remain energized and the scanner will not scan. When the scale mechanism comes to rest the detector photocell output drops, the detector relay is deenergized, and the scanner 94 will scan.

The scanner unit 94 converts the travel of the scale lever system to electronic pulses. These pulses are coupled to the computer section to provide weight and value computations. The scanner has four primary components as follows; a light source (which may be the same light source as used for the motion detection), a scanner chart having a plurality of lines where each line represents a decimal fraction of a pound, a scanner photocell and a photo amplifier. If the scale chart were a 25 pound capacity decimal chart and a 2500 line scanner chart was utilized as being equal to the scale chart capacity, then each line on the scale chart would represent .01 of a pound. Therefore, for example, a two pound load on the commodity receptacle would cause a projected weight indication of two pounds and 200 lines of the scanner chart would be exposed by the shutter. The scanner light source scans the 200 exposed lines on the scanner chart projecting a ray of light through the chart onto the scanner photocell for each line on the chart exposed. The photocell converts each light ray into an electrical pulse which is coupled to the input of the photo amplifier 95. Since the output of the photocell is quite small, the pulses are advantageously amplified before being coupled to the computer section. The purpose of the photo amplifier, therefore, is to provide the necessary amplification of the electrical pulses produced by the photocell.

The scanner has two other functions. A first function is to create a reset pulse which resets the computer to zero. Secondly, a gate pulse is created to tell the computer when it is going to start to scan and when it has completed the scan.

The amplified pulses from the photo amplifier 95 of the scanner are coupled via a lead to the blocking oscillator in the shaper sub-chassis. The purpose of the blocking oscillator is to convert or shape each pulse received into a pulse of short duration with a fast rise time. These shaped output pulses from the blocking oscillator are identical in amplitude, rise time and pulse duration. The output pulses are then coupled to the input of the multiplier 98.

The multiplier 98 comprises ten individual blocking oscillator circuits similar to the one in the shaper. The purpose of the oscillators is to generate ten output pulses for each pulse received from the shaper. The first nine pulses are used for computing the value of the commodity and the tenth pulse is presented to the weight counters to provide commodity weight data. When a pulse from the shaper is coupled to the multiplier input, the first blocking oscillator fires, creating an output pulse similar to the first pulse. This pulse is then coupled to the second stage, causing it to fire. This output is then coupled to the third stage and so on until all ten blocking oscillators have fired. This is one method of producing ten output pulses for each input pulse.

The two gated amplifiers of the shaper section 97 have identical outputs. One output is coupled to the weight counters 99 for total weight data and the other to the computer check flip flop 100 located in the readout section. This output is used as part of the check circuitry designated generally at 108.

The four weight counters the outputs of which may be, for example, denoting 10 pounds, 1 pound, .1 pound, and .01 pound, are reset to zero just before the light source scans the scanner weight chart. For each weight line scanned one pulse will be presented to the input of the .01 decade counter. When ten pulses have been coupled to this counter input, the counter creates a carry pulse which is then coupled to the next counter. This accomplishes the "carry 1" as in the normal process of addition. The .1 pound counter receives one pulse for every ten pulses fed into the .01 pound counter. Eventually, after receiving ten pulses or counts from the .01 counter, the 0.1 counter also creates a carry pulse which is coupled to the 1 pound counter. The output of each decade counter is taken from the counter on eight wires. Each output is coupled to its corresponding indicating wheel in the readout section.

The function of the diode matrix 102 is to organize the output of the multiplier blocking oscillators so that the proper number of pulses will be present at each contact point of the price selector switch boards 103 for each weight pulse. For example, if a one pound load is placed on the commodity receptacle, the scanner will scan one hundred exposed lines on the scanner chart. The scanner photocell output will be one hundred pulses. These one hundred pulses are fed through the photo-amplifier 95 and the gated blocking oscillator to the input of the multiplier blocking oscillators. Each input pulse is developed into ten output pulses. One of each group of ten output pulses is fed to the weight counters 99 (each pulse here represents .01 pound) thus providing necessary data for weight determination. The other nine pulses are fed to the diode matrix input. Therefore, for every weight pulse, which represents .01 pound in this embodiment, nine subsequent pulses are fed to the input of the diode matrix. In the present example the total input to the diode matrix will be one hundred groups of pulses with nine pulses in each group.

For each .01 pound counted, the diode matrix output presents a number of pulses to each contact point of the three price selector switch boards equal to the value of the board contact point position. For example, the zero contact point on each board does not receive any pulses. The No. 1 contact on each board receives one pulse each, the No. 2 contact on each board receives two pulses each, etc. Each contact point on each board is presented its corresponding number of electrical pulses for each cycle regardless of the price per pound switch arm positions. The portion of the output of the diode matrix which becomes the input to the value counters, however, is determined by the positions of the price per pound selector switch arms. For example, assume the price per pound setting is $1.25. The contact brush on the penny arm of the price selector will be at the No. 5 contact of the penny board. This allows five pulses from the diode matrix to pass through the penny board to its respective gated amplifier in the carry storage sub-chassis. The five pulses are amplified and presented to the value counters 104 as penny data. The contact brush on the dime arm of the price selector will be at the No. 2 contact of the dime board. This allows two pulses from the diode matrix to pass through the dime board to its respective gated amplifier in the carry storage sub-chassis. The two pulses are amplified and presented to the value counters as dime data. The contact brush on the dollar arm of the price selector will be at the No. 1 contact of the dollar board. This allows one pulse from the diode matrix to pass through the dollar board to its respective gated amplifier in the carry storage sub-chassis. The one pulse is amplified and presented to the value counters as dollar data. From the above it can be seen that a value is established for each .01 pound of load on a commodity receptacle to determine the total commodity value. The value established it, of course, determined by the price per pound switch set up.

There are three gated amplifiers in the carry storage sub-chassis which amplify the input to the value counters 104, one amplifier for each of the three commutator boards of the price selector switch and their respective value counters. The amplifiers are required to insure that the voltage of the input pulses to the value counters is sufficient to fire the counter tubes. The following explanation shows how value data is presented and accumulated in the value counters for each weighing operation using a load of one pound and a price per pound of $1.25 as an example.

For each weight pulse or .01 pound of load on the commodity receptacle the input to the value counters is: (1) five pulses through the penny commutator of the price per pound switch are amplified and fed to the .0001 value counter. (2) Two pulses through the dime commutator of the price per pound switch are amplified and fed to the .001 value counter. (3) One pulse through the dollar commutator of the price per pound switch is amplified and fed to the .01 value counter. From the above three steps and the example of $1.25 per pound, it can be seen that each weight pulse or .01 pound is equal in value to $.0125. The load example is one pound, therefore there will be one hundred weight pulses. In this case the total input to the value counters will be one hundred groups of pulses with each group having a value of $.0125. This then provides a total value of the commodity weighed in the example of $1.25. In the example above, the first weight pulse (.01 pound) will cause the first group of value pulses to record $.0125 in the value counters. The second group of pulses will add another $.0125 to the value counters changing the counters to $.0250. The third group of pulses will add another $.0125 to the value counters changing the value counters to $.0375, etc.

It is possible under the arrangement above for the normal carry pulse (that pulse carried from one counter to the next when the tenth pulse has been coupled to a counter causing the counter to reset to zero and carry one pulse) to occur at the same instant value pulses are being fed into the counters. To prevent such an occurrence, which could result in erroneous values, carry pulses are not fed to the next counter until all value pulses created by one weight pulse are fed into the counters. This is accomplished by a memory or carry storage flip flop circuit. After all value pulses, created by one weight pulse, are fed into the counters the carry pulse is fed from the carry storage sub-chassis into the next counter. The block diagram shows that only the carry pulses from the .0001 and the .001 decade counters are fed to the carry storage flip flop. Carry pulses from the .01, .1 and 1 counters are coupled directly into the next stage counter as there is no direct input to the .1, 1 and 10 counters which would cause the carry pulse to be in conflict.

The readout uses the output of the weight and value decade counters to properly position a visual indicating wheel, and to set up a corresponding print wheel, indicating the weight and total value of the commodity weighed. The readout also has a check circuit which ascertains that both the print wheels and visual readout wheels are properly positioned before signaling the printer 107 to operate.

The weight and value sections of the readout operate in a like manner, therefore, for purposes of explanation the output of the .01 (penny) value decade counter in its respective indicating wheel, the penny readout wheel, will be explained. Assume the total value of the commodity weighed is $1.25. The digit "5" must be set up on the penny indicating wheel, from the output of the .01 value counter. Each decade counter is a standard counter having four dual triode tubes and each tube contains a left and right anode. When the .01 value counter has been pulsed to the digit "5", the No. 1 anode in the A and C tubes and the No. 2 anode in the B and D tubes are more positive, indicating these anodes are providing a higher voltage output than the other anodes in each tube. There is a prong on each readout wheel commutator brush for each anode in the decade counter tubes. As shown in FIG. XX there are eight brush prongs corresponding to the number of tube anodes plus one common prong. Each anode and its respective brush prong are wired together. The common prong of each brush is wired to the readout wheel trigger amplifier.

The readout wheel will lock in the "5" position, in this case, because the following tube anodes are providing higher voltage output than the other anodes, that is A1, B2, C1 and D2. The commutator brush prongs having the above-mentioned anode descriptions are the prongs which are receiving a sufficient combined voltage output to fire the tube in the trigger amplifier. When the tube is fired the trigger relay is energized and the relay finger initially locks the wheel. In this case, the wheel will only lock in the "5" position as only in that position will the A1, B2, C1 and D2 prongs on the commutator brush be connected by the common prong to the trigger tube.

All eight trigger amplifiers send their check signal to the check circuit amplifier along with a signal from the computer check flip flop. The check circuit amplifier portion of the readout has two primary functions: first, to make certain that all commutator wheels are properly positioned; and secondly, to make certain that a signal from the computer check flip-flop is received indicating that a weight has been placed on the scale platter. When the scanner has completely scanned the chart, a signal is sent to the control unit, which, in turn, creates a signal energizing the latch release solenoid. The latch release solenoid in turn unlocks the indicating wheels from their previous setting and lets them rotate. Each commutator wheel selects the number which corresponds to its respective decade counter. The trigger amplifier energizes the trigger relay, locking the wheel in proper position. Providing a check pulse from the gated amplifier in the shaper has been presented to the computer check flip flop in turn coupling a signal to the check circuit amplifier 18, and if all the trigger amplifiers are checking on the proper number, the check circuit amplifier pulls the mechanical check solenoid. The check solenoid releases the mechanical checking device which acertains that all indicating wheels are properly positioned mechanically. If positioned properly a set of contacts are closed and the print solenoid is energized, allowing the printer to cycle.

The indicating wheels mentioned above are coupled via a group of idler wheels to the print wheels. Therefore, when the indicating wheels have been locked in their proper position, the print wheels are also locked in the same position. After the print solenoid is pulled, the carriage travels from left to right, inking the print wheels. A label is then positioned and as the carriage returns the label is printed and cut off. When the carriage reaches the "home" position the label is delivered to the activator unit. This label must be removed from the activator unit before the next label can be printed.

Referring to FIG. III there is shown a weighing mechanism and a motion detector suitable for use in the system shown in FIGS. I and II. A load receiver or commodity receptacle 110 is carried on a spider 111 that is pivotally mounted on a lever 112 having spaced apart arms 113 and 114. The lever 112 is carried on fulcrum stands 115 of which only one is visible in the figure. A check link, not shown, is employed to keep the load receiver 110 in a level condition at all times. Such check links are well known in the weighing scale art. Load counterbalancing springs, not shown, that are connected between the lever arms 113 and 114 and a rigid support are arranged so that the vertical movement of the free ends of the lever arms 113 and 114 is proportional to the weight of the load placed on the load receiver 110. A light weight frame 118, supported on a cone pivot 119 mounted in the center of a cross bar 120 connecting the ends of the lever arms 113 and 114 and guided by check links 121 and 122, serves as a support for a movable projection chart 123 and for a mask 124. The frame 118 is provided with the three point support, i.e. the pivot 119 and the check links 121 and 122, so that it is not subjected to any bending or twisting strains that would tend to distort it and so that it follows the average motion of the lever arms 113 and 114 regardless of the distribution of load on the load receiver 110.

Visual indications of the load on the scale are provided by an optical projection system that projects enlarged images of the graduations of the projection chart 123 onto a screen 126. The optical projection system includes a light source 127, a condensing lens 128, a projection lens 129, mirrors 130, 131 and 132 and the screen 126. In addition to providing the visual projected indication on the screen 126 the optical projection system also projects images of the left hand portion of the chart lines as seen in FIG. III onto a photocell 134 that cooperates with electronic equipment to provide a signal indicating relative motion between the indicating mechanism of the scale and the frame of the scale.

The indicating system also includes scanning means for delivering or providing a series of electrical impulses corresponding in number to the weight of the load on the scale. This indicating means includes a second light source 135 and condensing lens 136 which together with a projection lens 137 and mirror 138 are mounted on an oscillating arm 139 that is driven by a motor 140 by means of a crank and connecting rod 141. This moving optical system scans a stationary chart 142 that is variably masked by the mask 124 and projects images of the exposed graduations onto a stationary photocell 143. Electronic amplifying and counting means, described hereinafter, connected to the photocell 143 give an indication of the weight of the load in accordance with the number of images of the exposed graduations that are swept across the photocell by the movement of the moving optical system. The photocells 134 and 143 are each provided with masks or slots approximately equal in width to the width of a projected graduation line so as to get the maximum signal output from the photocell for each graduation that is swept across the cell.

In the complete indicating system electronic means are employed to respond to the signals generated in the photocells 134 and 143 to provide an indication of weight only after the weighing mechanism has come to rest and an accurate reading may be taken. This equipment, as indicated in block form in FIG. IV, may include a scanner 150 which includes the optical system comprising the light source 135 and the projection lens 137 up to and including the photoelectric cell 143 and any preamplifier used therewith. Electrical pulses from the scanner 150 are passed through an amplifier 151 and gate 152 into an electronic multiplier 153. The electronic multiplier 153 is arranged to feed a plurality of pulses into an amount counter 154 in accordance with a price set up in a price setting mechanism 155. The multiplier 153 also delievers one output pulse for each pulse received to a weight counter 156. The signals to the weight counter 156 may just as well be taken from the output of the gate 152 without passing through the multiplier 153 except that the arrangement shown insures that no indication will be produced in the weight counter 156 unless the multiplier 153 is in operating condition.

To guard against the possibility of a fractional or incomplete scan being read as a complete scan a scan detector 157 serving as a first gate is connected to the output of the amplifier 151 and includes electronic circuits responsive to the envelope of the series of pulses produced by the scanner 150 and arranged to deliver a signal to a reset amplifier 158 to reset the counters 154 and 156 at the start of each scan. This reset occurs on the first pulse of a scan which preferably is produced by a single graduation or line spaced about five units ahead of the regular series of graduations of the chart 142. The scan detector 157 also operates the gate 152.

When a system is to be operated automatically it is also necessary to prevent signals from the scanner from reaching the multiplier and, through it, the amount and weight counters unless the scale is at rest in order that the indications be indicative of the actual load on the scale. This is accomplished by means of the photocell 134 included in the photo-pickup circuit 159 which in cooperation with an amplitude and frequency filter 160 controls the scan detector 157 to prevent it from opening the gate 152 unless the weighing scale is substantially at rest and a scan is ready to start.

The circuits comprising the photo-pickup 159 and the amplifier and frequency filter 160 are a form of motion detector. For satisfactory operation of such a motion detector in high speed operating equipment it is necessary that the detector respond very quickly to relative motion exceeding a certain amount and also deliver an all clear or quiescent condition signal immediately upon the system reaching a quiescent state. Circuits employed in the photo-pickup 159 and amplitude and frequency filter 160, as shown in FIG. V, provide quick response and quick recovery as well as being able to distinguish small quick movements of the weighing scale of an amplitude not sufficient to materially affect the accuracy from larger slower movements which would affect the accuracy of recording.

The electronic circuits included in the photo-pickup 159 and the amplitude and frequency filter 160 are illustrated in detail in FIG. V. These circuits include a first stage A including a duotriode tube that serves as a two stage amplifier for amplifying the signals from the photocell 134. A second stage B including a duotriode tube serves as an amplitude filter in that it responds only to signals exceeding a certain level as delivered by the first stage and delivers an invariant sharp-sided pulse for each received signal. A third stage C including a duotriode serves as a single cycle oscillator or, as illustrated, a monostable multivibrator that responds only to those pulses received from the second stage B while it is in its stable state. The third stage C or single cycle oscillator serves as a frequency filter in that it responds to each pulse received from the trigger stage B as long as the pulses occur at a low repetition frequency and responds to less than all of the pulses when the pulses arrive at a higher frequency thereby producing output pulses that never exceed a certain repetition frequency. This repetition frequency is selected by design to correspond to the frequency of the pulses generated in the photoelectric cell 134 when the indicator is moving just rapidly enough to cause an objectionable error if a recording is taken. With a weighing scale, as illustrated in FIG. III, having a natural period of ½ to ¾ of a second the recovery time of the monostable multivibrator of stage C is adjusted to be in the order of 25 to 30 milliseconds. Thus the maximum output frequency of the multivibrator is in the order of 30 to 40 cycles per second. The maximum frequency applied to the multivibrator through the trigger circuit B may, for large changes of load, be several thousand cycles per second.

The output pulses from the multivibrator or single cycle oscillator C are counted and applied through an output control stage D including a duotriode. This stage delivers an output signal whenever the input frequency rises above a certain predetermined frequency which signal is used to block or control the scan detector 157 and thus prevent the transmission of pulses into the multiplier and weight counters unless the scale is substantially at rest.

Referring to the circuits in detail, stages A, B, and C are supplied with electrical power from a B+ line 165, one portion of which extends along the bottom of the diagram and another portion along the top. The circuits are all returned to a grounded line 166 extending along the bottom of the diagram just above the lower B+ line 165. The photocell 134, having two conductive elements 134-A and 134-B connected in series, is supplied from the B+ line through a voltage divider comprising resistors 167 and 168, the resistor 168 being in parallel with the photocell so as to limit the voltage applied to the photocell 134 to the recommended value. The B+ voltage supplied to the voltage divider comprising the resistors 167 and 168 is stabilized or filtered by a relatively large condenser 169 connected between the B+ lead 165 and the grounded lead 166.

The center tap between the photocell sections 134-A and 134-B is connected through a coupling condenser 170 to a first control grid 171 of the duotriode of stage A. Proper grid voltage for this grid 171 is maintained by a grid resistor 172 connected between the grid 171 and the grounded line 166. The duotriode of stage A serves as a two stage amplifier having plate resistors 173 and 174 connected between the B+ line 165 and plates 175 and 176 respectively. Cathodes 177 and 178 are connected to the ground line 166 by way of cathode resistors 179 and 180. To increase the voltage drop across the cathode resistors 179 and 180 beyond that supplied by the plate current flow through the individual triode sections resistors 181 and 182 are connected between the B+ lead 165, at the bottom of the diagram, and the cathodes to thus increase the grid-cathode bias without increasing the cathode circuit resistance.

The plate 175 of the first triode section of the tube of stage A is connected through a coupling condenser 183 to a grid 184 of a second section of this tube which grid is also connected to ground through a grid leak resistor 185. The plate 176 is also connected through a resistor 186 and parallel condenser 187 to the cathode 177 to provide an inverse feedback circuit thus stabilizing the gain of the amplifier.

The second plate 176, the output plate of the duotriode, is connected through a condenser 188 to an intermediate point 189 of a voltage divider comprising a resistor 190 connected to B+ and to the point 189 and a series combination of a potentiometer 191 and resistor 192 connecting the point 89 to the ground lead 166. A slider 193 of the potentiometer 191 is connected to a first grid 194 of the second duotriode which is connected to operate as a trigger circuit. For this use plates 195 and 196 of the two triode sections making up the duotriode are connected to the B+ lead 165 through plate resistors 197 and 198, respectively, while cathodes 199 and 200 are connected through a common cathode resistor 201 to the grounded lead 166. The first plate 195 is connected to a voltage divider comprising resistors 202 and 203 to the grounded lead 166 with the intermediate point between the resistors connected to a control grid 204 of the second section of the duotriode of stage B. Furthermore the first resistor 202 of the divider is bypassed with a small condenser 205. In this circuit the plate resistors 197 and 198 have resistances of approximately 30,000 ohms each while the common cathode resistor has a resistance of approximately 15,000 ohms. The voltage divider comprising resistors 202 and 203 is arranged such that approximately 45 percent of the voltage appearing at the plate 195 is applied to the grid 204.

This circuit acts as a trigger circuit with the second plate 196 and cathode 200 normally drawing current since the current flow through the second plate 196 and cathode resistor 201 is sufficient to raise the potential of the cathode 199 sufficiently above the potential at the slider 193 of the potentiometer 191 that current flow through the first triode section of stage B is cut off. However, a positive voltage signal applied to junction point 189 of the voltage divider raises the potential of the grid 194 so that the first section conducts current as long as the potential is held positive and the resulting current flow through the plate resistor 197 drives the grid 204 sufficiently negative to cut off current flow through the second triode section. Because of the amplifying action and the positive feedback provided by the common cathode resistor 201 the transfer of current flow from one section to the other occurs instantaneously when a certain potential is reached by the grid 194. The amplitude of the signal required to reach this potential is adjusted by varying the position of the slider 193 along the length of the potentiometer 191. This circuit thus affords an adjustable threshold limit which the incoming amplified signals must exceed before the trigger circuit B responds to the signals. It thus constitutes what may be known as an amplitude filter that passes only the larger amplitude signals.

The substantially square wave output appearing at the plate 196 of the trigger stage B is differentiated through a coupling condenser 206 and resistor 207 to provide sharp spikes or pulses of voltage corresponding to the sides of the square wave output of the trigger stage. The resistor 207 is bypassed with a crystal rectifier 208 to suppress the positive pulses of voltage which would otherwise appear at the junction between the condenser 206 and resistor 207. The negative spikes of voltage are coupled through a condenser 209 to a normally conducting grid 210 of a monostable multivibrator constituting stage C. The grid 210 is connected to the B+ lead 65 through a resistor 211 which may be in the order of four megohms resistance. The grid is also connected through a timing condenser 212 to a plate 213 of the first section of the duotriode of stage C of which the grid 210 is part of the second section. The plate 213 is fed from the B+ lead 165 through a resistor 214 and potentiometer 215 the combined resistance of which is in the order of 12,000 ohms. Cathodes 216 and 217 of this tube are connected to the grounded lead 166 through a common cathode resistor 218 having a resistance in the order of 15,000 ohms. A second plate 219 cooperating with the grid 210 is fed through a plate resistor 220 having a resistance of approximately 30,000 ohms and is also connected through a voltage divider comprising resistors 221 and 222 to a grid 223 of the first section of the duotriode of stage C. The resistors 221 and 222 are bypassed with small condensers 224 and 225 to improve the high frequency response of the voltage divider.

In the absence of input signals from the trigger stage B transmitted through the coupling condenser 209, the monostable multivibrator, which is a form of single cycle oscillator, is in its quiescent state or stable state with a second section of the tube conducting current and the grid 210 drawing a small amount of grid current through the resistor 211. In this condition the cathodes 216 and 217 are approximately 45 volts positive with respect to ground with the grid 210 at the same potential and the plate 219 at a potential of approximately 70 to 75 volts. This voltage at the plate 219 is sufficiently low so that the grid 223 is sufficiently negative with respect to its cathode 216 so that the first section of the tube of stage C is non-conducting. Upon the arrival of a negative pulse through the condenser 209 the grid 210 is momentarily driven negative which results in a reduction in current flow through the second section of the tube and a consequent rise in potential of the grid 223 permitting the first section of the triode to conduct current. The flow of current through the plate resistors 214 and 215 of the first section of the tube results in a voltage drop at the plate 213 which, transmitted through the coupling or timing condenser 212, drives the grid 210 negative in an amount corresponding to the voltage drop across these plate resistors 214 and 215. This cuts off the flow of current through the grid 210 and immediately the condenser 212 starts charging at a rate determined by the time constant of the circuit elements 211 and 212. As the condenser 212 charges the potential on the grid 210 rises until finally it reaches the point where it permits conduction through the second half of the tube thus resulting in a negative going voltage change at the first grid 223 and a return of the circuit to its stable state. Preferably the condenser 212 is of such a size that the circuit remains in the unstable state for approximately 25 to 30 milliseconds.

While the first section is conducting current, the oscillator being in its unstable state, the circuit is not responsive to additional pulses supplied through the condenser 209. However, it will respond to the first pulse received after the second section again becomes conducting. This stage thus acts as a frequency filter in that it transmits output pulses through an output coupling condenser 226 in accordance with the received signals from the trigger stage B as long as the frequency of such signals is below the frequency of the monostable multivibrator as fixed by its recovery time. When the frequency of the incoming signals increases above this rate the oscillator ignores some of the signals and responds only to the first signal occurring after each return to the stable state. Thus, regardless of the frequency of the incoming signals, as long as they exceed a certain frequency, the output frequency remains substantially constant and is actually a submultiple of the input frequency the ratio being such that the output frequency approaches but does not exceed the frequency limit determined by the recovery time or oscillation time of the oscillator.

The ouput pulses from the monostable multivibrator or oscillator C are counted by a circuit that includes the coupling condenser 226, a second condenser 227, a pair of crystal rectifiers 228 and 229, and resistors 230, 231, 232, and 233. The first section of the duotriode of stage D cooperates with this circuit. This triode section includes a plate 235 that is fed through a plate resistor 236 from a positive voltage source approximately 150 volts positive with respect to the B+ line 165. In this counting circuit the resistor 230 and the crystal rectifier 228 are connected in parallel between the coupling condenser 226 and the grounded lead 166. The rectifier is connected to pass current when the junction between the rectifier and the condenser 226 tends to swing positive. Negative going voltage signals transmitted through the coupling condenser 226 are transmitted through the second rectifier 229 and resistor 231 to a junction point 237 that is connected to the resistor 232 leading to a grid 238 of the duotriode of stage D and to the condenser 227. The negative going signal applied to this junction 237 tends to reduce current flow through the duotriode section thus producing a positive going voltage at the plate 235 and current flow through the condenser 227 to the junction 237.

In the actual operation of this circuit, in the absence of any signals from the oscillator C, the first section of the duotriode of stage D conducts current since there is no grid bias because the cathode 239 is tied directly to the grounded lead 166 and the grid is returned to the same line by way of resistor 232, junction point 237, and resistor 233. The voltage at the plate 235 is thus a few volts positive with respect to the return or ground line 166. When a signal is received and the oscillator executes a cycle of oscillation the first portion of such cycle is a negative going signal appearing at the potentiometer 215 and transmitted through the condenser 226. This negative going signal tends to drive the junction point 237 negative thus cutting off or reducing current flow through the first section of tube of stage D. This reduction in current flow causes a positive signal at the plate 235 causing current to flow through the condenser 227, resistor 231, and rectifier 229 into the condenser 226. This current flow maintains the junction between the resistor 230 and condenser 226 slightly negative with respect to ground and results in a charge being transferred from the condenser 227 to the condenser 226. This transfer of charge is completed during the first portion of the cycle of oscillation of the oscillator since the resistor 231 is ordinarily in the order of 15,000 to 20,000 ohms which results in a very small time constant for this circuit. At the end of the cycle of oscillation of the oscillator C the positive going signal at the plate 213 is transmitted through the condenser 226 tending to drive the junction or connection between condenser 226 and resistor 230 positive. This is prevented by current flow through the rectifier 228. The net effect of this sequence of operations is to leave the condenser 227 with a charge of approximately 40 volts in addition to its original charge and leave the junction point 237 approximately 2 volts negative with respect to the ground line 166. This voltage on the junction 237, as a result of the additional charge in the condenser 227, immediately tends to leak off through the resistor 233. This discharge rate is comparatively slow, the resistor 233 being in the order of 500,000 ohms and the equivalent capacity of the condenser 227, taking in to account the action the triode of stage D, being in order of 1 to 2 microfarads.

Additional signals or oscillations of the oscillator C occurring before the condenser 227 has time to discharge through the resistor 233 results in additional charges being transmitted to the condenser 227 with the result that the voltage at the plate 235 rises in staircase fashion one step per cycle. Three to five cycles of oscillation of the oscillator C occurring in rapid succession transmits enough charge to the condenser 227 so that the potential of the plate 235 becomes positive with respect to the B+ lead 165 thus raising the grid potential of the grid 241 of a second section of the duotriode of stage D above the potential or to the potential of its cathode 142 which is tied directly to the B+ lead 165 maintained at approximately 150 volts positive with respect to ground. This allows the second section of this duotriode to conduct current through a lead 243 connected to its plate 244. Current flow through the lead 243 is a signal that the chart 123 of the weighing scale is moving rapidly enough that recordings should not be taken.

Referring again to the pulse counting circuit including the first section of the duotriode of stage D, it may be noted that while three to five cycles of oscillation, depending upon the adjustment of the potentiometer 215 and thus the magnitude of the voltage applied to the condenser 226, may be required to produce an output signal, that the same number of cycles slowly repeated would not result in an output signal because of the draining of the charge from the condenser 227 by way of the resistor 233. The components are selected so that the rate of discharge of the condenser 227 through resistor 233 will not permit a sufficient charge to be accumulated on the condenser 227 if the frequency of the incoming signal is below a certain frequency which is somewhat less than the maximum frequency accepted by the oscillator and which corresponds to the maximum velocity that the chart may be moving and still be recorded without objectionable error. This frequency selective circuit including the oscillator C and the pulse counting circuit associated with the first section of stage D has the peculiar advantage, unlike most counting circuits, that it saturates or reaches a limiting condition slightly beyond the point at which it gives an output signal without going materially beyond such condition. Thus it is able to respond quickly when the incoming frequency drops below the limiting value so as to immediately give an output indication of such condition.

This circuit thus has the desirable feature that it provides an output signal to prevent the recording of indications whenever the average frequency of the incoming signals from the photoelectrically received impulses is over a certain frequency. It likewise gives a signal if vibration or other quick motion of small extent occurs but sets a lower limit by requiring that at least three to five signal impulses be received following a static condition before an output signal is given. Thus a small tremor of the scale and chart will not interefere with the recording operation while a larger tremor or jar sufficient to materially displace the indicating mechanism will interrupt the recording operation.

Referring again to FIG. IV the scan detector 157, while not indicated in detail, is arranged with well known coincidence or gate circuits so that the receipt of a signal from the lead 243, the output of the amplitude and frequency filter, results in a signal being given to reset the counters and to turn off the gate 152. In the absence of a signal on the lead 243, the scan detector awaits the start of the next scan or series of pulses and with a first such pulse provides a reset signal to insure that the counters are at zero and opens the gate 152 to allow pulses to pass to the multiplier and be counted. The gate, in the absence of any signal from the filter 160, remains open until the end of a scan has been detected by the detector 157 and the resulting count is then left in the counters until receipt of the next signal from the filter 160 or the scan detector 157 indicating the start of the next series of pulses.

In prior scanner circuits utilized with the above type of condition responsive apparatus problems have arisen from the inherent output characteristics of the photocell or other electronic output device which is used to initially transmit the information received from the condition responsive apparatus to associated circuitry utilizing this information. That is, the change from an "OFF" output condition to an "ON" output condition is a jump to a large amplitude of pulse output on a "pedestal" or "plateau," which plateau or pedestal must be clipped, from the signal. This output change results sometimes in the following difficulties. It charges the capacitors in an associated amplifier to an extent that causes one or two of the pulses to be missed in a counting process, and if the time constant of these capacitors is adjusted to a large enough value to overcome the first difficulty then an extra pulse at the end of the counting sequence results.

Referring now to FIGS. VI through IX, a basic mechanical embodiment of the features of the present invention is shown in which the condition responsive member whose position must be read is a rack 251 of the measuring instrument mounted for movement in response to the conditions being measured by such measuring instrument. Movement of the rack 251 may be used to turn a pinion 252 fixed to an ordinary weighing scale indicator shaft 253 which may be utilized in providing conventional visual indication of the weight of the load on the weighing scale. The position of the rack 251 which may be responsive to movement of a scale lever is indicated relative to a stationary graduated chart 254 (see FIG. VII) having a plurality of transparent lines 255 corresponding to the ordinary indicia or numerals used to indicate the magnitude or degree of the conditions being measured by instrument to which the rack 251 is attached.

The position of the pair of relatively movable members, i.e., the rack 251 and the stationary graduated chart 254, is automatically and accurately read without creating friction or exerting any reaction force on such members by means including an optical projection system 256 having a projection lens 257 that is movable along the chart 254 so that the field of view of the lens scans the chart and that is adapted to sweep projected images of chart graduations or lines 255 across a stationary photoelectric cell 258. The path of movement of the projection lens 257 is indicated by the arrows in FIGS. VI and VII.

The rack 251 has mounted thereon a pair of spaced apart rods 259 (FIGS. VI and VII) carrying a mask 260. The mask 260 is of a length greater than the graduated portion of the chart 254 and may be mounted so as to completely expose the chart when in its uppermost position. The mask 260 occludes a portion of the chart 254 according to the position of the rack 251 to which it is attached and, hence, interrupts the projection of images from the chart 254 to the photoelectric cell 258 during a portion of the movement of the projection lens 257 according to the position of the rack 251. As specifically shown in the mechanical embodiment illustrated in FIGS. VI and VII, the flat graduated chart 254 and straight line mask movement may be used to convert the linear position of the rack to digital information. However, a variation of the basic embodiment could convert angular position to digital information by substituting a circular chart and mask movement. The stationary graduated chart 254 is used as a reference position against which the position of the condition responsive member or rack 251 is read. When the rack 251 is in its lowermost position in response to the condition being measured, the mask 260 just completely occludes the chart 254 and, hence, completely interrupts the projection of images of the lines 255 to the photoelectric cell 258. When the rack 251 is moved upwardly in response to the condition being measured, as shown in FIGS. VI and VII, some or all of the lines 255 are unmasked and images of the unmasked lines are swept progressively across the photoelectric cell 258. The number of images swept across the photoelectric cell 258 during each sweep of the projection lens 257 along the chart 254 is, therefore, proportional to the displacement of the mask 260 from its zero position. The number of images of the lines 255 swept across the photoelectric cell 258 during each movement of the projection lens 257 along the chart 254 would then be proportional to load on the weighing scale which moves the rack 251 and its attached mask 260 upwardly to uncover some or, if the load equals the full capacity of the scale, all of the lines 255.

The light sensitive surface of the photoelectric cell 258 is masked by a coat of paint having a slot 261 just wide enough to admit the image of one of the lines 255 focused thereon. The images may be greatly enlarged by the projection lens 257 and are preferably enlarged in the order of twenty times. Only a relatively low order of magnification is indicated in FIG. VI for clarity of illustration. The images of the lines 255 swept across the photoelectric cell 258 produce a series of electrical impulses, such as shown in FIG. IX, which are amplified by an electronic amplifier 95 to be described hereinafter and connected, by leads 263, to the photoelectric cell 258 and which impulses may be counted by an electronic counter connected to the amplifier. Each sweep of the projection lens 257 along the chart 254 results in a train of electrical impulses in which the number of pulses is proportional to the displacement of the mask 260 from its zero position or that position of the mask at which it just occludes all of the lines 255 on the chart 254. As may be seen in FIG. IX the signal jumps from "OFF" condition to an "ON" condition in which the pulse train appears upon the top of a "pedestal" or "plateau" of a predetermined amplitude.

The projection lens 257 is carried by a lens carrier comprising an arm 265 extending radially from a shaft 266 rotatably mounted in a frame 267, only a part of which is shown in FIG. VI for clarity of illustration. Suitable bearings must be provided for mounting the lens carrier shaft 266 so that it runs true without end play. The chart 254 is fixed to the frame 267 by means of bolts 268 (FIGS. VI and VII) and is therefore fixed relative to the path of movement of the projection lens 257. The graduated chart 254 and the path of movement of the projection lens 257 are fixed relative to each other to prevent relative vibration between the chart and the path and to provide easy means for accurately maintaining the focus of the lines 255 of the chart 254 on the slot 261 of the photoelectric cell 258. Preventing relative vibration between the chart 254 and the path of the projection lens 257 adds to the accuracy of the indicator scanning device, since such relative vibration causes variations in frequency of the pulses of the wave trains and, if severe, may cause retrograde movement and consequently multiple scanning of some graduations. The chart 254 being fixed to a stationary object such as the frame 267 permits the chart to be adjustably mounted so that a minimum of adjustments must be carried out to maintain a focused condition.

The lens carrier shaft 266 has its axis of rotation perpendicular to the plane of the chart 254 and carries the projection lens 257 in a path generally parallel to the plane of the chart, there being a portion of said path in proximity to the chart. Means for driving the projection lens 257 along such path includes a motor 269 turning a wheel 270, which friction drives an idler 271, friction driving in turn, a second wheel 272 fixed to the lens carrier shaft 266. A friction drive is used to couple the motor 269 to the lens carrier shaft 266 because such a drive, particularly if alternate members are rubber tired, transmits uniform motion free of gear tooth vibration or vibration of the motor shaft. The resilient rubber tires absorb the vibration and prevent any resonant vibrations in the drive system. As shown, the idler 271 is rubber tired to cooperate with metal rimmed wheels 270 and 272. Alternatively, the wheels 270 and 272 may be rubber tired to cooperate with a metal rimmed idler 271. Preferably, the motor 269 carrying wheel 270, idler 271, rotatable member 266 and the graduated chart 254 are all mounted on the frame 267.

The optical projection system 256 includes the projection lens 257, a stationary light source 273 and a stationary condensing lens 274 for illuminating the chart 254. A first mirror 275 is carried by a leg 276 extending radially from the shaft 266 and is set at an angle of approximately 45 degrees to the ray of light from the condensing lens 274. A similar mirror 277 is also carried by the leg 276 and is set at an angle of approximately 45 degrees to the reflected ray of light from the first mirror 275 and directs the ray to the portion of the chart 254 in the field of view of the projection lens 257. An image of the filament in the light source 273 is focused on the projection lens 257 and it is preferable that the ray of light passes through the projection lens 257 along its optical axis to make use of the central portion of the lens which may be more optically perfect than its marginal portion. The optical axis of the projection lens 257 shown in FIG. VI is generally parallel to the axis of rotation of the lens carrier shaft 266. A second pair of mirrors 278 and 279 carried by the arm 265 of the lens carrier shaft 266 displace the projected rays to a path generally coinciding with the axis of rotation of the lens carrier shaft 266, as indicated by the broken lines representing the rays in FIG. VI. As also indicated by such broken lines, the ray of reflected light from the mirror 277 sweeps through the transparent lines 255 on the chart 254, passes between the spaced apart rods 259 and then is directed to the projection lens 257. However, the rods 259 and the mask 260 may be positioned on the other side of the chart 254 to interrupt the projection of images of the lines 255 to the photoelectric cell 258.

It may be desirable to include two or more projection lenses in the optical system 256 to provide multiple scans of the chart 254 per single revolution of the lens carrier.

Referring now to FIG. VIII there is shown a schematic diagram of the preamplifier or amplifier 95 of FIG. I which cooperates with the apparatus of FIGS. VI and VII. The photo amplifier or preamplifier 95 as it is used comprises a photocell input section designated generally at 50, a triode cascade amplifier section designated generally at 60 and an output section designated generally at 70. The input section 50 comprises a triode 320 having an anode 321, a cathode 322 and a control or grid electrode 323. It is to be understood that although the preamplifier shown in FIG. VIII utilizes vacuum tubes, any other electronic device which will perform the same function as the electronic devices or valves shown herein may be utilized. For example, a transistor circuit may be utilized. It is important to note that all of these electronic devices, valves, variable electrical impedances, etc., generally have two electrodes which can be denoted as load electrodes, e.g. the anode and the cathode in FIG. VIII, and a third electrode which is a control electrode and controls the current flow through the two load electrodes. Referring again to the input section 50 the anode 321 of the triode 320 is connected to a B+ lead 390. The cathode 322 of the triode 320 is connected to the ground lead 391 through cathode resistors R4 and R3. The grid or control electrode 323 is connected to an input terminal 310 and is also connected through resistors R2 and R1 to the B+ lead 390. The junction of the resistors R1 and R2 is connected to ground through a capacitor C1.

The amplifier section 60 comprises three stages of amplification including triodes 330, 340 and 350, respectively.

The first stage triode 330 comprises an anode 331, a cathode 332, and a grid or control electrode 333. The anode 331 is connected through a plate resistor R6 to the B+ supply lead 390. The cathode 332 of the triode 330 is connected to the cathode 322 of the triode 320 of the input section 50. The grid or control electrode 333 is coupled to the junction of the cathode resistors R4 and R3 of the input section 350 through a coupling resistor R5. The grid 333 is also coupled to ground through a capacitor C2.

A second stage of the amplifier section 60 comprises a triode 340 having an anode 341, a cathode 342, and a grid or control electrode 343. The anode 341 is connected to the B+ lead 390 through a plate resistor R9. The cathode 342 is connected through a cathode resistor R8 to ground. The cathode 342 is also connected to the junction of a series circuit including a resistor R10 and a capacitor C4 connected between a B+ supply lead 390 and the ground lead 391. The grid 343 is coupled to the anode 331 of the first stage triode 330 through a coupling capacitor C3. The grid 343 is also connected to the ground lead 391 through a resistor R7.

A third stage of the amplifier section 60 comprises a triode 350 having an anode 351, a cathode 352, and a grid or control electrode 353. The anode 351 is connected through a plate resistor R12 to the B+ supply lead 390. The cathode 352 is connected directly to ground. The grid 353 is coupled through a coupling capacitor C5 to the anode or plate 341 of the second stage 340 of the amplifier section. The grid 353 is also connected through a resistor R11 to ground.

The output section 70 comprises a trigger circuit 360 and a blocking oscillator circuit 370. The trigger circuit 360 includes an anode 361, a cathode 362 and a grid or control electrode 363. The anode 361 is connected directly to the B+ supply lead 390. The cathode 362 is connected to ground through a resistor R13. The grid electrode 363 is directly connected to the anode or plate 351 of the third stage of the amplifier section 60.

The blocking oscillator 370 comprises an anode 371, a cathode 372 and a grid or control electrode 373. The anode 371 is connected to the B+ supply lead 390 through a parallel circuit comprising a resistor R16 and a plate winding or coil 375 of a tuning transformer T1. The cathode 372 is connected to ground through a cathode resistor R13 and also to an output terminal 399. The grid electrode 373 is connected through a control electrode or grid winding 374 of the tuning transformer T1 and a coupling capacitor C6 to the cathode 362 of the trigger circuit 360. The grid electrode 373 is also connected through a winding 376 and a capacitor C7 to ground. A B− bias voltage is connected to the junction of the capacitors C6 and C7 through a resistor R14.

The signal received at the input terminal 310 is derived from a high impedance photocell, which may be made of lead sulfide. As shown in FIG. VI the output of the photocell jumps to a large amplitude and the signal appears on the top of the pedestal or plateau of said amplitude. The level of the signal depends upon the lines per inch of the chart being used and the speed at which the chart is being scanned. Experimental results indicate that a minimum acceptable voltage output is approximately 300 millivolts with a scanning rate of 12 kilocycles.

The output of the preamplifier 95 illustrated in FIGS. I and VI is used to drive the signal shaper 97 (FIG. I). This may be either near the weighing device or some distance removed. For the purpose of triggering a shaper circuit experimental work indicates that a minimum signal of 30 volts positive peak with a rise time of four micro seconds is required at a repetition rate of 12 kilocycles. The load into which this signal operates may be assumed to be the equivalent of an eight hundredths microfarad capacitor which corresponds to about a half mile of shielded cable. The photo amplifier or preamplifier 95 illustrated in FIGS. I, VI and VIII should function normally on a line voltage variation of 100 to 130 volts.

In the prior art power amplifiers and low impedance cathode follower circuits have been utilized to effectively transmit the information from the scanner. However, the power amplifier has difficulties because of the size of the components and the ambient power consumption. The low impedance cathode follower circuit has difficulty in providing a reasonable voltage output into a reactive load. Therefore, the blocking oscillator output stage of this invention is utilized wherein the output is taken from the cathode of the blocking oscillator triode thus eliminating the disadvantage of high quiescent power consumption. The blocking oscillator output stage also avoids, as utilized in the invention, the disadvantage of high ambient power consumption.

The characteristics of the transformer T1 partly determine the wave form and the output impedance of the blocking oscillator stage. It is advantageous that the inter-winding capacity of the transformer be small so that a fast rise time can be realized. It is also advantageous that the plate resistor R16 be low in value and that the triode 370 have a high trans-conductance.

The blocking oscillator 370 is triggered by the use of a cathode follower trigger circuit 360 which provides a low driving source impedance driving directly into the grid circuit of the blocking oscillator 370. The cathode follower triggering method is advantageously used over parallel plate or anode triggering since in parallel plate triggering, while a certain amount of amplification is obtained, there is the requirement that the rise time of the triggering signal be sufficient to cause the voltage to cut off the grid 373 of the blocking oscillator tube 370.

The conventional approach to amplifying the voltage output of a lead sulfide photocell or other comparable electrode device has been to use a cathode follower as an impedance transformer followed by several stages of amplification until the desired signal level is obtained. In the amplification stages diodes were used for grid clamping on at least two, and sometimes all, of the amplifier stages, with alternate positive grid clamping and negative limiting. It was necessary to use these diodes to prevent an additional pulse being added to a train of pulses from the photocell when being amplified by the preamplifier. If the diodes were omitted, the additional pulse was derived from the effect of the time constants of the circuit.

The circuit of this invention uses positive and negative clamping in the first, second and third stages of the amplifier section 60 while eliminating the use of the diodes. It is desirable to eliminate the use of the diodes for clamping purposes since germanium diodes are unreliable at higher temperatures and silicon diodes, while having superior temperature characteristics, have a high forward resistance at signal levels of less than half a volt resulting in poor clamping action.

As discussed above one difficulty of the RC coupled amplifier is in trying to clamp the grid for a low level signal. By the use of direct coupling for at least one stage of amplification, this problem is eliminated. Direct coupling by conventional means, however, requires a large direct current plate supply and an accurate relationship of the grid bias voltage to the supply voltage. Since the direct current level of a photocell output can vary as much as 100 percent, a conventional direct coupled amplifier circuit is unsatisfactory.

In the present invention direct coupling has been accomplished by the use of a modified grounded grid amplifier. In a grounded grid circuit it is only necessary to have the grid 333 of the first stage of amplification at alternating current ground, while maintaining a suitable direct current bias relationship between the cathode 332 and the grid 333 to obtain amplification. This is accomplished as shown in FIG. VIII. The photocell cathode follower input stage functions as an impedance transformer between the photocell 8 and the amplifying section 60. The cathode follower input stage 50 is used to drive the grounded grid stage 330 by directly coupling the cathode 332 of the grounded grid amplifier stage to the cathode 322 of the cathode follower stage and using a common cathode resistor R4 plus R3. To obtain the proper direct current bias on the grid 333 of the grounded grid stage 330 the common cathode resistor is tapped at the junction of R3 and R4 to give bias voltage through a relatively high value of resistor R5. The grid 333 is A.C. coupled to ground through the capacitor C2. The output of the grounded grid stage 330 through the coupling capacitor C3 is satisfactorily amplified and the pedestal or plateau, as shown in FIG. IX, that was on the original input signal from the photocell has been eliminated. The signal is then partially clamped at the second stage grid 343 through the resistor R7. The output of the second stage through the coupling capacitor C5 to the third stage triode 350 drives the third stage grid 353 far beyond saturation and insures that no extra pulse will be amplified due to any resistance-capacitance discharge.

Since the anode 351 of the third stage 350 is at a potential of a predetermined number of volts positive under quiescent conditions, it is possible to directly couple the grid 363 of the trigger-tube 360 to the output of the amplifier section 60 at the anode 351.

Since the pulses that are generated by the photo amplifier 95 may not be of suitable wave shape for operation of the pulse generator or multiplier 98 the amplifier and shaping circuits 97 are included between them. A suitable amplifier and pulse shaping circuit for this purpose is illustrated in a schematic diagram in FIG. X. As shown in this figure the scanner 94 and preamplifier 95 are combined and designated by a block diagram 451, that transmits pulse signals over a lead 452, through coupling condenser 453, and grid current limiting resistor 454 to a control grid 455 of a pentode amplifier 456. Grid potential is maintained on the amplifier 456 by grid leak resistor 457 connected between a grounded lead 458 and the junction between the coupling condenser 453 and the current limiting resistor 454. This particular input circuit with the grid current limiting resistor allows high amplitude signals to be transmitted to the amplifier 456 without the amplifier losing control or biasing itself to plate current cutoff.

To provide grid bias the amplifier 456 is provided with a cathode resistor 459 connected between the grounded lead 458 and a cathode 460 of the tube. Likewise the amplifier has a plate 461 which is connected through a plate resistor 462 to a B+ lead 463. The amplifier has its suppressor grid 464 tied directly to the cathode 460 and the cathode resistor 459 is by-passed with a condenser 465. Likewise a screen grid 466 of the amplifier is connected directly to the B+ lead 463. The amplifier 456 serves as a limiting amplifier in that it can accept input signals over a wide amplitude range without loss of control.

Output signals from the amplifier 456 are transmitted from its plate 461 through coupling condenser 467 connected to the junction between voltage divider resistors 468 and 469 that serve to establish the average grid potential for an input grid 470 of a trigger circuit 471 and thence through a current limiting resistor 472 to the grid 470.

The trigger circuit 471 serves to accept input signals from the amplifier 456 regardless of wave shape and convert the signal into essentially square waves having very short rise and fall times suitable for operating a pulse generator. The trigger circuit 471 comprises a twin triode having cathodes 473 and 474 connected to ground through cathode resistor 475 and having plate resistors 476 and 477 connected respectively to left-hand plate 478 and right-hand plate 479 of the twin triode. The input grid 470 cooperates with the cathode 473 and plate 478 of the left-hand section. The plate 478 is connected to a grid 480 of the right-hand section of the tube through a parallel combination of resistor 481 and condenser 482 while the grid 480 is also connected to ground or the grounded lead 458 through a resistor 483. In this trigger circuit the plate resistor 477 has two-thirds or half of the resistance of the resistor 476 and the circuit normally operates with the left-hand section drawing current so that the plate 478 is at its most negative potential thereby driving the grid 480 sufficiently negative with respect to the cathode 474 to cause plate current cutoff in the right-hand section. When the input grid 470 is driven negative by a pulse signal transmitted from the amplifier 456 plate current is cutoff in the left-hand section resulting in a positive going voltage at the plate 478 which is transmitted through the coupling condenser 482 and resistor 481 to the right-hand grid 480 thus permitting the right-hand side of the tube to draw current. This current flow through the right-hand tube is greater than that originally flowing in the left-hand section because of the lesser plate resistance. Thus the cathode potential of the cathodes 473 and 474 becomes more positive when current transfers from the left to the right sections. This increases the effective input signal into the trigger circuit and results in a more rapid switching or triggering action. The output of the trigger circuit is taken from the plate 479 to an output lead 484 and consists, for each input pulse, of a negative pedestal of voltage, i.e. a substantially square wave, comprising a first negative going step of voltage and then finally a positive going step to the initial condition. This negative pedestal of voltage after differentiation in accompanying circuits, not shown in the drawings, results in a sharp negative spike of voltage suitable for triggering electronic counters of the type illustrated in Grosdoff Patent No. 2,521,788 and a sharp positive spike of voltage occurring at the end of the pulse and suitable for triggering the pulse generator illustrated in FIGURE XI.

A suitable pulse generator is shown in FIG. XI. Such a generator comprises a plurality or chain of blocking oscillators 490 to 498 inclusive plus one or more similar blocking oscillators the output voltages of which are used for control purposes. Each of the blocking oscillators 490 to 498 inclusive includes a pulse transformer 499 having a grid or secondary winding 500 connected to a negative voltage bias lead 501 through a grid biasing resistor 502 and having the other end of its winding connected to a grid 503 of the blocking oscillator 490. The blocking oscillator 490 has a plate 504 that is connected through a plate winding 505 of the transformer 499 to a B+ supply lead 506 maintained at approximately 150 volts positive with respect to a grounded lead 507. The tube also has a cathode 508 that is connected to the grounded lead 507 through a cathode resistor 509 which in some cases may be common to several of the blocking oscillator stages. A damping resistor 510 is connected in parallel with a primary or plate winding 505 of the transformer 499 so as to limit the surge or overshoot of the voltage pulse appearing in the transformer primary upon current cutoff through the plate. The remaining blocking oscillator circuits 491 to 498 inclusive are similar having the same types of circuits and the same values.

Voltage pulses from the trigger circuit 471 are coupled from the output lead 484 through a small coupling condenser 511 to the junction between the grid bias resistor 502 and the secondary winding 500 of the pulse transformer 499. The time constant of the condenser 511 and resistor 502 is in the order of two and one-half microseconds which is quite short compared to the length of the voltage pedestal or pulse on the lead 484. The initial negative going step of voltage at the start of the pulse is without effect on the blocking oscillator chain because it merely drives the grid 503 negative when it is already negative with respect to the cutoff potential of the tube. Thus the negative spike of voltage is ignored by the circuit. The following positive spike of voltage resulting from the differentiation through the short time constant of the condenser 511 and resistor 502 results in a positive voltage applied to the grid 503 sufficient to permit flow of plate current through the plate winding 505 of the transformer. This flow of current through the winding 505 generates the voltage in the secondary winding driving the grid 503 positive thus increasing the flow of plate current. This action is accumulative and the increase in plate current is limited only by the impedance of the tube and its cathode resistor 509. As soon as saturation is reached and there is no further increase in plate current there is no voltage generated in the secondary winding 500 and the grid returns to its normal negative voltage according to the bias voltage on the lead 501. This cuts off the flow of plate current through the tube resulting in a sharp positive voltage pulse at the plate 504. This sharp positive pulse at the plate 504 is transmitted through a second coupling condenser 512 to the secondary winding of the pulse transformer for the next blocking oscillator and thus serves to initiate a cycle of operation of that oscillator at the conclusion of the pulse generated in the first blocking oscillator 490.

The useful output voltage signals from the blocking oscillators are taken from the voltages generated across the cathode resistors, i.e. between ground and the cathodes of the oscillators. In the arrangement shown the first two blocking oscillators 490 and 491 share the cathode resistor 509 so that the output lead 406 carries two output voltage pulses, one from the oscillator 490 and one from the oscillator 491, for each input pulse delivered through the lead 484. Likewise the oscillators 492, 493, 494 and 495 share a cathode resistor 514 and as a result an output lead 407 connected to the cathodes of these oscillators has four pulses impressed thereon for each pulse transmitted through the chain of blocking oscillators. In similar manner the oscillators 496 and 497 share a cathode resistor 516 such that output lead 408 from these oscillators has two pulses per pulse transmitted through the chain. Finally the last oscillator 498 of the chain of nine oscillators has its own cathode resistor 518 so that lead 409 from the cathode of this stage has one pulse per pulse transmitted through the chain.

The cathode of the last oscillator 498 of the series of nine also supplies voltage to the lead 410 that is part of the carry storage circuits of the complete calculating system. An additional blocking oscillator 520 having a cathode resistor 521 supplies a voltage pulse for the carry clear pulse lead 511.

The output pulses on the leads 406, 407, 408 and 409 are combined in a diode switching matrix 427 so as to supply nine output leads or bus bars with pulses. The number of pulses on each lead corresponds to the number of that lead, i.e. the first lead has one pulse, the second two, the third three, the fourth four, etc. As shown in FIG. XI the diode matrix 427 is included in the dotted rectangle and comprises a crystal diode 522 that is connected between the lead 406 and a bus bar 523 that is connected to the number eight terminal of each of the selector switches 524, 525 and 526. Thus the number eight terminal receives two pulses from the first two blocking oscillators by way of lead 406 for each input pulse transmitted through the lead 484. Likewise the output lead 407 from the oscillators 492, 493, 494 and 495 is connected directly to a bus lead 527 that is connected to the number four terminal of each of the selector switches to feed four pulses into the number four terminal of each of the selector switches for each incoming pulse. In like manner the lead 408 from the blocking oscillators 496 and 497 feeds two pulses into a bus lead 528 that is connected to the number two terminal of each of the selector switches. Similarly the last blocking oscillator 498 feeds its single output pulse through the lead 409 directly to the bus 529 that is connected to the number one terminal of each of the selector switches. Crystal diodes are employed between the buses or bus leads to combine the pulses from the various leads 406 to 409 inclusive in various combinations for the remaining selector switch terminals. Thus a bus 530 connected to the number three terminals of the selector switches is fed through a diode 531 from the bus 528 which carries two pulses per cycle and is also fed through a diode 532 from the bus 529 that carries one pulse per cycle whereby the bus 530 is provided with three pulses per cycle. In like manner four pulses are transmitted from the bus 527 through diode 533 to bus 534 connected to the number five terminals of the selector switches to provide four pulses, the remaining pulse to make the total of five is fed from the bus 529 through diode 535. Similarly, the bus 536 connected to the number six terminals of each selector switch is supplied with two pulses per cycle through a diode 537 connected to the lead 408 and is provided with four pulses per cycle through a diode 538 thus making a total of six pulses per cycle.

A bus lead 539 connected to the number seven terminal of each of the selector switches is fed with six pulses per cycle through diode 540 and is supplied with one pulse per cycle through diode 541 thus making a total of seven pulses per cycle. The number eight bus that is the bus 523 is supplied with six pulses per cycle through diode 542 connected to the bus 536 and as mentioned before is supplied with two pulses per cycle through the diode 522 thus making the total of eight. Finally, number nine bus 543 connected to the number nine terminals of each selector switch is fed with eight pulses per cycle through diode 544 and is supplied with one additional pulse per cycle through diode 545 thus making a total of nine pulses per cycle or per pulse transmitted through the blocking oscillator chain.

This combination of diodes is one of a number of such combinations that may be used to combine the serially generated pulses appearing on the leads 406, 407, 408 and 409 into series of pulses appearing at the selector switches 430, 431 and 432 wherein each terminal of a selector switch is provided with a number of pulses corresponding to its particular value in the series of terminals. It may be noted that either the bus bars connected to the number nine terminals of the selector switches or the common arms of the selector switches must be conductively connected to ground through a load resistor to avoid accumulating positive voltage on the bus bars because of the rectifying action of the diodes.

This circuit with a minimum number of components thus provides for the reliable generation of series of pulses of precisely predetermined numbers selectable at will by selector switches so that the output of the selector switches may be accumulated in an electronic counter to indicate the product of the number of pulses supplied over the lead 484 times the multiplying factor set up in the selector switches 430, 431 and 432.

Referring to FIG. XV there is schematically illustrated a decade counter suitable for use in the weight and value counter sections comprising in general four flip-flops or bistable electronic circuits 620, 640, 660 and 680 connected in cascade.

The first flip-flop 620 comprises a dual triode tube having a left triode provided with an anode or first power electrode 621, a grid or control electrode 622 and a cathode or second power electrode 623. The right triode of the flip-flop 620 comprises an anode 626, a control electrode 627 and a cathode 628. The anode 621 is connected through a resistor 1R13 and a resistor 1R26 to a B+ supply which may be approximately 300 volts. The anode 621 is coupled to the control electrode 627 of the right triode through a parallel resistance 1R29 and capacitance 1C6 circuit. Similarly, the plate or anode 626 of the right triode is connected through a resistor 1R14 and the resistor 1R26 to the B+ supply. The anode or plate 626 is also connected through a parallel resistance 1R28 and capacitance 1C5 circuit to the control electrode 622 of the left triode. The right triode anode 626 is also connected to the output terminal 630 from which the output of the first flip-flop is taken. The right and left triode cathodes 623 and 628 are connected together at terminal 629. The terminal 629 is connected through a parallel resistance 1R38 and capacitance 1C13 circuit to ground. The left control electrode 622 is connected to ground through the resistor 1R37. The right control electrode 627 is connected through resistor 1R40 to a reset terminal 700. An input pulse is to be applied to the first flip-flop at terminal 610 through an input capacitor 1C1 connected between terminal 610 and the common junction of the plate resistancess 1R13 and 1R14.

The second flip-flop 640 comprises a left and right triode. The left triode comprises an anode 641, a control electrode 642 and a cathode electrode 643. The right triode comprises an anode or plate 646, a control electrode 647 and a cathode electrode 648. The anode 641 of the left triode is connected through plate resistance 1R20 and resistance 1R15 to the B+ supply. The anode 641 is also connected through a parallel resistance 1R31 and capacitance 1C8 circuit to the control electrode 647 of the right triode. Similarly, the anode 646 of the right triode is connected through plate resistance 1R21 and resistance 1R15 to the B+ supply. The anode 641 is also connected to the control electrode 642 of the left triode through a parallel resistance 1R30 and capacitance 1C7 circuit. The output of the flip-flop 640 appears at terminal 650 which is connected to anode 646. The cathodes 643 and 648 of the left and right triodes are connected together at terminal 649. Terminal 649 is connected to ground through a parallel resistance 1R43 and capacitance 1C14 circuit. The left triode control electrode 642 is connected to ground through resistance 1R42. The right control electrode 647 is connected through a resistance 1R45 to the reset terminal 700. The output of the first flip-flop 620 at terminal 630 is coupled through capacitor 1C2 to the common junction of the plate resistances 1R20 and 1R21.

The third flip-flop 660 comprises a left triode and a right triode. The left triode includes an anode 661, a control electrode 662 and a cathode 663. The right triode includes an anode 666, a control electrode 667 and a cathode 668. The anode 661 is connected through a plate resistor 1R22 and a resistance 1R16 to the B+ supply. The anode 661 is also connected through a parallel resistance 1R33 and capacitance 1C10 circuit to the control electrode 667 of the right triode. Similarly, the anode 666 is connected through a plate resistance 1R23 and the resistor 1R16 to the B+ supply. The anode 661 is also connected through a parallel resistance 1R32 and capacitance 1C9 circuit to the control electrode 662 of the left triode. The output of the third flip-flop 660 is taken from the plate 666 and appears at terminal 670 which is connected thereto. The cathodes 663 and 668 are connected at a common junction 669. The junction or terminal 669 is connected to ground through a parallel resistance 1R48 and capacitance 1C15 circuit. The left control electrode 662 is connected through a resistance 1R47 to ground. The right control electrode 667 is connected through a resistance 1R49 to the reset terminal 700.

A feedback circuit from the third flip-flop circuit 660 to the second flip-flop 640 comprises a serially connected resistance 1R56 and capacitance 1C17 connected between the output terminal 670 or the plate 666 of the third flip-flop 660 and the left control electrode 642 of the second flip-flop 640. The flip-flop 660 receives an input from the flip-flop 640 through a coupling capacitor 1C3 connected between the output terminal 650 and the common junction of the plate resistances 1R22 and 1R23 of the flip-flop 660.

The fourth flip-flop 680 comprises a left triode and a right triode. The left triode includes an anode 681, control electrode 682 and a cathode 683. The right triode includes an anode 686, a control electrode 687, and a cathode 688. The anode 681 of the left triode is connected through a plate resistance 1R24 and a resistor 1R17 to the B+ supply. The anode 681 is also connected through a parallel resistance 1R35-capacitance 1C12 circuit to the control electrode 687 of the right triode. Similarly, anode 686 is connected through plate resistance 1R25 and the resistance 1R17 to the B+ supply. The anode 686 is also connected through a parallel resistance 1R34-capacitance 1C11 circuit to the control electrode 682 of the left-triode. The anode 686 is also connected to the output terminal 690 providing the output for the decade counter. The cathodes 683 and 688 are connected to terminal 689. The terminal 689 is connected to ground through a parallel resistance 1R53 and capacitance 1C16 circuit. The left control electrode 682 is connected to ground through a resistance 1R52. The right control electrode 687 is connected to a resistance 1R54 to the reset terminal 700.

The standard feedback circuit from the fourth flip-flop 680 to the third flip-flop 660 comprises connecting the plate 681 through a serially connected capacitance 1C18 and resistance 1R57 to the right control electrode 667 of the flip-flop 660. The flip-flop 680 receives an input from the flip-flop 660 from the terminal 670 through a coupling capacitor 1C4 connected to the common junction of the plate resistances 1R24 and 1R25.

The decade counter circuit thus far described is typical of standard decade counters. Such decade counters work satisfactorily under most conditions but are "critical" in their time constant adjustments that are made to prevent the feeding back of the signals from the third to the second flip-flop and the feeding back of the signal from the fourth to the third flip-flop from initiating a miscounting action in the circuit because of the reversal of the state of the third flip-flop in response to the pulse fed back from the fourth flip-flop.

The operation of the above decade counter is as follows. As was stated hereinbefore each of the flip-flop circuits has two stable states: either the left triode is conducting and the right triode is cutoff, or the left triode is cutoff and the right triode conducting. The flip-flop circuits will change states only upon receipt of an input pulse of the proper polarity and magnitude. When such an input pulse is received the conduction states will change. Once the change in conduction states is realized the coupling network between the respective opposite plates and control electrodes stabilizes the circuit as first set forth in the well-known Eccles-Jordan circuit. The Eccles-Jordan circuit is a two-stage direct-coupled amplifier in which the output of the second stage is connected to the input of the first stage. Conduction states in a basic flip-flop such as shown in the drawing may be switched by applying a positive pulse of sufficient magnitude to the control electrode of the non-conducting tube or the application of a negative pulse of sufficient magnitude to the control electrode of the conducting tube.

Before operation of the decade counter is initiated a reset pulse is applied to the terminal 700 which is connected to each of the right control electrodes 627, 647, 667 and 687 through the reset resistors 1R40, 1R45, 1R49 and 1R54 causing all of the right triodes to conduct. Since the right triodes are conducting and the output for each flip-flop is taken from the plate of the right triodes no voltage or a very low voltage is available across the right triodes to provide an output. That is, the very small voltage drop across the tube of the right triode is the zero or no output normal signal representing the binary number zero. The left triodes of all of the flip-flops are now non-conducting.

Upon application of a negative pulse input to the input terminal 610 of sufficient magnitude the right triode of the flip-flop 620 will stop conducting and the left triode will start conducting. Therefore, an output now appears across the right triode and at the terminal 630. The application of a second input pulse reverses conduction states of the flip-flop 620 so that the output at the terminal 630 goes from a relatively high voltage to a relatively low voltage as the right triode again starts conducting. The change in voltage at terminal 630 from a high voltage to a low voltage is passed through coupling capacitor 1C2 as a negative pulse and is applied as an input pulse to the flip-flop 640. The application of a negative input pulse to the flip-flop 640 stops the conduction of the right triode and starts conduction of the left triode. Thus, an output signal voltage will now appear at the plate 646 of the right triode and at the output terminal 650 for the flip-flop 640.

The receipt of a third input pulse at terminal 610 is operative to reverse the conduction states of flip-flop 620 such that an output voltage appears at terminal 630. The change from a low voltage to a high voltage at the output terminal 630 produces a positive pulse which is not operative to change conduction states of the second flip-flop 640. Therefore, at this time there is an output voltage from the flip-flop 620 and an output voltage from the flip-flop 640 at the terminals 630 and 650, respectively.

The receipt of a fourth negative input pulse at terminal 610 flips or reverses flip-flop 620 changing its output voltage from a relatively high voltage to a relatively low voltage at output terminal 630. This change in voltage at terminal 630 passes a negative pulse through coupling capacitor 1C2 to flip-flop 640 causing it also to change states such that the output voltage at the terminal 650 drops from a relatively high voltage to a relatively low voltage. The drop in voltage at output terminal 650 passes a negative pulse through coupling capacitor 1C3 to the third flip-flop 660 causing it to change conduction states and providing an output voltage at the output terminal 670 of the flip-flop 660 in accordance with previously described action. The stopping of the conduction of the right triode of flip-flop 660 causes the voltage on the plate 666 to rise feeding back a positive pulse through the series resistance 1R56 and capacitance 1C17 circuit to the control electrode 642 of the left triode of the flip-flop 640. The application of a positive pulse to the conducting left triode of the flip-flop 640 causes the second flip-flop 640 to again reverse conduction states such that an output now appears again at the terminal 650 from the flip-flop 640. That is, flip-flop 620 has reversed, flip-flop 640 has reversed, flip-flop 660 has reversed feeding back a positive pulse signal to the second flip-flop 640 causing it to reverse again. Therefore, after the fourth input pulse the first flip-flop 620 has a relatively low output voltage, the second flip-flop 640 has a relatively high output voltage, the third flip-flop 660 has a relatively high output voltage and the fourth flip-flop 680 still has no output voltage.

Receipt of the fifth negative input pulse at the terminal 610 is operative only to reverse the conduction state of the first flip-flop 620. Since the change in voltage at the output terminal 630 near the first flip-flop is from a relatively low voltage to a relatively high voltage, the positive pulse resulting therefrom is not operative to change the conduction states of the second flip-flop 640. Since the second flip-flop 640 does not change conduction states none of the succeeding flip-flops change conduction states.

Upon receipt of the sixth negative input pulse the first flip-flop 620 reverses going from a relatively high output voltage to a relatively low output voltage. The negative pulse resulting therefrom causes the second flip-flop 640 to reverse with the output voltage at the terminal 650 going from a relatively high output voltage to a relatively low output voltage. The negative pulse resulting therefrom causes the third flip-flop 660 to reverse such that its output at the terminal 670 goes from a relatively high voltage to a relatively low voltage. The negative change in voltage at terminal 670 is passed as a negative pulse through coupling capacitor 1C4 to the flip-flop 680 causing the flip-flop 680 to change conduction states so that the output at the output terminal 690 is now a relatively high voltage.

The change in conduction states of the fourth flip-flop 680 is operative to cause a lowering of voltage on plate 681 of the left triode as it starts to conduct. This is fed back as a negative pulse through the feedback circuit comprising the serially connected capacitance 1C18 and resistance 1R57 to the right control electrode of the third flip-flop 660. Since the third flip-flop 660 had just changed states so that the right triode is now conducting the application of a negative pulse to the control electrode 667 of the right triode is operative to cause the third flip-flop to change states again.

It is at this point in the decade counter wehre the difficulty arises on maintaining a very critical adjustment of the time constants on the feedback circuits. If the time constants are not correctly adjusted the second reversal of the third flip-flop 660 in response to the receipt of the sixth negative input pulse at terminal 610 would cause a reversal of the second flip-flop 640 through the feedback circuit between the third flip-flop 660 and the second flip-flop 640 previously described.

To remove the decade counter from the "critical" adjustment category a third feedback circuit is applied from the plate 681 of the left triode of the fourth flip-flop 680 through serially connected capacitance 1C20 and resistance 1R5 to the control electrode 642 of the left triode of the second flip-flop 640. As was above described the feedback from the third flip-flop 660 is also connected to the control electrode 642 of the left triode of the second flip-flop 640. However, a positive pulse was fed back from the third flip-flop 660 to the control electrode 642 to cause it to change conduction states of the second flip-flop 640. As was just described a negative pulse is available caused by the starting of conduction of the left triode of the fourth flip-flop 680 such that the voltage on the anode 681 drops sharply. Thus, by connecting this negative feedback pulse which occurs when the flip-flop 680 changes conduction states to the same point as the positive feedback pulse fed back from the third flip-flop 660, that is, the control electrode 642 of the left triode of flip-flop 640, the two pulses fed back cancel each other preventing any change in conduction states of the second flip-flop 640 as the result of the change of conduction states of the third flip-flop 660 after the sixth input pulse is received.

To thus remove the standard decade counter from the "critical" time constant adjustment discussed hereinbefore allows it to be placed in circuits with no need for further adjustments of said time constants. The components utilized in the decade counter cooperate to provide the various magnitudes of pulses and rate of rise of the pulses, when affecting the feedback of pulses to provide a total of ten count for four cascaded flip-flops, whose tolerance limits are not as critical as required before. Therefore, the decade counter is also less sensitive to ambient temperature changes because the change in the values of the components, resulting from extreme ambient temperature changes, stays well within tolerance limits.

After the sixth input pulse it may be seen that the first flip-flop 620 has a relatively low output voltage, the second flip-flop 640 has a relatively low output voltage, the third flip-flop 660 has a relatively high output voltage, and the fourth flip-flop 680 also has a relatively high output voltage. The remainder of the operation of the counter proceeds as known in the art to provide the remainder of the counts to ten. That is, the receipt of the seventh negative input pulse causes only the first flip-flop 620 to reverse its conduction states. The receipt of the eighth negative input pulse at terminal 610 causes the first flip-flop to reverse conduction states such that the voltage on the terminal 630 goes from a relatively high voltage to a relatively low voltage which causes the second flip-flop 640 to reverse its conduction states. Upon receipt of the ninth negative input pulse at the terminal 610 only the first flip-flop 620 reverses its conduction state with no effect on the remainder of the counter because the voltage at terminal 610 rises from a relatively low voltage to a relatively high voltage. After receipt of the ninth negative input pulse at terminal 610 all four flip-flops have relatively high voltages at their output. Thus it may be seen that the application of the tenth negative input pulse to the input terminal 610 will cause all four flip-flops to reverse conduction states and be reset again to zero.

Referring to FIGS. XVI through XX, there is shown checking apparatus suitable for use in the check circuit designated generally at 103 in FIG. II, and readout apparatus cooperation therewith. FIG. XVI sets forth the check function in a block diagram. A condition responsive device 710, which may be the weight sensing mechanism 91 and a scanner mechanism 94, both similar to those described in FIG. I, is connected to feed a series of electrical pulses, which have been generated proportional in number to the condition being measured, to a multiplier 714. The multiplier 714 has two output connections the first of which goes through a gated amplifier 716 to an "ON" input 721 of a Flip Flop or MEMORY or Bistable circuit 720. The second output of the multiplier 714 is connected to the input of a counter or computer 734. The output of the computer 734 is connected through a binary to decimal converter 736 to a readout device 738. The output of the binary to decimal converter 736, if the converter 736 is a matrix or other strictly electronic device, may be connected to an input 741 of an AND logic circuit 740. The output, or a sample of the output, of the readout device 738, is connected to a second input 742 of the AND logic circuit 740. If the binary to decimal converter 736 is of the electro-mechanical type a feedback from the output of the readout device 738 may be connected back to the binary to decimal converter 736 in order to activate a latch circuit of the converter 736 which will bring the binary to decimal converter 736 and the readout device 738 to stop on indicia corresponding to a count in the counter 734. The output of the AND logic circuit 740 is connected to an input 755 of the AND logic circuit 750. The AND logic circuit 750 has as many inputs as there are previous readout circuits.

The output of the AND logic circuit 750 is connected to the input of a NOT logic circuit 760 of an output circuit means designated generally at 726. The "OFF" output of the Flip Flop 720 is connected to the input 729 of an OR logic circuit 728 of the output circuit means 726. The output of the NOT logic circuit 760 is connected to the input 730 of the OR logic circuit 728. The output of the OR logic circuit 728 is connected to energize a check relay 732.

If the condition responsive device 710 is comprised of a weight sensing mechanism 91 and a scanner 94, the placing of a material to be weighed on the weighing means 91 will cause the scanner 94 to produce or generate a series of electrical pulses proportional in number to the weight being measured.

Although the various logic circuits mentioned herein are in common use in the electronic control field, a brief description of the function of each circuit is as follows. An AND logic circuit produces an output signal when, and only when, all of a plurality of input signals are present. A NOT logic circuit produces an output signal at all times unless an input signal is present. A MEMORY logic circuit, sometimes known as a Flip Flop or Bistable circuit has "ON" and "OFF" or reset input terminals, and "ON" and "OFF" output terminals. The MEMORY or Bistable circuit produces an "ON" output signal in response to a signal applied at the "ON" input terminal and continues to produce the "ON" output signal, even though the input signal at the "ON" input terminal is removed, until a signal is applied to the "OFF" input terminal. The MEMORY circuit will then be turned "OFF" and produce an "OFF" output signal even though the signal at the "OFF" input terminal is removed. The memory circuit will revert to its initial state upon application of a signal to the "ON" input terminal. An OR logic circuit produces an output upon receiving an input signal at any of a plurality of input terminals. For further details on the construction and operation of various types of logic circuits reference is made to an article entitled "Static Switching Devices," by Robert A. Mathias, in Control Engineering, May 1957.

Although not shown on the block diagram of FIG. XVI the various preamplifiers or pulse shapers of FIG. I may be utilized between the output of the scanner 94 and the multiplier 714 in order to obtain the desired amplitude and shape of pulses.

The multiplier 714 as shown in FIG. XVI is a necessary item only when the condition, such as the weight of the material, needs to be multiplied by another variable or by a constant, such as the price of the material per unit weight. If the multiplication by a predetermined figure is not desired the output of the scanner 94 could be connected directly to the counter 734 and also directly through the gated amplifier 716 to the "ON" input of the Flip Flop 720.

It may be seen that at least one and probably the first pulse of the series of pulses generated from the scanner 94 will pass through the entire previous chain of a pre-amplifier, a pulse shaper, a multiplier, and the gated amplifier to provide an "ON" input signal to the Flip Flop 720. The Flip Flop 720 was previously in the "OFF" condition in response to an "OFF" input signal applied at the reset or "OFF" terminal 722, as will be explained hereinafter.

The entire series of pulses from the scanner 94 will be counted by the counter 734 or will be computed by the combination of the multiplier 714 and the counter 734. The resultant count in the counter 734 may be fed through a binary to decimal converter 736 to the readout device 738. If the output of the counter 734 is in the binary code the converter 736 must be utilized if the readout indicia is to be registered in the decimal system. By far the majority of the computers and counters are set up to be programmed under the binary coded system. The binary to decimal converter 736 may be any of several types known to those skilled in the art. Examples of static electronic converters are the resistor and diode matrices. In the embodiment shown in this invention, an electro-mechanical binary to decimal converter is utilized.

The readout device 738 may be any of several types known to those skilled in the art, such as the electric typewriter programmed from the binary to decimal converter, a plurality of lamps which indicate by their relative positions the number of indicia to be readout, or lamps or tubes which each have a plurality of electrodes shaped in the forms of the indicia to be read out, each of said electrodes being ignited or caused to glow in response to a selected signal from the binary to decimal converter 736. The readout device 738 may also be of the mechanical type as shown and described hereinafter.

It is desired to sense a coincidence of predetermined indicia shown by the readout device 738 as corresponding to a predetermined count in the counter 734 which is fed through the converter 736. This is accomplished in FIG. XVI by sampling the outputs of the binary to decimal converter 736 and electrically sensing the mechanical position or sensing the particular control circuit which is energized of the readout device 738. When these two outputs are present and applied to the inputs 741 and 742 of the AND logic circuit 740, the AND logic circuit 740 will produce an output to the input 755 of the AND logic circuit 750. When using an electro-mechanical binary to decimal converter 736, as shown hereinafter, the use of an output signal from the readout device to the converter or a signal from the output of the converter itself may be utilized to activate latching circuits which will properly mechanically position the binary to decimal converter 736 and thus properly mechanically position the readout device 738.

If there are a plurality of readout devices such as the one just described it may be seen that the plurality of output signals from the respective circuits must be applied to a like plurality of inputs of the AND logic circuit 750 in order to cause the AND logic circuit 750 to produce an output signal. Assuming that there are no failures in the electronic portion of the apparatus and assuming proper positioning of the readout device 738 there is no output from the "OFF" output of the Flip Flop or Bistable circuit 720, but there is an output from the AND logic circuit 750. In response to the coincidence of an output signal from the AND logic circuit 750 and no output signal from the Bistable circuit 720 the output circuit means 726 produces an operative output signal condition which may be utilized, as hereinbefore discussed to initiate a readout sequence, a print cycle, or a next succeeding desired sequence or cycle.

The output circuit means 726 in FIG. XVI operates in the following manner. The check relay 732 is maintained in an energized state by the output signals of the NOT logic circuit 760 and the output from the "OFF" output of the Flip Flop 720 through the OR logic circuit 728. According to the definition of the NOT logic circuit above, if the NOT logic circuit 760 stops producing an output signal in response to an input signal, then the Flip Flop circuit 720 will still be producing an output signal from the "OFF" output terminal which will maintain the check relay 732 energized. Therefore, when the NOT logic element 760 is receiving an input signal and the "ON" input of the Flip Flop or Bistable circuit 720 is receiving a signal coincidentally then the energization will be removed from the check relay 732 and it will drop out. The drop out of the check relay 732 may be utilized in any of the many obvious ways through either a set of back or front contacts to initiate the operation of a succeeding sequence or cycle.

Referring now to FIGS. XVII through XX, there are shown particular embodiments of the binary to decimal converter 736 and the readout device 738. This electromechanical combination may be constructed on a frame having vertically upstanding end plates 801 and 802. A complete device comprises a plurality of duplicate subassemblies, one for each place in the readout indicia or number to be indicated. The subassemblies, one of which is shown in FIG. XVIII are driven mechanically by a series of spaced apart power wheels 803 mounted on a power shaft 804 journaled on bearings adjustably mounted (not shown) in the end plates 801 and 802. The power wheels 803 are continuously rotated when the device is in operation and, when engaged, frictionally drive a plurality of intermediate drive wheels or idlers 805 each of which positively engages and rotates one of a plurality of generally cup-shaped hollow drum members 806 bearing indicia on their cylindrical surfaces. If a visual readout is desired the indicia may be in the form of numbers, for example, which would then be visible through the windows 807 in a front wall 808 of a housing enclosing the device. For the purposes of printing, the indicia on the drum 806 may be of the raised type which when wiped with an ink roller and pressed on a readout card or label prints the indicia registered on the readout device. The readout device may be adapted to produce both the visual and printing readout operations by the connection of the readout drums and printing drums through, for example, gearing means.

The drum member 806 is mounted for rotation on a needle bearing located axially, by means of a snap ring (neither shown) on an axle 811 extending between the end plates 801 and 802. A flanged bearing held by a second snap ring (neither shown) on the axle 811 holds the needle bearing in place against the inner surface of the first snap ring. The idler 805 is fitted with bushings turning on an axle (neither shown) fixed to an arm of a support member 816 fixedly mounted on the flanged bearing. Thus, the rockable support member 816 and the drum member 806 have a common pivotal axis defined by the axle 811.

The idler 805 includes, to cooperate with the power wheel 803, a friction drive surface 817, which may be knurled, flanked by a gear 818 on one side and five equally spaced apart teeth 819 on the other side. When the readout device is in operation so that the power wheels 803 are constantly rotated and when the support member 816 is rocked to engage the drive surface 817 of the idler 805 with its power wheel 803, the power wheel 803 continuously rotates its associated idler 805. The rotating idler 805 drives the drum member 806 at half its speed, the gear 818 on the idler 805 being engaged with a gear 820 mounted on the side of the cup-shaped hollow drum member 806. A second gear on the side of the drum member 806 could be used to drive a train of gears to set type wheels according to the indicia displayed through the windows 807. The directions of rotation of the power wheels 803, of the idlers 805, and of the drum members 806 are indicated by arrows in FIG. XVIII.

When the turning drum 806 approaches the position at which it is to stop, a signal is transmitted through a circuit controlling the indication of the count, which binary to decimal converter circuit will be hereinafter described, to cause an end 822 of a solenoid operated latch 823, one of which is provided for each idler 805, to intercept the approaching of the five teeth 819 on the side of the idler 805 at a position adjacent the associated power wheel 803 thereby stopping that one of the drum members 806 at one of ten possible stopping positions. The latch 823 is fulcrumed on a bracket 824 by means of a flexible plate return spring 825, the bracket 824 extending between the end plates 801 and 802. The latch 823 is actuated by a solenoid 826 fixed to the bracket 824, the solenoid 826 being energized to actuate the latch by the signal through the circuit controlling the indication of a count. Ten possible stopping positions are provided because the readout device is to indicate in the decimal system of notation. Should some other system of notation be employed a different number of teeth 819 or a different ratio between the idlers and the drums or both would be used. The present device provides the ten stopping positions for the drum members 806 with five teeth 819 on each of the idlers 805 and a two to one ratio between the drum members and the idlers.

The signal controlling the indication of a count is carried through a binary to decimal conversion circuit shown in FIGS. XIX and XX, in which a set of nine brushes mounted on the support member 816 cooperate with a single conducting member 850 on a commutator 849 arranged in a certain pattern and carried on the drum member 806, there being a separate circuit for each drum member 806 and its associated drive. Information relative to a count accumulated in a binary system electronic counter 734 is transmitted through a series of leads A1, A2; B1, B2; C1, C2; and D1, D2 that connect four stages, hereinafter referred to as stages A, B, C, and D, of the electronic counter to the conducting member. A set of nine brushes 852 to 860, one for each of the leads A1, A2, B1, B2, etc., and one for an output lead 847 going to a latch activating circuit amplifier 830, are provided.

A commutator member 849 mounted in or on the rotatable drum member 806 is provided with a conducting surface 850 and insulated surfaces 851. The commutator 849 may be mounted in any desired manner as long as it rotates in synchronism with said rotary drum 806. The series of brushes 852 to 860 are mounted in a slot 861 of the rockable support member 816 and are arranged to cooperate with the commutator 849. The output brush 852, always contacting the conducting surface 850, is connected to the output lead 847. The brushes 852 to 860 are connected to each stage of the counter 734. In the particular arrangement the connections are: brush 853—lead C2 of stage C; brush 854—lead A2 of stage A; brush 855—lead B1 of stage B; brush 856—lead C1 of stage C; brush 857—lead A1 of stage A; brush 858—lead D2 of stage D; brush 859—lead B2 of stage B; and brush 860—lead D1 of stage D.

The following table shows the counter condition and the voltage fed to the amplifier for each digit to be indicated (state of the counter) and each relative position of the commutator and brushes. In the table the first column indicates the number registered in the electronic counter; the second to fifth columns inclusive indicate which of the leads A–1 or A–2, B–1 or B–2, C–1 or C–2, D–1 or D–2 is energized, i.e., is positive with respect to the other. The commutator in each position connects four of the eight leads, one from each pair, to the amplifier. The resulting voltage, depending upon the number of connected and energized leads, varies from four units (when all the connected leads are energized) to zero units (when none are energized). The intermediate voltage levels are one unit, two units, and three units depending upon whether one, two, or three of the connected leads are positive. The control may be arranged to operate when all the connected leads are positive or all negative.

These voltage levels are indicated in columns 5 to 14 inclusive for each position of the commutator for each number that may be registered in the counter. It should be noted that the voltage level rises and falls by unit steps and reaches four units (to stop the indicator) only once in each revolution.

TABLE

| No. in Counter | Leads Energized | | | | Voltage to Amplifier in Units at Each Commutator Position | | | | | | | | | |
|---|---|---|---|---|---|---|---|---|---|---|---|---|---|---|
| | A | B | C | D | 0 | 8 | 9 | 1 | 5 | 7 | 3 | 2 | 6 | 4 |
| 0 | 2 | 2 | 2 | 2 | 4 | 3 | 2 | 3 | 2 | 1 | 2 | 3 | 2 | 3 |
| 1 | 1 | 2 | 2 | 2 | 3 | 2 | 3 | 4 | 3 | 2 | 3 | 2 | 1 | 2 |
| 2 | 2 | 1 | 2 | 2 | 3 | 2 | 1 | 2 | 3 | 1 | 2 | 3 | 4 | 2 |
| 3 | 1 | 1 | 2 | 2 | 2 | 1 | 2 | 3 | 2 | 3 | 4 | 3 | 2 | 1 |
| 4 | 2 | 2 | 1 | 2 | 3 | 2 | 1 | 2 | 3 | 2 | 1 | 2 | 3 | 4 |
| 5 | 1 | 2 | 1 | 2 | 2 | 1 | 2 | 3 | 4 | 3 | 2 | 1 | 2 | 3 |
| 6 | 2 | 1 | 1 | 2 | 2 | 1 | 0 | 1 | 2 | 3 | 2 | 3 | 4 | 3 |
| 7 | 1 | 1 | 1 | 2 | 1 | 0 | 1 | 2 | 3 | 4 | 3 | 2 | 3 | 2 |
| 8 | 2 | 2 | 2 | 1 | 3 | 4 | 3 | 2 | 1 | 0 | 1 | 2 | 1 | 2 |
| 9 | 1 | 2 | 2 | 1 | 2 | 3 | 4 | 3 | 2 | 1 | 2 | 1 | 0 | 1 |

The commutator 849 and the brushes 852 to 860 that are used in the circuit controlling the indication of a count are not part of this invention and are described for the purpose of showing a circuit means controlled by a commutator for energizing the solenoid operated latch for stopping the drum member in selected positions.

The commutator 849 is shown relative to the brushes in the position it occupies to indicate a zero. In such a position the brushes 855, 856, 857 and 860 bear on insulated portions while the remaining brushes 853, 854, 858 and 859 bear on conducting portions which are electrically connected to the portion cooperating with the brush 852 which is the output brush connected to the lead 847.

As the commutator moves one step counterclockwise from the position shown, the brush 858 passes from the conducting portion to the insulated portion while the brush 860 passes from the insulated to the conducting portion. These two brushes are connected to the fourth or D stage of the electronic counter and represent a change of eight in the count.

Proceeding clockwise in the figure (counterclockwise movement of the commutator relative to the brushes) to the following positions that are reached as the commutator continues to rotate counterclockwise one finds that in passing to he second position from the zero, the nine position, brush 857 passes from an insulated to a conducting segment while brush 854 passes from a conducting to an insulated portion. The same continues for the succeeding steps. In transferring from each step to the next, one brush of each pair passes from an insulated to a conducting portion while the other brush of the pair passes from a conducting to an insulated segment. In this arrangement for any possible position of the commutator with respect to the brushes four of the brushes bear on insulated portions of the commutator while the remaining four brushes bear on conducting portions. By the pattern of the insulated portions in respect to the conducting portions these combinations are varied to correspond to the combinations of conducting states in the electronic counter representing each of the digits 0 to 9 inclusive. The drum members 806 are stopped in positions corresponding to such combinations of conducting states when a signal from the counter energizes the solenoid 826. As the commutator 849 approaches a position corresponding to the count in the counter the voltage on the output lead 847 rises stepwise from one voltage level to the next as it approaches the final position. This arrangement avoids the production of large transient voltages which may interfere with the operation of the counter.

To summarize: the readout device is connected to the electronic counter 734 when it is desired to display or print numerical figures corresponding to the count accumulated in the counter in conventional and aligned figures so that they may be easily read or printed. When the display device is in operation and when the power wheels 803 are engaged by the idlers 805, the drive for the drum members 806 bearing indicia on their cylindrical surfaces is positioned as shown in FIG. XVIII with the power wheels 803 continuously rotating and driving the idlers 805 and the drum members 806.

The drum members 806, once started, are continually in motion until they are stopped in positions corresponding to a count in the controlling electronic counter 734. The drum members 806 are stopped in such positions in response to a signal from the counter by the action of solenoid operated latches 823 engaging the idlers 805 and stopping the drum members 806 gear engaged with the idlers at one of ten possible stopping positions.

The inertia of the stopping driven members rocks their associated support members 816 counterclockwise, as viewed in FIGS. XVIII and XIX, out of engagement with the sectors 831 which are then instantly urged against the idlers 805 under the action of the springs 832. In such position, each sector 831 locks its latch 823 to accurately hold its drum member 806 to align one of the ten indicia on the periphery of the drum in viewing position.

When a new reading is to be made, the rotary solenoid 841 is caused to be energized momentarily rocking the shaft 839 and the bar 842 attached thereto. The bar 842 first rocks the sectors 831 clockwise unlocking the stopped drum members 806 and then rocks the support members 816 in the same direction about the axis of the shaft 811 to bring the idlers 805 into frictional engagement with the power wheels 803, whereby all of the rotatable drum members 806 are simultaneously, quickly and positively started and continue in motion until they are each again stopped and locked in indicating positions corresponding to a count in the corresponding section of the controlling electronic counter 734.

For a more detailed description of the construction and operation of such a binary to decimal converter and a readout device reference is made to United States Patent No. 2,759,672, issued August 21, 1956, and entitled "Mechanical Drive Numerical Display Devices." Reference is also made to another embodiment suitable for use herein which is described in copending application Serial No. 15,499, filed March 16, 1960, and assigned to the same assignee as this invention.

Referring now to FIG. XXI, there is illustrated a schematic diagram embodying the features set forth functionally by the block diagram of FIG. XVI. In particular there are shown, schematically, the circuits which may be used for the gated amplifier 716, the Flip Flop 720, and AND logic circuit 750, the NOT logic circuit 760, the OR logic circuit 728, and the check relay 732. The output circuit combination that is represented schematically comprises the gated amplifier 716 which includes a three electrode electronic device 900 having a pair of load circuit electrodes, an anode 901 and a cathode 902, and a control electrode or grid 903. The anode 901 is connected through an anode load resistor 2R11 to a first supply source 1B+. The cathode 902 is connected to the system or chassis ground. The control or grid electrode 903 is connected through resistors 2R16 and 2R15 to a source of high bias voltage V2 which has a rather low current output. The junction of the resistors 2R15 and 2R16 is connected through a switch SW1 to a second bias source V1 which has a lower voltage than the first bias supply V2 but a much stronger current output. The grid or control electrode 903 is also coupled through a coupling capacitor 2C1 to the output of the scanner 94 or the multiplier 714 depending upon whether or not the multiplier is deleted from the circuit as hereinbefore described.

The Flip Flop 720 comprises a pair of three electrode electronic devices 910 and 920 which may be two halves of a dual triode as shown. The electronic device 910 has a pair of load electrodes, the anode 911 and cathode 912, and a control or grid electrode 913. The electronic device 920 has two load electrodes, an anode 921 and a cathode 922, and a grid or control electrode 923. The load electrodes 911, 912 and 921, 922 of the electronic devices 910 and 920 are respectively connected through anode load resistances 2R20 and 2R21 to a floating supply voltage 2B+ from one side and through a common cathode resistor 2R25 to the floating ground 2B— on the other side. The junction of the anode 911 and the resistor 2R20 is connected through a voltage divider comprising resistances 2R26 and 2R27 to the floating ground 2B—. The junction of the voltage divider resistors 2R26 and 2R27 is connected to the grid or control electrode 923 of the electronic device 920. The junction of the anode 921 and the resistor 2R21 is connected through a first voltage dividing network comprising the resistors 2R22, 2R23 and 2R24, to the floating ground 2B—. The junction of the anode 921 and the resistor 2R21 is also connected through a second voltage divider comprising resistors 2R28 and 2R29 to the floating ground 2B—. The output of the Flip Flop 720 is from the junction of the resistors 2R28 and 2R29 through a gas tube device NE1.

The grid or control electrodes 913 and 923 are also respectively cross-connected to the anodes 921 and 911 through the feedback capacitors 2C15 and 2C19. The grid or control electrodes 913 and 923 are also connected to the floating ground 2B— through the grid loading capacitors 2C17 and 2C20 respectively. The output of the gated amplifier 716 is coupled through a coupling capacitor 2C18, the rectifier CR10 in the reverse direction, and the input capacitor 2C16 to the grid or control electrode 913 of the electronic device 910. The resistors 2R30, 2R31, 2R32 and 2R33 in combination with the rectifier CR10 form a clipping circuit to clip a portion of the signal from the gated amplifier 716 to the input capacitor 2C16 of the Flip Flop 720. The resistors 2R32 and 2R33 are connected in series between the floating ground 2B—and the floating supply 2B+. The resistor 2R30, the rectifier CR10, and the resistor 2R31 are connected in series between the floating ground 2B— and junction of the resistors 2R32 and 2R33. The operation of this clipping circuit will be described hereinafter. A reset capacitor 2C12 and its charging resistor 2R17 are connected in series between the floating 2B+ supply and the floating 2B— ground. The junction of the reset capacitor 2C12 and the resistor 2R17 is connected through a switch SW2 to the junction of the resistors 2R23 and 2R24.

On the left side of the lower half of the schematic in FIG. XXI is shown one method for deriving the floating power supply, designated hereinbefore as 2B+ and 2B—. A power supply 2B+ is connected across a voltage dividing network comprising a resistor 2R1, an adjustable tapped resistor 2R13 and a resistor 2R2 which is connected to the chassis or system ground. The power supply furnishes the 2B+ voltage and the tap of the adjustable resistor 2R13 supplies the 2B— floating ground voltage. This 2B— floating ground voltage is supplied to the latch activating circuits and the AND logic circuit 750, to be hereinafter described, through the normally closed switch SW3. A resistor 2R8 and a capacitor 2C2 are also connected in series between the 2B+ supply and the chassis or system ground. The junction of the resistor 2R8 and the capacitor 2C2 is connected to the side of the switch SW3 opposite that which is connected to the tap on the resistor 2R13. Therefore, while the switch SW3 is closed the junction of the resistor 2R8 and the capacitor 2C2 supplies the 2B— floating ground voltage as hereinbefore described.

Since the latch activating circuits are identical in connection and operation only one of them will be described. The latch activating circuit 930 comprises a three electrode electronic device having two load electrodes 931 and 932, anode and cathode, and a grid or control electrode 933. The activating coil of its associated latch solenoid, the anode electrode 931, the cathode electrode 932 and a cathode resistor 2R3, are connected in series circuit relationship between the floating 2B+ supply and the floating 2B— ground. The bypass capacitor 2C4 is connected in parallel with the cathode resistor 2R3.

The AND logic circuit 750 comprises the rectifiers CR1, CR2, CR3, and CR4, a voltage dropping resistor 2R10 and an output resistor 2R9. The voltage dropping resistor 2R10 is connected from the floating 2B+ supply through each of the rectifiers CR1, CR2, CR3 and CR4 through its respective associated low impedance cathode resistor path 2R3, 2R4, 2R5 and 2R6 to the floating 2B— ground. When none of the latch activating circuits are conducting the cathode resistors provide low impedance paths for the current to flow from the floating 2B+ supply to the floating 2B— ground. When all of the latch activating electronic devices are conducting the current flow through the associated cathode resistors causes a voltage drop across each cathode resistor to block its associated CR rectifier and thus block the low impedance path that was hereinbefore presented. As long as at least one of the latch activating electronic devices is not conducting the low impedance path thereby presented prevents an output to the output resistor 2R9 of the AND logic circuit 750. Therefore, when all of the latch activating circuits are conducting an output appears on the resistor 2R9.

The NOT logic circuit 760 comprises a three electrode electronic device having a pair of load circuit electrodes, anode 971 and cathode 972, and a grid or control electrode 973. The anode 971 is connected through an anode load resistor 2R7 to the floating 2B+ supply. A voltage divider comprising the resistors 2R18 and 2R19 is connected between the 2B+ supply and the 2B— floating ground. The cathode 972 is connected to the junction of the resistors 2R18 and 2R19. The grid or control electrode 973 is connected to the output of the AND logic circuit 750 through the resistor 2R9. The output of the NOT logic circuit 760 is taken through a two electrode gas tube NE2.

The OR logic circuit 728 comprises a three electrode electronic device 980 having a pair of load electrodes, anode 981 and cathode 982, and a grid or control electrode 983. The anode 981 is connected to the 2B+ floating supply. The cathode 982 is connected through an activating coil of the check relay 732 to the floating 2B— ground. The grid or control electrode 983 is connected to the output of the NOT logic circuit 760 from the gas filled tube NE2 and is also connected through a resistor 2R12 to the output of the Flip Flop 720 through the gas filled tube NE1. The grid or control electrode 983 is connected through the resistor 2R12 and a time delay capacitor 2C8 to the floating 2B— ground. A discharge resistor 2R14 is connected in parallel with the time delay capacitor 2C8.

The operation of the circuit and apparatus of FIG. XXI is as follows. Assume that the electronic device 910 of the Flip Flop circuit 720 is conducting through its load electrodes 911 and 912. Therefore, the grid 923 of the electronic device of tube 920 is kept at a potential close to the 2B− ground and the tube 920 is not conducting. Thus, the potential on the anode or plate 921 of the tube 920 is close to the potential of the floating 2B+ supply and has a voltage sufficiently high to ignite or fire the gas tube NE1 and supply an output to the grid or control electrode 983 of the tube 980 of the OR logic circuit 728.

Assume also that all of the latch activating circuits are not conducting thereby furnishing low impedance paths through the rectifiers CR1 through CR4 of the AND logic circuit 750 and their associated cathode resistances to ground. If at least one of the latch activated tubes is not conducting there will be no output through the resistor 2R9 to the grid or control electrode of the tube 970 of the NOT logic circuit 760. Therefore, the tube 970 will not be conducting and the potential of the anode or plate electrode 971 will be sufficiently high to ignite or fire the gas tube NE2 and supply an output to the grid or control electrode 983 of the tube 980 of the OR logic circuit 728. The tube 980 of the OR logic circuit 728 will conduct through its anode 981 and cathode 982 circuit and hold the check relay 732 energized as long as there is an output from either the NOT logic circuit 760 or the Flip Flop circuit 720.

Assume now that an item is placed upon the weight sensing device 91 causing the scanner 94 to generate a series of pulses to the multiplier 714. At least one of the pulses from the multiplier 714, probably the first one, will be passed through the coupling capacitor 2C1 and applied to the grid or control electrode 903 of the tube 900 of the gated amplifier 716. Prior to placing the item on the weight sensing device 91 the switch SW1 was open. This biased the grid or control electrode 903 through the high voltage bias source V2 through the resistors 2R15 and 2R16 to stop conduction in the tube 900. Upon placing the item on the weight sensing device 91 the gating switch SW1 which is operatively linked to the weight sensing device 91 is closed. This places a lower voltage bias on the grid or control electrode 903 of the tube 900 so that a negative pulse fed through the capacitor 2C1 from the scanner will be sufficient to start the tube 900 conducting. The pulse through the coupling capacitor 2C1 must have a negative amplitude that is somewhere between the positive amplitudes of the bias-voltages V1 and V2. Thus, the amplifier 716 is gated only in response to the closing of the gating switch SW1. This adds an additional feature of reliability to the system since no false signals are allowed through the amplifier 716 before an actual weighing operation.

When the tube 900 starts conducting the potential of the anode electrode 901 is lowered suddenly toward system or chassis ground causing a negative pulse to be passed through the coupling capacitor 2C18 to the input of the Flip Flop 720. The combination of the resistors 2R33 and 2R32, of the clipping circuit hereinbefore described, provides a voltage divider which biases the junction of the resistors 2R32 and 2R33 at some intermediate level between the floating 2B+ supply and the floating 2B− ground. This applies a positive reverse bias through the resistor 2R31 on the input rectifier CR10. Therefore, when the negative pulse is passed by the capacitor 2C18 a first predetermined magnitude of said pulse is clipped by the positive reverse bias on the rectifier CR10. This allows the Flip Flop 720 to take advantage of the high signal-to-noise ratio of the input signal. The capacitors 2C17 and 2C20 that connect each of the grid or control electrodes 913 and 923, respectively, to the floating 2B− ground are so connected to decrease the sensitivity of the Flip Flop 20, also taking advantage of the good signal-to-noise ratio characteristics of the input signal. By capacitively loading the grids, the sensitivity can be altered without altering the direct-current characteristic of the Flip Flop 720. Further, the combined effect of the two pairs of capacitors 2C15, 2C17 and 2C19, 2C20 tends to wash away any stray capacitance effects in the Flip Flop 720.

The input signal from the gating amplifier 716 is thus passed through the rectifier CR10 in a reverse direction and the capacitor 2C16 to the grid 913 of the floating tube 910. The negative input signal to the grid 913 tends to stop the tube 910 from conducting. If the tube 910 starts to cease conduction the potential of its plate 911 rises which gives a positive signal through the capacitor 2C19 to the grid 923 of the tube 920 which tends to start the tube 920 conducting. As the tube 920 starts to conduct, the potential on its plate 921 starts falling, which is passed through the capacitor 2C15 to the grid 913 of the tube 910 which further adds to the input signal which is causing the conduction of 910 to cease. The two just described effects combine to make the Flip Flop 720 snap from one state of conduction to the other. When the tube 920 is fully conducting, the potential on the plate 921 is lowered below the extinguishing voltage of the gas-filled tube NE1, advantageously a neon tube, and therefore the signal will be removed from the OR logic circuit 728.

Referring now to the operation of the latch activating circuits it can be seen that when a rotary indicia bearing wheel of FIG. XVIII is properly positioned, the commutator 849 of the binary to decimal converter will also be properly positioned with respect to the associated controlling counter as hereinbefore described. Therefore, there is an output from the output brush 847 from the commutator 849 which is fed to the associated latch activating circuit. Assume that this latch activating circuit embodies the electronic tube 930. As is shown in FIG. XXI the input from the binary to decimal converter, i.e., the input from brush 847, is fed to the grid 933 of the tube 930. This drives the tube 930 to conduction in the load electrode circuits 931 and 932 which pulls in its latch solenoid and stops the rotation of the indicia bearing rotary member or number wheel and its associated binary-to-decimal commutator. Because fast operation of this latch solenoid is necessary requiring full tube conduction, the cathode resistor 2R3 is effectively bypassed for a first predetermined length of time by the capacitor 2C4. Current flow in the tube 930 causes a voltage drop across the resistor 2R3 which blocks the low impedance path through the rectifier CR1 that was previously available to the AND logic circuit 750.

When all of the plurality of tube sections are conducting, corresponding to the number of readout devices that are properly positioned, the AND logic circuit 750 will have an output through the resistor 2R9 to the NOT logic circuit 760. That is, the output of the AND logic circuit 750 is applied to the grid or control electrode 973 of the tube 970 which causes the tube 970 to conduct. The potential on the plate 971 drops toward the potential of the floating 2B− ground and the gas-filled tube, advantageously a neon tube, NE2 is extinguished and a second input to the OR logic circuit 728 is removed. The gas-filled tubes NE1 and NE2 on the outputs of the Flip Flop circuit 720 and the NOT logic circuit 760 are advantageously used since when the output voltage of the Flip Flop 720 or the NOT logic circuit 760 goes below the extinguishing voltage of the gas-filled tubes the tubes will extinguish and the output will be zero potential rather than what is actually the particular plate potential at the time. Since both inputs are removed from the OR logic circuit 728, that is, the grid or control electrode 983, the tube 980 will cease to have conduction in the anode 981—cathode 982 circuit and the activating coil of the check relay 732 will be deenergized allowing the check relay to drop out. The dropping out of the check relay 732 furnishes the operative output signal condition which may be utilized to initiate a succeeding cycle whether it be a readout sequence, a printing cycle or other sequence or cycle.

The advantages of obtaining the sampling signal for the AND logic circuit 750 from the cathodes of the latch activating circuits rather than from the anodes where a larger signal is available should be noted. Due to the nature of the use of the latch solenoid, very fast drop out time is requisite. This dictates that the residual current through the latch solenoid coil should be very small, preferably none at all. Semiconductor diodes for use in the AND logic circuit 750 are available having a back resistance in the nature of $10^5$ or $10^6$ ohms at a relatively low price. Furthermore, the magnitude of this back resistance may decrease with time and temperature. To use these diodes in the plate or anode circuit is not practical when these tolerances and conditions are accounted for and would prove very unreliable. By obtaining the signal from the cathode circuit, the operation of the latch solenoid is not affected. Furthermore, it can be shown that the reverse to forward conduction ratio necessary to obtain a full step for the condition where, for example, several of the latch solenoids are energized and then the last one operated, is not at all critical and is greatly exceeded by the inexpensive diode above. This is made possible by the very low impedance signal available from the latch activating circuit. Thus, in the embodiment shown it is possible to use diodes that are less expensive.

After the printing cycle or other readout sequence is completed the latch activating circuits will be deenergized by opening the normally closed switch SW3, thus removing the connection from the floating 2B— ground. Because the latch activating circuits and the Flip Flop circuit 720 have been operating above system or chassis ground by the value of the floating 2B— ground, the opening of the switch SW3 causes the potential at the junction of 2R8 and 2C2 to change to the potential of 2B+. The signal from the gated amplifier 716, which operates at system or chassis ground, is R-C coupled to the Flip Flop 720 with a time constant which differentiates this signal. Since an abrupt change in the floating ground level from 2B— to the value of 2B+ would appear in series with the signal to the Flip Flop 720, therefore appearing as a signal to it, the capacitor 2C2 is utilized. The capacitor 2C2 is connected between the chassis ground and the 2B— floating ground so that the rate of change from floating 2B— ground to the floating 2B+ supply or vice versa, is slow enough that the time constant of the differentiating network will not pass it.

The Flip Flop 720 may be reset by closing the switch SW2. This allows the capacitor 2C12 to discharge through the resistor 2R24 which applies positive signal to the grid 913 of the tube 910. This starts the tube 910 toward conduction and by reversal of the feed back effects described above the Flip Flop 720 snaps back to its original conduction state.

The capacitor 2C8, connected between the floating 2B-ground and the control electrode 983 of the tube 980 of the OR logic circuit 728, functions as a time delay for two conditions. Assume that there had just been a zero weight condition which actuated the latch actuating circuits but did not produce an "ON" output condition in the Flip Flop circuit 720 since there were no pulses generated by the condition responsive device 710. Assume next that the check circuit is reset and an item of some definite weight is placed on the condition responsive device 710. Then the capacitor 2C8 will hold the Flip Flop output signal on the OR logic circuit 728, that is, to the grid or control electrode 983 of the tube 980, until the RC circuits comprising the bypass capacitors and the cathode resistors of the latch activating circuits have had sufficient time to discharge. If the capacitor 2C8 were not utilized it would be possible to obtain a checking condition from a check relay 732 under the above described circumstances. The capacitor 2C8 is charged from the plate or anode 971 of the NOT logic circuit 760 through the gas-filled tube NE2 and will discharge when the gas tube NE2 is extinguished. Under a second condition, if one wheel or rotary drum member 806 of the readout device 738 is still rotating, the charge on the capacitor 2C8 will hold the tube 980 of the OR logic circuit 728 conducting until the last binary-to-decimal commutator reaches its new position of four energized segment brushes on the conducting surface 850 of the commutator 849.

Thus, there is disclosed a check circuit which insures that at least one pulse has passed from the condition responsive device through a preamplifier, shaper or other elements in the multiplier chain, and that all of the indicia bearing rotary drum members of the readout device have been positioned properly with respect to the state of the corresponding counter or computer which controls the rotary drum member. Failure of the scanner projection lamp or any tube from the preamplifier to the last multiplier stage that would eliminate the signal, and with no protection, initiate a print cycle with no computations available is then provided for. The failure of an indicia bearing readout wheel to position on indicia corresponding to the state of the controlling decade counter prevents the initiation of a printing cycle or readout sequence. The failure of an indicia bearing rotary member to lock up and thereby be properly registered also prevents the initiation of a readout sequence or printing cycle. The failure of an indicia bearing rotary drum member to stop rotating which might be caused by a latch activating circuit failure, a broken lead, or other cause again prevents the initiation of the print cycle or readout sequence.

A specific embodiment of a printer suitable for use in the block diagram of FIGS. I and II and designated by number 107 is shown in the copending U.S. application Serial No. 791,728, filed February 6, 1959, in the names of C. E. Adler and F. C. Carroll. This printer is provided with a pair of limit switches spaced along its label chute each having its actuator normally operatively maintained in sensing engagement with the label or ticket strip in the chute. One of the switches is so spaced from the printing station that when the supply of labels or tickets in the printer is down to about seven, i.e., substantially exhausted, the last one of such labels or tickets passes by such switch and the switch operates closing a circuit to a warning light. The other one of the switches is so spaced from the printing station that when the supply of labels or tickets in the printer is down to about four, i.e., exhausted, the last one of such labels passes by such switch and the switch operates opening a circuit to the electrically operated drive means for the printer to stop the printer.

The limit switches provide an exceedingly simple means for warning when the supply of label or ticket strip is substantially exhausted and for automatically stopping the printer when such supply is exhausted and feature sensing of the label strip after it is unrolled from a supply roll. This is in contrast to prior complicated mechanical devices for sensing the near end of a label or ticket roll which operate on the rolls themselves. Such prior devices, since they operate on the rolls, have an accuracy which is a function of the consistency of the diameters of the rolls and must be removed in order to replace the rolls. Hence, such prior devices are expensive, apt to get out of order, inaccurate, and are in the way when rolls are replaced.

Referring to FIG. XII there is shown a fragmentary vertical sectional view of label or ticket strip feeding means corresponding to FIG. VII in the foregoing U.S. application Serial No. 791,728 and incorporating the label or ticket exhaustion indicating means and the means for automatically stopping the printer upon exhaustion of the label or ticket strip of the invention. FIG. XIII is an electrical wiring diagram showing the electrical operation of such label or ticket exhaustion indicating means and such means for automatically stopping the printer.

The printer which is shown in the foregoing U.S. application Serial No. 791,728 intermittently advances, prints, and cuts off successive portions, such as tickets, labels, or the like, from a continuous strip 1001 of such portions. The several working components of the printer are driven by means of a main drive shaft 1002 which is connected through a clutch 1003 and a shaft 1004 to a continuously running motor 1005. The clutch 1003 is an ordinary one-revolution clutch which so operatively connects the main drive shaft 1002 to the continuously turning shaft 1004 that the drive shaft 1002 is turned one revolution for each printing cycle, the clutch being controlled or operated by a solenoid 1006 the energization of which makes the clutch operatively connect the shafts 1002 and 1004 so that they turn as one and the deenergization of which allows the clutch to slip. The main drive shaft 1002 corresponds to the main drive shaft 26 shown in the foregoing U.S. application Serial No. 791,728. The exact nature of the drive means for turning the main drive shaft 1002 is not critical for the purposes of the invention. For example, the clutch 1003 and its solenoid 1006 could be eliminated and the motor 1005 directly connected to the drive shaft 1002, the motor in such case being connected in the circuit shown in FIG. XIII in place of the solenoid. This arrangement would result in an operation of slower speed, since a motor requires time to reach top speed. For a clear understanding of the structure and function of the apparatus of the invention it is necessary only to know that deenergization of the solenoid 1006 or of the motor 1005 paralyzes the drive means which stops operation of the printer.

The main drive shaft 1002 is operatively connected as shown in the foregoing U.S. application Serial No. 791,728 to shaft 1007 which is the drive shaft for mechanism for feeding the label strip 1001 into a printing station 1008; this mechanism includes a supply roll, which is not shown but which is shown and described in copending U.S. application Serial No. 761,622, filed September 17, 1958, in the name of F. C. Carroll, that feeds the label strip into a chute 1009, which is attached to the lower side of a frame member 1010 and which has registering openings 1011 in its upper and lower walls which are juxtaposed to and in registry with an opening 1012 in the frame member 1010. The label strip 1001 is engaged for feeding by a driven pressure roller 1013 which extends through the openings 1011 and 1012 and which cooperates with a driving cam 1014 secured on the shaft 1007. Rotation of the driving cam 1014 in the direction indicated by the curved arrow in FIG. XII, during the interval while an outer portion 1015 of the cam is in pressure engagement with the label strip 1001 and the roller 1013, drives the label strip 1001 toward the printing station 1008.

The driven roller 1013 is journaled in and between spaced arms 1016, only one of which is shown, which are pivoted on an axle 1017 that is supported between a pair of angle brackets 1018, only one of which is shown, on top of the frame member 1010 and is positioned vertically for adjustment of the pressure on the feed cam 1014 by means of an adjustment screw 1019 that is threaded into the top of the frame member 1010 and that is connected to the arms 1016 by means of a bar 1020 extending therebetween. The bar 1020 is clamped in adjusted position between the shoulder on the head of the adjustment screw 1019 and a nut 1021 threaded on the screw.

In order to prevent unexpected running-out of the label strip 1001, electrically operated strip exhaustion warning means is provided; the warning means includes a snap-action, normally closed limit switch 1022 which is hung by means of a bracket 1023 from the underneath side of the frame member 1010 and which has its actuator 1024 normally operatively maintained in sensing engagement with the label strip in the chute 1009, the chute 1009 defining a pair of registering openings 1025 in which the actuator 1024 operates, i.e., the label strip 1001 operates the switch 1022 holding the normally closed switch open.

The limit switch 1022 is so spaced from the printing station 1008 that when the supply of labels in the printer is down to about seven, i.e., substantially exhausted, the last one of such labels passes by such switch and the normally closed switch contacts 1026 of switch 1022 close, i.e., absence of the label strip 1001 at the switch actuator 1024 causes operation of the switch 1022. The contacts 1026 are connected in a lead 1027 which receives current from a lead 1028 that is connected to a suitable source. Closing of the contacts 1026 completes a circuit to a lamp 1029, current flowing through the lamp 1029 and a lead 1030 to the other side of the line. The lighting of the lamp 1029 warns the operator that operation of the printer should be halted and a new supply of label strip provided. Instead of the lamp 1029, a bell or any other electrical indicator could be utilized.

Should the operator fail to heed the signal from the warning means, the printer automatically is stopped shortly thereafter. A snap-action, normally open limit switch 1031 is located on top of the frame member 1010 adjacent the registered openings 1011 and 1012 in the chute 1009 and in the frame member 1010, respectively. The switch 1031 has its actuator 1032 normally operatively maintained in sensing engagement with the label strip 1001 in the chute 1009, the actuator 1032 operating in such openings 1011 and 1012, i.e., the label strip 1001 operates the switch 1031 holding the normally open switch closed. The limit switch 1031 is so spaced from the printing station 1008 that when the supply of labels in the printer is down to about four the last one of such labels passes by such switch and the normally open switch contacts 1033 of switch 1031 open, i.e., absence of the label strip 1001 at the switch actuator 1032 causes operation of the switch 1031. The label supply is considered exhausted when the supply is down to about four because the last one of such labels is advanced beyond the feed cam 1014 and no more labels can be fed into the printing station 1008 even though several labels still remain in the chute 1009. The contacts 1033 are connected in a lead 1034 which receives current from the lead 1028. Opening of the contacts 1033 breaks a circuit to the solenoid 1006 the deenergization of which paralyzes the drive means for the printer which stops operation of the printer as hereinbefore described. The length of the label strip 1001 when the supply of labels is substantially exhausted is defined as a first predetermined minimum length and the length of the label strip 1001 when the supply of labels is exhausted is defined as a second predetermined minimum length.

The limit switches 1022 and 1031 provide an exceedingly simple means for warning when the supply of label strip is substantially exhausted and for automatically stopping the printer when such supply is exhausted and feature sensing of the label strip after it is unrolled from a supply roll. Hence, the sensing accuracy is independent of supply roll diameters and there is nothing to obstruct replacement of the supply roll. The warning and stopping means are of low cost, not apt to get out of order, accurate, and are not in the way when supply rolls are replaced.

Referring to FIGS. XXII, XXIII and XXIV there is illustrated the master control and sequencing circuit for the electronic computing scale disclosed in this application.

The relays and all other components illustrated are shown in across-the-line diagrams. Their contacts therefore are often located remote from the actuating coils. In order to illustrate the relationship and location of actuating coils and contacts, the marginal key has been employed with each circuit diagram whereby the circuits are divided into horizontal bands with are identified by line numbers in the right hand margin of the figure. Relay symbols are located in that margin to the right of the key numbers in horizontal alignment with the relay actuating coil positions. Each contact actuated by a relay coil is designated to the right of the relay symbol by the numeral of its line location. Back contacts, those which are normally closed when the relay armature is dropped out and are opened when the actuating coil is energized, are underlined in the key to distinguish them from front contacts, those which are closed upon the coil being energized. Thus for example, price and name relay K3 has its actuating coil located at line 54 of FIG. XXIII and when energized closes its front contacts at lines 26, 49 and 55 of FIGS. XXII and XXIII, respectively designated in the margin as 26, 49, 55 and opens its back contacts at line 35 of FIG. XXII designated in the margin by 35. Each contact is also labeled with the symbol of its actuating means and is illustrated in the condition it assumes while its armature is dropped out so that the front contacts of the price and name relay K3 are shown open, as in line 26, and are labeled K3 while the similarly labeled back contact K3 at line 35 is shown closed.

To assist in locating the various relays and other components in the master control circuit the following list is provided setting forth the symbol of the component, name of the component and line location.

*Component List*

| Symbol | Name | Line Location |
|---|---|---|
| B2 | Main Drive Motor | 18 |
| B3 | Readout Fan Motor | 17 |
| B4 | Computer Fan Motor | 19 |
| HR1 | Activator Heat Element | 12 |
| I1 | Scanner Lamp | 23 |
| I2 | Scale Projection Lamp | 22 |
| I3 | Tare Lamp | 34 |
| I4 | Set Price and Name Lamp | 35 |
| I5 | Add Label Lamp | 33 |
| I6 | Take Label Lamp | 36 |
| I7 | Ready Lamp | 26 |
| I8 | Press Reset Lamp | 27 |
| K1 | Change Price Relay | 50 |
| K2 | Change Commodity Relay | 52 |
| K3 | Price and Name Relay | 54 |
| K4 | Start Cycle Relay | 58 |
| K5 | Scanner Control Relay | 61 |
| K6 | Scanner Start Relay | 62 |
| K7 | Wheel Release Relay | 64 |
| K8 | Cycle Complete Relay | 70 |
| K9 | Take Label Relay | 72 |
| K10 | Motion Detector Relay | |
| K11 | Check Circuit Relay | |
| K12 | Time Delay Relay | 31 |
| LRS | Latch Release Solenoid | 44 |
| MCS | Mechanical Check Solenoid | 41 |
| PS | Print Solenoid | 49 |
| SM1 | Scanner Motor | 13 |
| SR1 | Motor Starting Relay | 18 |
| SW1 | Sensing Bar Switches (Home) | 27, 49, 61 |
| SW2 | Sensing Bar Switches (Out) | 70 |
| SW3 | Sensing Bar Switches (Middle) | |
| SW4 | Repeat Print Switch | 47 |
| SW5 | Carriage Home Switch | 44 |
| SW6 | Carriage Home Switch | 70 |
| SW7 | Paper Supply Switch | 33 |
| SW8 | Commodity Plate Switch | 54 |
| SW9 | Price Change Switch | 54 |
| SW10 | Take Label Switch | 72 |
| SW11 | Take Label Switch | 49 |
| SW12 | Activator Thermostat Switch | 12 |
| SW14 | Paper Supply Switch | 49 |
| SW15 | Housing Door Interlock Switch | 18 |
| SW16 | Tare Switch | 34 |
| SW17 | Overload Switch | 57 |
| SW18 | Zero Switch | 57 |
| SW19 | Scanner (Home) Switch | 62 |
| SW20 | Scanner (Out) Switch | 64 |
| SW21 | Scanner Gate Switch | 73 |
| SW22 | Scanner Off-On Switch | 13 |
| SW23 | Activator Off-On Switch | 12 |
| SW24 | Reset Off-On Switch | 59 |
| SW25 | Printer Mode Switch | 45, 48, 56, 59 |
| SW26 | Thermostat Switch | |
| SW27 | Main Power Switch | 11 |
| SW29 | Repeat Wheel Set Up Switch | 46 |
| TA1 | Tare Switch | 50 |
| TA2 | Tare Switch | 54 |
| T11 | Regulating Plate Transformer | 20 |
| T12 | Filament Transformer | 28 |
| T13 | Plate Transformer | 24 |

Referring to FIG. XXII there is shown in line 10 plug means P1 for attaching the control circuit of this invention to electrical power. Switch means SW27-A and SW27-B in line 11 are ganged together and are operative to be closed to supply power from the plug means P1 to the control system. When power is supplied to the leads L1 and L2 the system is protected by fuses F2 and F1 in lines 12 and 13. The scanner motor filed SM1 in line 13 is supplied with power through the scanner motor switch SW22 and the housing door interlock switch SW15 in line 18. A fan B3, for cooling the readout means, in line 17 is energized. A fan B4, for cooling the computer means, in line 19 is energized. The main drive B2 in line 18 is energized through its starting relay SR1 and runs continuously except when the switch SW15 is opened by the opening of a door to the housing. The switch SW15, then acts as an interlock since the housing door may provide access to the printer, the ticket chute, ink roll, or the scanning mechanism so that when the printer mechanism or the scanning mechanism is being worked on the operation of the main drive motor may be suspended by the opening of the switch SW15. The primary of a regulating plate transformer T11 in line 20 receives power, thus supplying power to the secondary winding of the regulating plate transformer T11 so that the scale projection lamp I2 and the scanner lamp I1 in lines 22 and 23 are illuminated.

Power is also applied to the filament transformer T12 in line 28. The filaments of the various tubes are represented schematically by the block diagram in line 32 and are connected to a first secondary winding of the filament transformer T12. A time delay relay K12 is also connected to the first secondary winding of the filament transformer T12 at line 31. After a predetermined interval the time delay relay K12 closes its contacts in line 24 thus supplying power to a plate transformer T13 in line 24. Circuits are thus enabled to illuminate a "ready" lamp I7 in line 26 through scanner control relay back contacts K5 and motion detector relay back contacts K10 in the same line whenever price and name relay front contact K3 closes after the price has been set and a commodity plate has been inserted into the electronic computing scale. A "press reset" lamp I8 in line 27 will then be illuminated if the switching means SW1-C is closed and the back contacts of the scanner start relay K6 are closed.

When the filament transformer T12 is energized power is then supplied to an "add labels" lamp I5 in line 33. The "add labels" lamp I5 will illuminate when switching means SW7 is closed. The switching means SW7 is responsive to the presence or absence of paper (or labels) in the ticket dispensing chute of the system. Power is also applied to the tare lamp I3 in line 34. The tare lamp I3 will light whenever the switch SW16 is closed. The switch SW16 is responsive to a tare setting knob and may be set to close only when a tare has been set into the electronic computing scale. A "Set Price and Name" lamp I4 in line 35 also receives its power from the first secondary winding of the filament transformer T12 and is illuminated in response to the closing of the price and name relay back contacts K3 in line 35. The relay K3 is responsive to an initial setting of the price and the insertion of a commodity plate and thus the back contacts K3 are closed whenever a price has not been set or a commodity plate has not been inserted as will be described hereinafter. A "take label" lamp I6 in line 36 is illuminated from the filament transformer if the take label relay front contacts K9 in line 36 are closed. The relay K9 is responsive to the end of a printing cycle and will be energized and thus close contacts K9 when a printing cycle is complete indicating that a label is in a dispensing position and should be taken. A second secondary winding of the transformer T12 supplies power to leads L3 and L4 through fuses F, F4 and rectifiers 1CR, 2CR, respectively, for the next portion of the control and sequencing circuit.

Referring to FIG. XXIII there is shown in lines 50–54 an interlocking means which either prevents the actual computation of a total value or prevents operation of the printer or readout device, which is to supply the printed record, if either the unit price setting or the commodity identifying means setting, or both, have been changed and the tare setting means has not also been changed. The operation of the relays K1, K2 and K3 and their interlocking control functions are defined in detail in copending application Serial No. 19,414, filed April 1, 1960, entitled "Interlocking Control Apparatus," and assigned to the same assignee as the present invention. All of the disclosure in the above-referenced copending application is incorporated herein by reference.

A tare setting knob (not shown) is mounted in a panel of the housing of the electronic computing scale described herein on a shaft having mounted thereon a first cam means and a second cam means. The first and second cam means rotate when the tare knob is rotated. The first cam means is operative through a cam follower to open contacts TA2 in line 50 when the tare knob is set at zero. The second cam means is operative through a cam follower to close contacts TA1 in line 54 whenever the tare knob is set at zero. Cam means may also be utilized to operate tare switching means SW16 in line 34.

A price setting means which may include a price setting knob operating a cam means is utilized to operate the switch SW9 in line 54. The price setting means (not shown) is operative through a cam follower and the contacts of the switching means SW9 to close a circuit between the lead L3 and the lower of the two terminals illustrated in cooperation with the switch SW9 when the price setting knob is set at one of a plurality of positions of price indicia. When the price setting knob is changed to another of the indicating indicia the cam follower of the price setting knob is operative to move the switching means SW9 to cause a circuit to be made between the lead L3 and the upper one of the two contacts associated with SW9. Also shown in line 54 are commodity setting contacts or switching means SW8. The commodity identifying switching means SW8 are normally in an open position, that is, contact being made between the pivot of the switching means SW8 and the upper contact of the switching means SW8. When a commodity plate or identifying means is inserted into a proper receiving means the forward portion of the commodity plate is operative to force the switching means SW8 into contact with the lower of the two terminals. That is, the switching means SW8 is normally in the position as shown in the drawings whenever the commodity plate or commodity identifying means is not inserted. If a wheel or drum with commodity indicia embossed on the rim is utilized then a cam means similar to that discussed above in connection with the price setting means and the tare setting means may be utilized to make the circuit changes as just described whenever the commodity identifying setting has been changed.

The interlock apparatus shown in lines 50–54 operates in the following manner. Assume that a previous series of packaged commodities has just been weighed. The weighing of a new series of packaged commodities is about to begin. The apparatus already has a tare setting from the previous commodity that was a predetermined mount.

The price knob may be turned to indicate the new price for the series of commodities being weighed. Thus, the power to the price and name relay K3 is removed and its sealing contacts K3 in line 55 drop out leaving the price and name relay K3 in line 54 deenergized.

Alternatively, the commodity plate may have been removed and a new one inserted, in which case the switching means SW8 has moved from its lower associated terminal to its upper associated terminal and back to its lower associated terminal, whenever another commodity identifying means is inserted. Therefore, the changing of a commodity plate will also break the seal-in circuit to the price and name relay K3 in line 54 causing it to drop out its seal-in contacts K3 in line 55.

Assume that a new unit price has been set so the contacts of SW9 in line 54 are again in the closed position as shown in the drawings, and that a new commodity identifying means has been inserted so that the switching means SW8 has moved to its bottom position. During the interval when the commodity identifying means was removed a circuit had been completed through the switching means SW9 in line 54, switching means SW8 in line 54, and through the change commodity relay K2 in line 52. The change commodity contacts K2 in line 52 close sealing in the relay K2 through the start cycle relay contacts K4 in line 51. Contacts K2 also close in line 54.

When the unit price setting was being changed the contacts of the switching means SW9 had established a momentary circuit through the normally closed tare contacts TA2 in line 50 and through change price relay K1 also in line 50. Contacts K1 closed in line 51 to seal in the change price relay K1 through the start cycle relay contacts K4 in line 51. Contacts K1 also close in line 54.

Before the computer of the scale may be operative to complete a cycle a tare knob as above described must be turned to zero. By turning the tare knob to zero its cam means is operative to open the switching means TA2 in line 50 while a second cam means is operative to momentarily close contacts TA1 in line 54. Thus, an energizing circuit has been completed for the price and name relay K3 through the switching means TA1, change commodity contacts K2, change price contacts K1, commodity change cam operated switching means SW8 and price setting change cam operated switching means SW9, all in line 54. Energization of the price and name relay K3 causes front contacts K3 in line 55 to close establishing a seal in circuit around the contacts K1, K2, and the switching means TA1. Contacts K3 are also closed throughout the rest of the system to allow operation as hereinafter described.

Thus, it may be seen that the price and name relay K3 in line 54 must be energized to continue the cycle when the price or commodity setting has been changed. Start cycle relay K4 in line 58 is energized at the start of each cycle and not dropped out until a readout has been obtained. Therefore, the seal in circuit through the back contacts K4 in line 51 operates as a memory. That is, one can change either the price setting or the commodity plate means *before* a scan operation is accomplished. Both the price setting means and the commodity plate means have to be operated at least once first, however, otherwise the sealing circuit provided by the price and name relay contact K3 in line 55 would be redundant and to no avail.

It should be recognized that the interlocking means just shown can be operated as only a price setting and commodity plate means interlock having the tare interlocking switches TA1 and TA2 in lines 54 and 50 removed.

If the operation of setting the price and inserting the commodity plate has been accomplished then the price and name relay K3 in line 54 is energized and its front contacts in line 26 are closed causing the "ready" lamp 17 to be illuminated, indicating that the electronic computing scale is ready to receive a package to be weighed. A motion detector relay K10 is operated by the output of the motion detecting apparatus described hereinbefore. If there is motion of the scale the relay K10 is operated and front contacts K10 in line 57 are closed. Thus an energizing circuit for the start cycle relay K4 in line 58 is completed through the closed motion detector relay contacts K10, closed cycle complete relay back contacts K8, overload switching means SW17 and zero switching means SW18, and on through the now closed seal-in contacts K3 in line 55. This is operative to open the start cycle back contacts K4 in line 51 in the commodity and price setting interlock circuit. However, there is no effect upon the price setting and commodity interlock circuit if there is no change in the price setting or commodity plate. Start cycle contacts K4 in line 58 close to seal in the energization of the relay K4 around the motion detector contacts K10 in line 57. Contacts K4 in line 61 close enabling scanner control relay K5 circuit through motion detector relay back contacts K10, wheel release relay back contacts K7 cycle complete relay back contacts K8 and scanner home switch SW19 in line 62. The sensing bar home switching means SW1-A are closed when the previous cycle has checked out successfully. The switching means SW19 is in the position shown when the scanner is in the home position. A scanner may be utilized herein which has a one cycle oscillation and a home position from which it starts. Cam means at that home position operate the switching means SW19. Relay contacts K4 also close in line 64 to ready the circuit for the energization of relay K7.

The energization of the scanner control relay K5, which occurs after the motion-no-motion cycle described above, causes the closure of a first set of K5 contacts and the opening of a second set of K5 contacts, both in line 16, and controls the scanner motor in cooperation with the operation of scanner start relay contacts K6, and back contacts K5 in line 26 control the "ready" lamp 17. Contacts K5 in line 61 provide a seal-in circuit for the relay K5 around the switching means SW19 in line 62. Contacts K5 in line 63 close to energize the scanner start relay K6. Contacts K5 in line 73 close to enable a circuit which allows the count of pulses only when the scanner is moving in a predetermined direction.

The energization of scanner start relay K6 closes contacts K6 in line 15 to supply energization to the shaded pole scanner motor to start a scan. After the scanner motor has moved approximately 10 to 15 degrees from its home position the cam operated switch SW19 is allowed to close to insure that the energization of the scanner start relay K6 is maintained until the scanner completes its cycle and returns to the home position. Back contacts K6 in line 27 open to extinguish or to disable the circuit for the illumination of the "press reset" lamp.

Wheel release relay K7 is operated by the closure of the scanner out switch SW20 in line 64. The switch SW20 closes when the scanner is in its out position. The wheel release relay K7 is energized through the K4 contacts which have already been closed and the back contacts of the relay K10 which are closed since no motion is now being detected. Contacts K7 close in line 44 to enable the latch release solenoid LRS circuit. Back contacts K7 open in line 61 to deenergize the relay K5. Front contacts K7 close in line 65 to seal in the relay K7 around the switching means SW20.

Cycle complete relay K8 is energized by the sensing bar out switch SW2 in line 70 which is closed by the sensing bar contacts whenever the readout has been successfully started, as described in application Serial No. 15,499, mentioned above. The switching means SW6, also in line 70, are closed whenever the printer carriage is at home or, in other words, responsive to the printer being at rest. The left side of the switching means SW6 is at ground potential whenever the commodity plate and price setting interlock is operated maintaining the sealing circuit for the commodity and price interlock through price and name relay contacts K3 in line 55 when closed. Contacts K8 in line 45 are closed to further enable the print solenoid PS in line 49. Back contacts K8 open to deenergize the relay K4 in line 58. This drops out wheel release relay K7 through the opening of contacts of K4 in line 64. Relay K7 is deenergized thus opening its contacts K7 in line 44 and dropping out the latch release solenoid LRS, also in line 44. The latch release solenoid operation thus may be a one revolution clutch. Back contacts K8 open in line 60 to disable an energizing circuit for scanner control relay K5. Contacts K8 close in line 71 providing a seal-in circuit for the relay K8 in line 70. The cycle complete relay K8 stays energized until one print operation is initiated. When the print operation is initiated the carriage home switching means SW6 in line 70 is moved from its position shown in the drawings to a contact position directly below, causing K8 to drop out. Thus the seal circuit provided by contacts K8 in line 71 is broken.

When the printer carriage starts to move the movement of the carriage home switching means SW6 in line 70 from its upper contact to its lower contact energizes take-label relay K9. Contacts K9 in line 72 close sealing in the relay K9. Front contact K9 in line 36 closes lighting the "take-label" lamp 16. Back contacts K9 in line 44 open disabling the latch release solenoid circuit and interlocking it whereby readout cannot be accomplished from the readout wheels while a printing cycle is in operation. This interlock is further assisted by the switching means SW5 which is opened except when the printer carriage is back home or the printing cycle is completed. Back contacts K9 in line 49 open disabling the print solenoid circuit. When the activator is pressed to prepare a label for attachment to a package the switching means SW10 is operated in line 72 dropping out the relay K9.

A memory function of the circuit should be noted in that the start cycle relay K4 can be pulled in by a new "no-motion" cycle. With a new cycle the relay K4 can be pulled in and seal in through contacts K4 in line 58; however, the scanner control relay K5 will not be operated until the scanner returns to its home position, if it is not already there. After the scanner returns to its home position the same operation described hereinbefore can proceed until the wheel release relay K7 is pulled in. However, contacts K7 in line 44 are not operative to initiate the mechanical readout cycle through the latch release solenoid LRS since the take-label relay back contacts K9 in line 44 are still open since a label has not been taken. It should be noted that take-label switching means SW11 in line 49, which is not closed until the label activator is released, requires that no printing be done until the activator is released since it would be possible then to print a second label and have the second label down before the previous label had been released. The take-label switching means SW11 opens before the take-label switching means SW10 so that the print solenoid PS is not unblocked before the activator is released, through the back contacts K9 in line 49.

With the control circuit described herein the computing scale reads out only the last scan so that if the label is not taken, regardless of the number of scanning cycles, only the last value has been stored. Operation of the motion detector relay K10 during the cycle drops out the scanner control relay K5 by opening the back contacts K10 in line 61. When this happens back contacts K5 close and front contacts K5 open in line 16 reversing the direction of operation of the scanner motor SM1 which, when the scanner reaches its home position, will provide a new scan if the motion has stopped and the back contacts K10 in line 61 are closed.

The reset pulse required for resetting the counters may be provided by the closure of K6 front contacts. The closure of K6 contacts is also advantageously utilized to provide a reset signal for the check circuitry flip-flop.

*Sequential Operation*

The just described circuit connections and details of individual operation should be considered in the overall pattern of sequential operation, since the invention provides additional advantages in said sequence. Therefore, the normal operation of the embodiment of the electronic computing scale will be described in a series of steps. Reference to FIG. XIV will help clarify the relative times of component operation.

Assume that the power is off; the housing door is closed; the printer mode switch is in position number one of the following positions: (1) off, (2) on, (3) demand, and (4) continuous; the activator is off; no labels in the machine; no commodity plate in the machine; and that the scanner, sensing bar, and printer carriages are in "home" position. All relays are deenergized. The following cam operated switches are operated: SW1, SW3, SW5, SW6, SW15, SW16, SW18, SW19, and SW21. The remainder of the SW series are not operated and are in their normal positions.

Sequence step Number 1: The main power switch SW27 (A and B) is manually closed to the "ON" position. The motor starting relay SR1 in line 18 operates to start the main drive motor B2, also in line 18. Power is applied to the primary windings of the regulated plate and filament transformers T11 and T12 in lines 20 and 23. Time delay relay K12 in line 31 is energized from a secondary winding of T12. The readout fan and computer fan motors B3 and B4 in lines 17, 19, are started. The scanner and scale projection lamps I1 and I2 in lines 23, 22 are turned on. Lamp I4 in line 35 lights to indicate that the price and name should be set. Lamp I5 in line 33 lights to indicate that labels should be inserted. The check circuit output relay is energized. Change commodity relay K2 in line 52 is energized and seals in through K2 contacts in line 52.

Sequence step Number 2: The activator switch SW23 is turned to the "ON" position and the activator heat element HR1 is thus turned on in line 12.

Sequence step Number 3: A ticket supply is inserted in the printer. Paper supply switches SW7 and SW14 in lines 33, 49, are operated. The operation of SW7 extinguishes the add labels lamp I5 in line 33. Housing door interlock switch SW15 in line 18 interrupts the supply to the scanner motor SM1 and the main drive motor B2 in lines 13 and 18 while the housing door is open.

Sequence step Number 4: The mode of operation of the printer is chosen. Assume that regular operation is desired so that the ganged four arms are manually turned to the "ON" position.

Sequence step Number 5: A commodity plate or knob is inserted or operated. Commodity plate switch SW8 in line 54 is operated, breaking the original energization circuit for the change commodity relay K2 in line 52.

Sequence step Number 6: The price per pound is changed, operating price change switch SW9 (during the change only). The operation of SW9 energizes the change price relay K1 in line 50 which seals in through contacts K1 in line 51. Since the change price and change commodity relays K1 and K2 are now energized, if the tare interlock provisions are not utilized, the price and name relay K3 in line 54 is energized, as hereinbefore described, extinguishing set price and name lamp I4 in line 35 by the opening of back contacts K3.

Sequence step Number 7: If the tare interlock provisions are utilized then the tare must go to zero and be set as described, before energization of K3. When the tare is set tare switch SW16 is removed from the operated position and lamp I3 lights in line 34 indicating that the tare has been set.

Sequence step Number 8: Time delay relay K12 at line 31 times out closing contacts K12 at line 24 to supply power to the plate transformer T13. Lamp I7 at line 26 then lights through back contacts K5 and K10 and recently closed price and name relay contacts K3.

Sequence step Number 9: Weight is placed on the platter or commodity receptacle. Motion detection relay K10 is energized. Contacts K10 at line 57 close energizing start cycle relay K4. Contacts K4 close at line 58 to seal in relay K4. Back contacts K4 at line 51 open deenergizing the change price and change commodity relays K1 and K2. The price and name interlock is not disturbed because of its seal-in contacts K3 at line 55. Back contacts K10 at line 26 open extinguishing ready lamp I7.

Sequence step Number 10: Motion of the platter ceases. Motion detector relay K10 is deenergized. Scanner control relay K5 at line 61 is energized as back contacts K10 close since front contacts K4 have just previously been closed. Back contacts K5 in line 26 open maintaining lamp I7 dark even though back contacts K10 close. Scanner start relay K6 in line 62 is energized by the closing of front contacts K5 in line 63. The closing of front contacts K6 in line 15, the opening of back contact K5, and the closing of front contacts K5 in line 16 starts the scanner motor for movement in the forward direction. Contacts K6 (not shown) close to provide reset pulses to the computer circuits and to the check circuitry.

Sequence step Number 11: The scanner moves off "Home" position. Scanner gate switch SW21 in line 73 returns to normal position (closed) allowing pulses to shaper gate circuit. Scanner home switch SW19 in line 62 returns to a non-operated position providing a seal-in circuit for scanner start relay K6 until the scanner returns to "Home" position.

Sequence step Number 12: The scanner reaches the "out" position. Scanner gate switch SW21 in line 73 is opened to close the gate to the computer. The scanner "out" switch SW20 is operated in line 64 energizing wheel release relay K7 through previously closed K4 front contacts and back contacts K10. Scanner control relay K5 is deenergized by the opening of back contacts K7 in line 61. Latch release solenoid LRS is energized by the closure of front contacts K7 in line 44. Scanner motor travel is reversed by the closing of back contacts K5 and the opening of front contacts K5 in line 16. The closing of K5 back contacts in line 26 lights the ready lamp I7, indicating that the scanning portion of the cycle has been completed and the electronic computing scale is ready to receive another weight to be weighted and the information stored.

Sequence step Number 13: The sensing bar of the mechanical readout leaves "Home" position. The sensing bar no longer operates switch SW1 series. An SW1 scwitch (not shown) opens to prepare the check circuit. When the sensing bar reaches the "middle" position a switch SW3 (not shown) is no longer operated turning off the trigger (latch) solenoid power. The indicator wheels are now in motion.

Sequence step Number 14: The sensing bar reaches the "out" position operating switch SW2 energizing cycle complete relay K8 at line 70. Back contacts K8 at line 57 open deenergizing start cycle relay K4. Front contacts K4 at line 64 open deenergizing wheel release relay K7. Latch release solenoid LRS is deenergized by the opening of contacts K7 at line 44.

Sequence step Number 15: The sensing bar leaves the "out" position removing operation of the switch SW2 in line 70 opening the switch.

Sequence step Number 16: The scanner leaves the "out" position removing operation of first the scanner "out" switch SW20 and then the scanner gate switch SW21 in lines 64 and 73.

Sequence step Number 17: The sensing bar reaches the "check" position operating sensing bar "middle" switch SW3 thereby restoring power to the trigger circuit. The indicator wheels stop moving.

Sequence step Number 18: Indicator wheels check electrically. The check circuit relay K11 is deenergized by the check circuit amplifier. The mechanical check solenoid MCS is energized by the closure of the check circuit relay back contacts K11 in line 41 and the sensing bar leaves the check position.

Sequence step Number 19: The indicator wheels check mechanically as the sensing bar goes into the "home" position operating the switch SW1 series and thereby energizing the check circuit relay K11. Check circuit relay back contacts K11 in line 41 open deenergizing the mechanical check solenoid MCS. An SW1 switch in line 49 is operated closed to energize print solenoid PS.

Sequence step Number 20: The printer carriage leaves the home position removing operating of the carriage home switches SW5 and SW6. The switch SW5 in line 44 thus deenergizes the print solenoid PS. The switch SW6 is then operative to deenergize the cycle complete relay K8 in line 70 while energizing the take-label relay K9 in line 72. Contacts K9 in line 72 close sealing in relay K9. Front contacts K9 close in line 36 to light the take label lamp I6.

Sequence step Number 21: The scanner returns to the "home" position operating scanner gate switch SW21 in line 73, and also operates switch SW19 in line 62 deenergizing scanner start relay K6. Front contacts K6 open in line 15 to stop the scanner motor travel.

Sequence step Number 22: A label is printed, cut off and delivered. The printer carriage returns to the "home" position and operates switches SW5 and SW6.

Sequence step Number 23: The weight or package is removed from the scale operating zero switch SW18 in line 57. The activator is actuated operating switches SW10 and SW11 in lines 72, 49. Take label relay K9 is deenergized by the opening of switch SW10, opening front contacts K9 in line 36 thereby extinguishing take-label lamp I6.

Sequence step Number 24: The label is removed and placed on the package. The activator is released removing the operation of switches SW10 and SW11.

There has just been described a complete cycle of the embodiment of the electronic computing scale illustrated herein. Although in the above example the package was not removed until step 23 it is *most important* to note that the electronic computing scale was ready to have the first package removed and to receive a second package any time after the scanner reached the "out" position in step 12 and the scanner control relay K5 was deenergized, lighting the ready lamp I7. It is thus possible to weigh the second package while the label for the first package is being printed, cut off, and delivered. This is possible because of the control means sequencing just described and the use of multi-data storage means. That is, the information may be stored either in the computer or the printer. There are interlocks described to coordinate the two storage means. The multiple storage element reduces the weighing time per package, an important item in pre-packing foods for today's supermarkets or in other applications where assembly line weighing techniques are needed.

The optical readout techniques utilized here for the first time in combination with digital computing in an electronic computing scale add to the speed and reliability of the system. The optical readout requires no physical attachment to the weighing mechanism and is able to provide an almost uniform operating cycle regardless of the weight of the package. The system utilizes the check circuitry described to add to the reliability of the system, again without appreciably reducing the speed of the weighing. The motion detector means cooperates with the system in a novel manner to again reduce the weighing time and improving reliability. The electrical interlocking provides a less expensive approach than mechanical interlocking, reduces mechanical maintenance problems and thus is more reliable while also adding to the speed of the weighing cycle.

The readout and printer section described cooperates well with the system. The various positions of the printer mode switch SW25 provide (1) an "off" position where the weight may be read from a visual indicator without a ticket being printed, (2) an "on" position where a ticket is printed bearing the weight, value, grade, etc., for each package, (3) a "demand" position to provide a ticket only on demand, and (4) a "continuous" position which allows the printing of a plurality of identically marked tickets.

In summary, the scale and motion detector control the scanner. The scanner completely controls the computer. The scanner and the readout are mutually interlocked so that one cannot operate while the other is operative. The scanner and the ticket switch jointly control the starting of a readout cycle. The readout controls the printer.

A normal weighing cycle is as follows. The commodity placed on the scale produces an indication and a weight value for scanning. The motion detector senses the weight change and starts the scanning cycle when motion stops. The scanner reads the weight information to the computer where the weight information is stored and the value is computed and stored. At the end of its cycle, the scanner signals the readout to begin its cycle. The readout then sets up the indication and print wheels to the values stored in the computer. At the end of the readout cycle the print cycle is automatically started and a ticket is printed.

The overall cycle is interrupted between the scanning cycle and the readout cycle unless the ticket switch is operated.

The function of the scale is straight forward. It produces an indicated weight for operator viewing and a corresponding chart indication for use by the scanner in translating the weight into its equivalent digital signal. The scale can be operated any time, but it is interlocked to the rest of the system through the motion detector.

The motion detector senses scale motion and operates a relay. The relay is held in the operated position during scale motion and is released when there is no motion. This relay provides the basic information necessary to control the scanner and computer.

The operating cycle of the scanner and computer is under the control of the motion detector in the following manner. Whenever the scale moves to a new weight value, there is a sequence of first motion and then no motion. The scanner does not respond to the motion signal but begins its cycle when the motion stops. Each sequence of motion and then no motion causes the scanner to go through one cycle of reading the scale and feeding the weight information to the computer.

An exception to this occurs when scale motion occurs during the scanning cycle. If this happens, the weight and price information stored in the computer is in error and should not be read out.

An error circuit is activated which prevents operation of the readout mechanism and automatically returns the scanner to its home position and starts a new scan at the completion of the false scan, or when the motion stops if the motion continues after the false scan is completed. The error circuit is automatically reset by a successfully completed and uninterrupted scan.

The computer is completely under the control of the scanner. Each scan of the scanner causes it to store a new set of weight and value information. The scanner provides a reset pulse to reset the computer at the beginning of each scan and an interlock to prevent input signals to the computer, except during scan.

The readout mechanism is internally interlocked so that when it receives a signal to make a new readout it goes through its operating cycle without interruption. Its operating cycle is started by applying power to the latch release solenoid. When the sensing bar has been pulled to the out position a set of contacts is opened releasing the circuit which activated the latch release solenoid.

Two conditions are necessary to start a readout cycle. The momentary contact switch on the ticket dispenser must have been operated and a new scan must have been completed since the previous readout.

A memory circuit is provided to prepare the readout mechanism after a scan so that it can be activated by the ticket switch. Operation of the readout resets the memory circuit so that two successive readouts cannot be made without a scanning cycle in between.

If the ticket switch is operated before a new scan, it also sets up the memory circuit so that a readout will automatically occur after the next scan.

Interlock contacts are provided to keep a scanning cycle from starting during a readout cycle. A corresponding contact interlocks the readout so that a readout cycle cannot start if a scanning cycle has been started.

Each completed readout cycle starts a printing cycle unless the "no print" or "off" position of the printer mode switch is operated. Operating the "continuous" switch locks the readout and sets up the printer circuitry so that duplicate tickets are printed on a continuous cycle basis until the printer mode switch is turned "off."

The home position contacts on the readout mechanism keep the printer from being operated during a readout cycle. A contact on the printer keeps the readout mechanism from being operated during a printing cycle.

Price and commodity interlocks are provided so that the price setting knobs must be moved when the commodity plate is changed. Likewise, the commodity plate must be moved in and out or replaced if price setting knobs are moved. If these interlocks are violated, a new scanning cycle cannot be initiated until corrective action is taken.

Error lights are provided to indicate certain types of sequence failures which might result from operator interference with the machine cycle. An error light will light if price and commodity plate settings are not properly sequenced. If the scale is moved during a scanning cycle a light comes on and stays on until a new cycle is started. Another light gives warning when ticket paper is running low. In case the readout fails to read out the computer correctly an electrical check circuit prevents the issue of a ticket and lights an error light.

Having described the invention, we claim:

1. In a system for weighing, computing and printing a record of the weight and value of each of a plurality of successively weighted loads, the combination of a scale including a weighing mechanism adapted to be deflected away from a zero reference position in proportion to the weight of a load applied to the scale to a balance position corresponding to said load; computer means for computing and storing the value of each weighed load; means for measuring said deflection and transmitting said measurement to said computer; means responsive to the establishment of said balance position for initiating the operation of said measuring and transmitting means; readout means for storing said value from said computer storage including printing means for printing a record of said value; and circuit means responsive to the printing of a record operative to actuate indicating means until said printed record is taken.

2. A device for weighing an article and automatically printing data incorporating a weight factor, comprising weighing mechanism, a data readout and storage system for receiving weight data from the weighing mechanism, apparatus for setting type in accordance with data stored in said system and printing from said type, an error-detecting control which is actuated by lack of correspondence between the setting of said type and the data stored in said system for preventing said apparatus from printing, and a resetting device which is operable, after actuation of the error-deflecting control, to cause said apparatus to reset said type in accordance with data stored in said system, before printing.

3. A device for weighing an article and automatically printing data incorporating a weight factor, comprising weighing mechanism, a data readout and storage system for receiving weight data from the weighing mechanism, apparatus which upon operation sets type in accordance with data stored in said system, mechanism for printing from said type, an error-detecting control, which is actuated upon failure of said apparatus to operate, for preventing operation of said printing mechanism, and a resetting device which is operable, after actuation of the error-detecting control, to cause said apparatus to reset said type in accordance with data stored in said system, before operation of said printing mechanism.

4. A device for weighing an article and automatically printing data incorporating a weight factor, comprising weighing mechanism, an electrical readout and storage system for receiving weight data from the weighing mechanism, apparatus for setting type in accordance with data stored in said system and printing from said type, a control which is actuated by interruption of electrical power during the setting of said type for preventing said apparatus from printing upon restoration of power, and a resetting device which is operable after actuation of said control and before printing to restore said system to condition for starting a new operation.

5. In a system for weighing, computing and printing a record of the weight and value of each of a plurality of successively weighed loads, the combination of a scale including a weighing mechanism adapted to be deflected away from a zero reference position in proportion to the weight of a load applied to the scale to a balance position corresponding to said load; computer means for computing and storing the value of each weighed load; means for measuring said deflection and transmitting said measurement to said computer; means responsive to the establishment of said balance position for initiating the operation of said measuring and transmitting means; circuit means responsive to the transmission of said measurement to said computer operative to actuate indicating means until the load on the weighing mechanism is changed; readout means for storing said value from said computer storage including printing means for printing a record of said value; and circuit means responsive to the printing of a record operative to actuate indicating means until said printed record is taken.

References Cited in the file of this patent

UNITED STATES PATENTS

| | | |
|---|---|---|
| 2,376,234 | De Castro | May 15, 1945 |
| 2,792,174 | Rutter | May 14, 1957 |
| 2,803,448 | Biebel | Aug. 20, 1957 |
| 2,854,653 | Lubkin | Sept. 30, 1958 |
| 2,897,480 | Kumagai | July 28, 1959 |
| 2,948,464 | Allen | Aug. 9, 1960 |
| 2,948,465 | Allen | Aug. 9, 1960 |
| 2,948,466 | Allen et al. | Aug. 9, 1960 |
| 2,963,222 | Allen | Dec. 6, 1960 |
| 2,970,269 | Williams | Jan. 31, 1961 |
| 2,974,863 | Williams et al. | Mar. 14, 1961 |
| 3,071,318 | Allen | Jan. 1, 1963 |

FOREIGN PATENTS

| | | |
|---|---|---|
| 550,148 | Belgium | Aug. 31, 1956 |
| 72,311 | France | Nov. 2, 1959 |